United States Patent [19]
Whitworth

[11] Patent Number: 6,009,402
[45] Date of Patent: Dec. 28, 1999

[54] SYSTEM AND METHOD FOR PREDICTING, COMPARING AND PRESENTING THE COST OF SELF INSURANCE VERSUS INSURANCE AND FOR CREATING BOND FINANCING WHEN ADVANTAGEOUS

[76] Inventor: Brian L. Whitworth, 20433 Seaboard Rd., Malibu, Calif. 90265

[21] Appl. No.: 08/901,762

[22] Filed: Jul. 28, 1997

[51] Int. Cl.[6] .................................................. G06F 17/60
[52] U.S. Cl. ................................................ 705/4; 705/400
[58] Field of Search .............................. 705/1, 4, 36, 400

[56] References Cited

U.S. PATENT DOCUMENTS

| | | | |
|---|---|---|---|
| 4,642,768 | 2/1987 | Roberts | 705/4 |
| 4,722,055 | 1/1988 | Roberts | 705/36 |
| 4,752,877 | 6/1988 | Roberts et al. | 705/35 |
| 5,590,037 | 12/1996 | Ryan et al. | 705/4 |
| 5,712,984 | 1/1998 | Hammond et al. | 705/4 |

*Primary Examiner*—Edward R. Cosimano
*Attorney, Agent, or Firm*—Oppenheimer Wolff & Donnelly LLP

[57] ABSTRACT

A system and method for predicting, comparing, and presenting the cost of self insurance versus insurance for property, casualty, or employee benefit liabilities, and for creating bond financing when advantageous. For a self insured entity, the cost of insurance is estimated by reviewing available data from actuarial studies, claims audits, loss runs, similar self insureds, recent similar insurance deals and rating agencies. These preliminary pricing estimates are used to decide if pursuing insurance is likely to provide savings to the self insured. Suggested pricing estimates are also provided to facilitate marketing the program to insurance carriers. If a carrier offers an insurance program which provides savings and the insured entity requires bond financing, the system is adapted to calculate bond payments based on budget constraints or claims payout patterns.

69 Claims, 42 Drawing Sheets

FIG. 3

| | | MUNI GOV BODY | CURRENTLY INJURED WORKERS | EMPLOYEES | UNIONS | CURRENT WC VENDORS | INSURANCE BROKER | CARRIER INSURANCE DIVISION | CARRIER INVESTMENT DIVISION | MUNICIPALITY BOND COUNSEL | PURCHASER BOND COUNSEL | IRS | INVESTMENT BANKER | RATING AGENCY | BOND GUARANTEE FIRM | OTHER CREDITORS | VOTERS | LEGISLATIVE APPROVAL | COURT, VALIDATION PROCEEDINGS | THIRD PARTY APPROVAL | PRESS RELEASES/NEWS MEDIA | BOND PURCHASERS | MUNICIPALITY CAO'S | GRAPH, FIGURE # | DATA, FIGURE # |
|---|---|---|---|---|---|---|---|---|---|---|---|---|---|---|---|---|---|---|---|---|---|---|---|---|---|
| BEFORE QUOTES | TOTAL MUNI SAVINGS | R | | R | R | | | | | | | O | | | | | R | R | R | | | | R | R | 4 | 5 |
| | COST COMPONENTS | R | | R | R | | | | | | | O | | | | | | | | | | | O | R | 4 | 5 |
| | YEAR BY YEAR SAVINGS | R | | R | R | R | | | | | | O | | | | | | R | R | R | | | | R | 6 | 7 |
| | SINGLE POLICY CASH FLOW | R | | R | R | | | | | | | | | | | | | | | | | | O | R | 6 | 7 |
| | MULTI-POLICY CASH FLOWS | R | | L | L | | | | | | | O | | | | | R | R | R | | | | R | R | 6 | 7 |
| | SIMULATION | L | | L | L | | | | | | | O | | | | | | | | | | | | L | 8,9 |
| | RISK FACTORS | L | | L | L | | | | | | | O | | | | | | | | | | | | L | 10 |
| WITH ACTUAL QUOTES | TOTAL MUNI SAVINGS | R | | L R | L | R R | O | R R R | L R | L R R R R | R | L R | 4* | 12 |
| | COST COMPONENTS | R | | L L | | R R | O O O O | L L L | O L L L | | O R | 4* | 4* |
| | YEAR BY YEAR SAVINGS | R | | L R | L | R R O R R | L R | L R R R R | L L R | 11 | 12 |
| | SINGLE POLICY CASH FLOW | R | | R | | R R R R R R R R | R L L L | O R | 11 | 12 |
| | MULTI-POLICY CASH FLOWS | R | | L L L | R R R R R R | R R R R | L R | 15 | 7* |
| | SIMULATION | L | | O | L L L L O O L L L | L L O O O L R | 8,9* |
| | RISK FACTORS | L | | L L | L L R L R O L R R | R L L L O R R | 13 |
| FINANCING | BOND PAYMENT SCHEDULE | O | | R | R O R R R R | R R R R R R | 14,18 | 13 |
| | BOND DURATION | O | | O | L L L O R L R | O O O R O | 13 | 13 |
| | INSD CLAIMS DURATION | L | | O L O L L | O O O O O | 13 |
| | REGULATORY BACKGRND | L | O | L | R R R R L | L L R R L R R |
| OTHER | IMPLEMENTATION TIME LINE | R R R R R R | R O O L O O O L L O L L O L | 16,17 |
| | PROFIT ACCRUAL | L | 19,20 |
| | PROFIT SIMULATION | L | 19,20 | 21-23 |
| | PRELIMINARY EVALUATION | L L | O O O | L O O L | R O |
| | INPUT SCREENS | R | O |
| | HISTORY OF RECENT DEALS | O O O L O L O O O L O O L L L O O R | 24-28 |

MUNICIPAL BOND SOFTWARE, OUTPUTS REQUIRED BY TYPE OF USER

R=REQUIRED, L=LIKELY, O=OCCASSIONALLY, X*=VIRTUALLY IDENTICAL TO FIGURE X

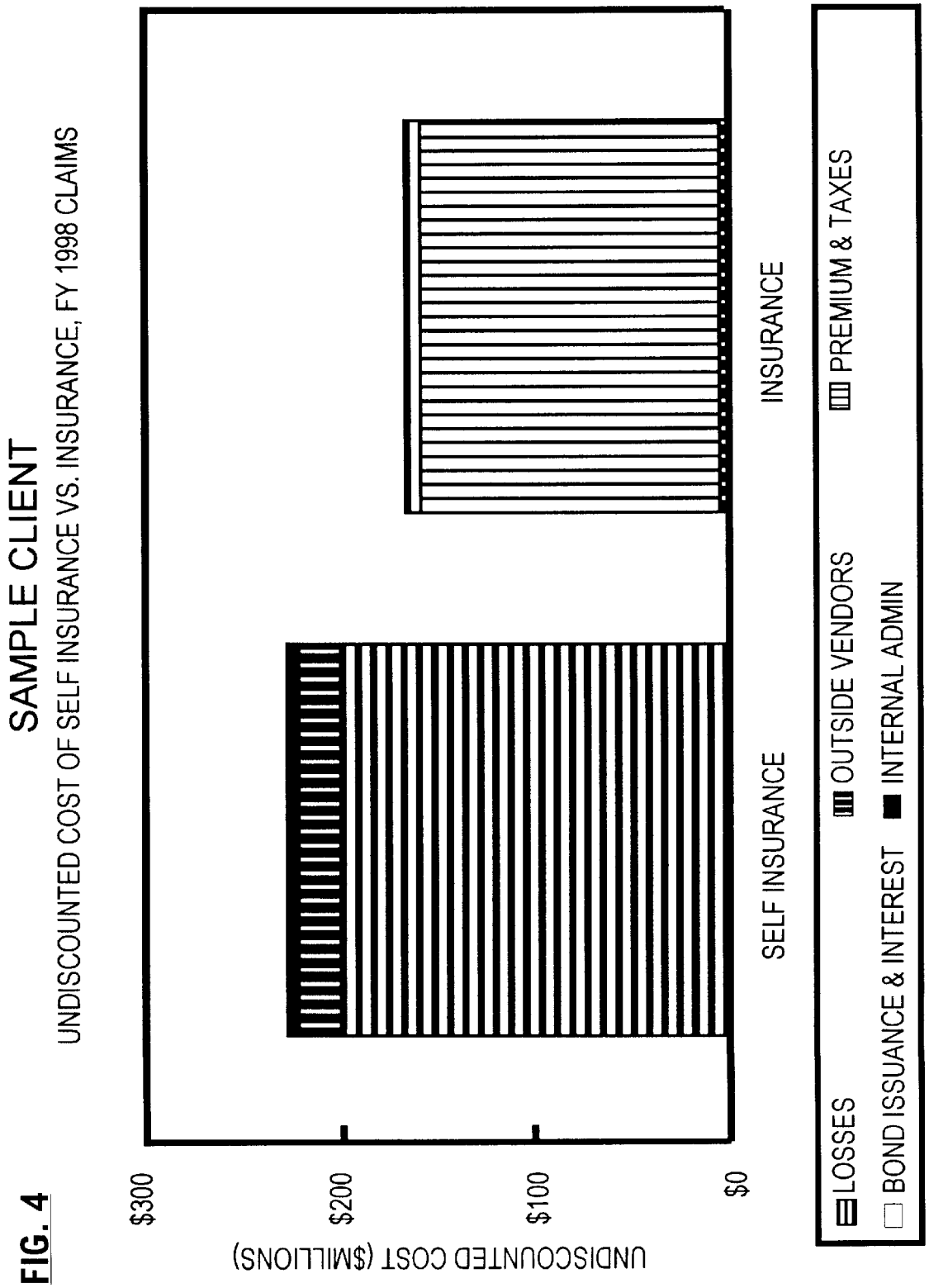

FIG. 5

HOW MUCH WILL IT COST TO SETTLE FYE 97 CLAIMS?
SELF INSURANCE VS. INSURANCE
SAMPLE COUNTY
IN MILLIONS

| # | | SELF INSURANCE | | INSURANCE | | SAVINGS |
|---|---|---|---|---|---|---|
| 1 | MEDICAL, INDEMNITY, CLAIMS HANDLING | 217 | UNDISCOUNTED | 152.1 | UNDISCOUNTED | 65 | 30.00% of #1 |
| 2 | TIME VALUE OF MONEY (1) | 67.84% | 5% INT, 60 YR PMT | 63.03% | 6% INT, 40 YR PMT | 0 | 7.10% of #2 |
| 3 | DISCOUNTED LOSSES & EXPENSES | 155 | 67.84% of #1 | 96 | 63.03% of #1 | 59 | 38.07% of #3 |
| 4 | CARRIER PROFIT | 0 | N/A | 6.7 | 7.00% of #3 | (7) | -100.00% of #4 |
| 5 | NET PREMIUM | 155 | = #3 | 102.6 | #3 + #4 | 52 | 33.74% of #5 |
| 6 | PREMIUM TAXES | 0 | N/A | 3.1 | 3.00% of #5 | (3) | -100.00% of #6 |
| 7 | CONSULTING FEES | 0 | N/A | 1.0 | FLAT FEE | (1) | -100.00% of #7 |
| 8 | BOND ISSUANCE COSTS | 0 | N/A | 0.6 | 0.55% of #5+#6+#7 | (1) | -100.00% of #8 |
| 9 | BOND PRINCIPAL | 0 | N/A | 107 | #5+#6+#7+#8 | (107) | -100.00% of #9 |
| 10 | INTEREST COST | 0 | N/A | 33.68 | @ 5.00% INT | (34) | -100.00% of #10 |
| 11 | TOTAL BOND PAYMENTS | 0 | N/A | 140.9 | #9 + #10 | (141) | -100.00% of #11 |
| 12 | DISCOUNTED BOND PAYMENTS | 0 | N/A | 107.3 | = #9 | (107) | -100.00% of #12 |
| 13 | INTERNAL ADMIN EXPENSE | 11 | 5.00% of #1 | 6.4 | 4.24% of #1 | 5 | 43.29% of #13 |
| 14 | DISCOUNTED INTERNAL ADMIN EXPENSE | 8 | 67.84% of #13 | 4.1 | 63.03% of #13 | 4 | 47.32% of #14 |
| 15 | TOTAL PAYMENTS TO CLOSURE | 229 | #1 + #13 | 147.4 | #11 + #13 | 82 | 35.70% of #15 |
| 16 | TOTAL DISCOUNTED COST | 163 | #3 + #14 | 111.3 | #12 + #14 | 51 | 31.51% of #16 |

1) COUNTY PAYMENTS DISCOUNTED AT 5.00% INTEREST. CARRIER PAYMENTS DISCOUNTED AT 6.00%

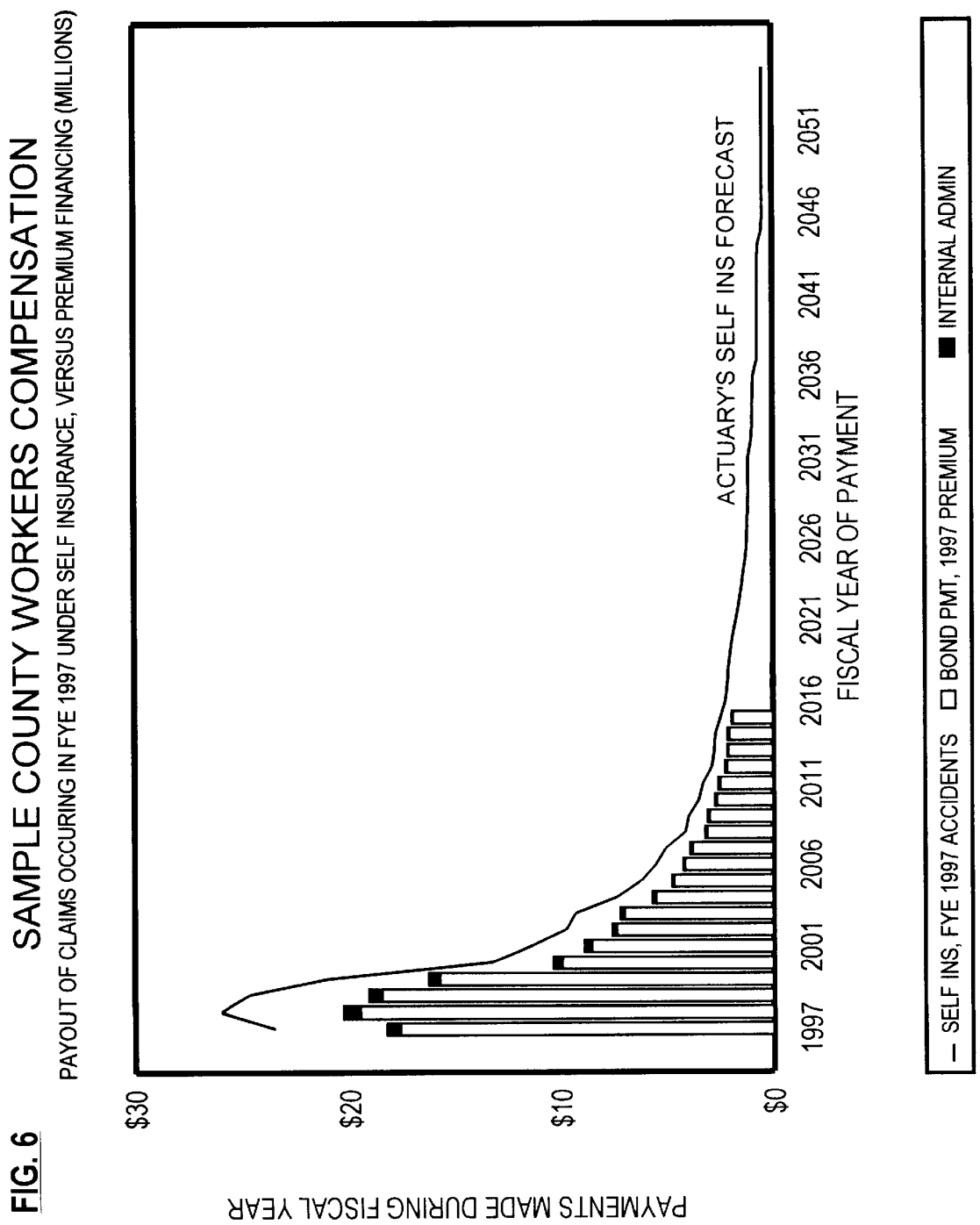

FIG. 7

SAMPLE PUBLIC ENTITY
COMPARISON OF PROJECTED PAYMENTS UNDER INSURANCE AND SELF INSURANCE

| FISCAL YEAR OF PMT | SELF INSURED PROGRAM | INSURED PROGRAM PREMIUM & ADMIN. | ESTIMATED SAVINGS | PERCENT SAVINGS | BOND PAYMENT ON TAIL PREMIUM | INTERNAL ADMIN ON TAIL | BOND PAYMENT ON FYE 1997 PREMIUM | INTERNAL ADMIN FYE 1997 | PMTS FOR ACCIDENTS OCCURRING AFTER 1997 |
|---|---|---|---|---|---|---|---|---|---|
| 1997 | 170,171,470 | 164,942,460 | 5,229,010 | 3.07% | 141,677,332 | 5,020,643 | 17,583,426 | 661,059 | 0 |
| 1998 | 175,779,092 | 164,431,092 | 11,348,000 | 6.46% | 121,910,443 | 4,105,121 | 19,472,611 | 813,136 | 18,129,781 |
| 1999 | 182,483,594 | 163,959,299 | 18,524,295 | 10.15% | 102,702,429 | 3,405,097 | 18,447,736 | 634,007 | 38,770,030 |
| 2000 | 189,832,978 | 163,580,981 | 26,251,998 | 13.83% | 86,091,370 | 2,834,026 | 15,714,738 | 526,841 | 58,414,005 |
| 2001 | 194,077,015 | 163,691,063 | 30,385,952 | 15.66% | 75,759,893 | 2,395,418 | 9,907,118 | 421,364 | 75,207,271 |
| 2002 | 197,829,387 | 164,083,695 | 33,745,691 | 17.06% | 67,258,317 | 2,042,087 | 8,506,456 | 351,817 | 85,925,018 |
| 2003 | 201,294,675 | 164,000,036 | 37,294,639 | 18.53% | 59,619,220 | 1,836,404 | 7,293,688 | 237,957 | 95,012,767 |
| 2004 | 204,384,248 | 164,139,976 | 40,244,272 | 19.69% | 52,495,366 | 1,704,144 | 6,952,064 | 183,151 | 102,805,251 |
| 2005 | 207,204,607 | 164,171,219 | 43,033,388 | 20.77% | 46,737,978 | 1,606,459 | 5,465,996 | 154,093 | 110,206,692 |
| 2006 | 209,835,675 | 164,409,611 | 45,426,064 | 21.65% | 42,063,281 | 1,538,468 | 4,611,934 | 130,969 | 116,064,960 |
| 2007 | 212,266,919 | 164,584,832 | 47,682,088 | 22.46% | 37,885,115 | 1,495,071 | 4,099,497 | 110,067 | 120,995,082 |
| 2008 | 214,529,614 | 164,702,769 | 49,826,845 | 23.23% | 34,012,647 | 1,457,948 | 3,757,872 | 104,784 | 125,369,518 |
| 2009 | 216,642,254 | 164,853,273 | 51,788,981 | 23.91% | 30,877,294 | 1,427,777 | 3,074,623 | 98,261 | 129,375,319 |
| 2010 | 218,636,825 | 164,981,130 | 53,655,695 | 24.54% | 27,872,141 | 1,391,580 | 2,955,054 | 96,644 | 132,665,710 |
| 2011 | 220,510,035 | 165,051,455 | 55,458,581 | 25.15% | 25,196,683 | 1,346,509 | 2,596,348 | 100,957 | 135,810,957 |
| 2012 | 222,249,372 | 165,169,951 | 57,079,421 | 25.68% | 22,739,320 | 1,313,380 | 2,442,617 | 92,107 | 138,582,526 |
| 2013 | 223,893,913 | 165,204,821 | 58,689,092 | 26.21% | 20,516,128 | 1,280,553 | 2,135,155 | 88,875 | 141,184,111 |
| 2014 | 225,469,251 | 165,314,581 | 60,154,671 | 26.68% | 18,471,037 | 1,244,971 | 2,049,748 | 85,064 | 143,463,761 |
| 2015 | 226,959,401 | 164,876,989 | 62,082,412 | 27.35% | 15,924,067 | 1,207,428 | 2,015,586 | 84,394 | 145,645,514 |
| 2016 | 228,362,888 | 164,200,838 | 64,162,050 | 28.10% | 13,319,064 | 1,168,050 | 1,844,774 | 79,639 | 147,789,311 |
| 2017 | 229,678,868 | 150,963,940 | 78,714,927 | 34.27% | 0 | 1,125,816 | 0 | 82,230 | 149,755,894 |

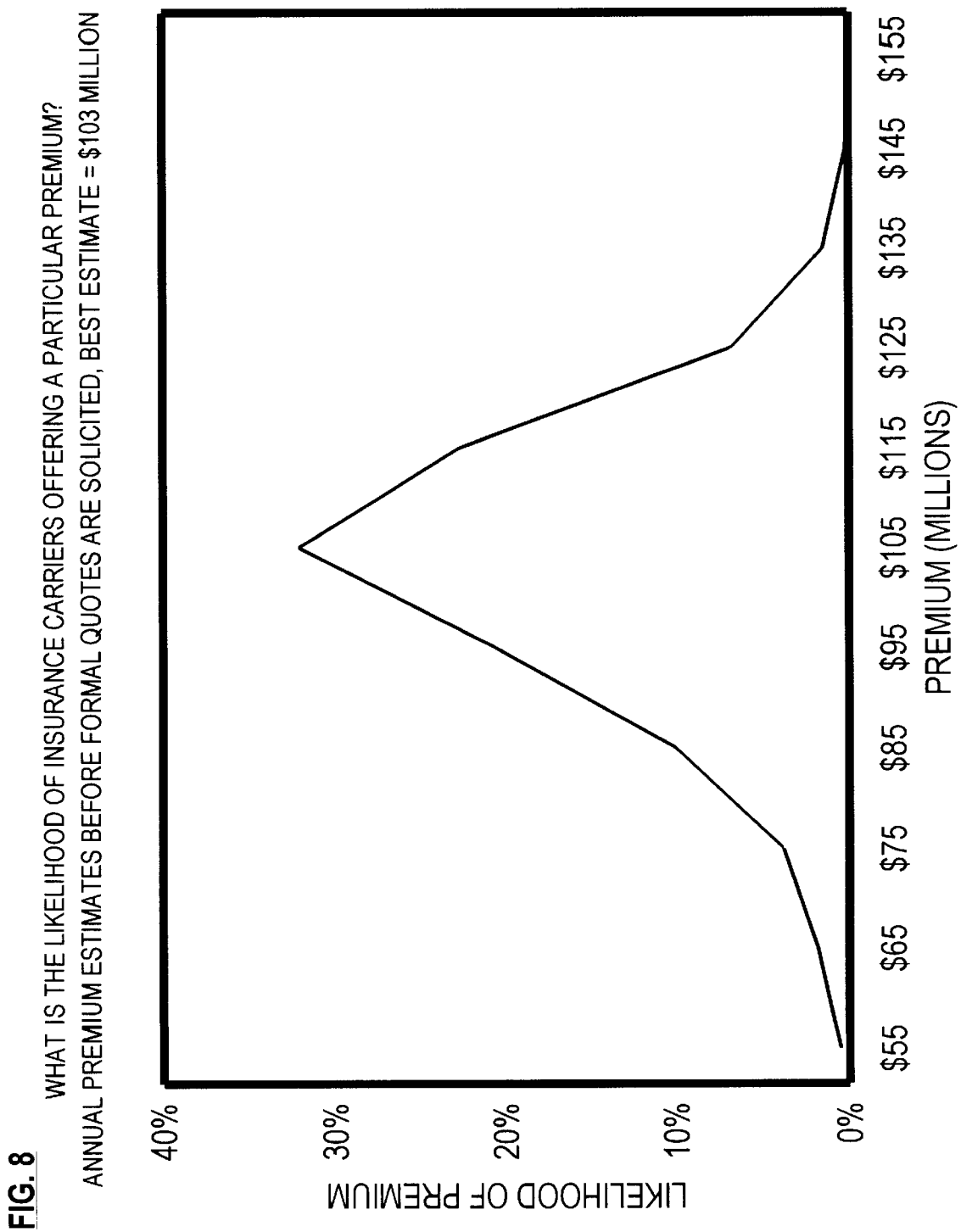

FIG. 10

SAMPLE CLIENT
SOURCES OF VARIATION IN SAVINGS ESTIMATES
BEFORE INSURANCE QUOTES ARE SOLICITED

| MAJOR FACTORS AFFECTING ESTIMATES, IN ORDER OF IMPORTANCE | AVG VALUE | LOW END VALUE | HIGH END VALUE | LIKELY SOURCES OF VARIATION | SOURCE(S) OF ESTIMATES | R SQUARE |
|---|---|---|---|---|---|---|
| SAVINGS ON ULTIMATE COST OF CLAIMS: NEW CLAIMS, CARRIER'S COST VS. SELF INSURANCE | 30.00% | 10.00% | 45.00% | MARKET CONDITIONS, DATA ACCURACY, CLAIM FILE AUDITS | MUNI SURVEY, CARRIERS | 82.50% |
| # YEARS FOR CARRIER TO CLOSE ALL CLAIMS | 40 | 30 | 50 | | CARRIERS | 6.85% |
| LENGTH OF BOND FINANCE PERIOD | 20 | 15 | 30 | AT CLIENT'S DISCRETION | | 3.71% |
| INTEREST RATE USED BY CARRIER TO DISCOUNT CASH FLOWS | 6.00% | 5.00% | 7.00% | INTEREST RATES ON TREASURY NOTES, CARRIER'S RETURN ON INVESTMENTS | 5-10 YEAR TREASURY RATES, CARRIERS | 2.88% |
| DIFFERENCE BETWEEN BOND INTEREST RATE AND CARRIER'S INTEREST RATE | -2.00% | -2.50% | -1.50% | TAX EXEMPT STATUS OF BONDS, COUNTY'S CREDIT RATING | RECENT SIMILAR BOND ISSUES, COUNSEL | 1.91% |
| ACCURACY OF ACTUARIAL FORECAST FOR SELF INSURANCE | FULL | FULL | FULL | ECONOMIC CONDITIONS, LITIGATIO TRENDS, INFLATION, CLAIM DEFENSE, CLAIM SETTLEMENT PRACTICES, PRESENCE OF LATENT INJURIES, ACCURACY OF DATA PROVIDED BY COUNTY | MILLIMAN & ROBERTSON | 0.00% |
| OTHER FACTORS: CONSULTING FEES, CARRIER PROFIT, PREMIUM TAX | 9.18% | 3.01% | 8.10% | INSURANCE MARKET CONDITIONS | CARRIERS | 0.36% |
| BOND ISSUANCE FEES, BOND COUNSEL | 0.60% | 0.48% | 1.13% | DIFFICULTY OF VALIDATION PROCEEDINGS | RECENT SIMILAR BOND ISSUES, COUNSEL | 0.23% |

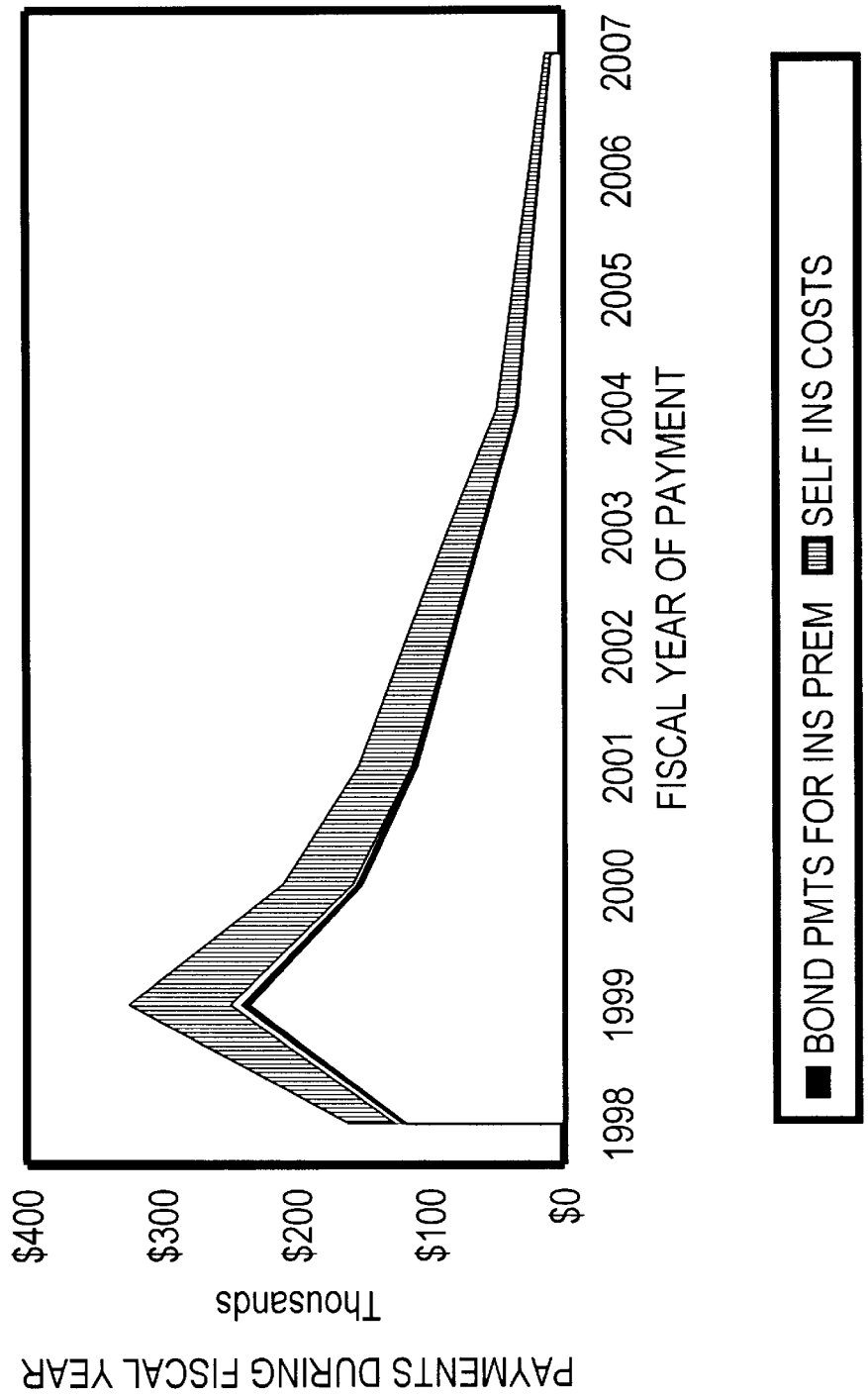

FIG. 12

WHAT IS THE REASONABLE RANGE OF PAYMENTS BY FISCAL YEAR?

LOSSES FROM FYE 98, SELF INSURANCE VS. BEST INSURANCE QUOTE WITH BOND FINANCING BOND PAYMENTS SET AT A CONSTANT PERCENTAGE SAVINGS FROM SELF INSURANCE COST

| | 1998 | 1999 | 2000 | 2001 | 2002 | 2003 | 2004 | 2005 | 2006 | 2007 |
|---|---|---|---|---|---|---|---|---|---|---|
| SELF INSURANCE COSTS: | | | | | | | | | | |
| EXPECTED | 140,000 | 280,000 | 180,000 | 130,000 | 100,000 | 70,000 | 40,000 | 30,000 | 20,000 | 10,000 |
| HIGH END | 161,000 | 324,800 | 210,600 | 153,400 | 119,000 | 84,000 | 48,400 | 36,600 | 24,600 | 12,400 |
| LOW END | 126,000 | 249,200 | 158,400 | 113,100 | 86,000 | 59,500 | 34,000 | 25,500 | 17,000 | 8,500 |
| SPREAD (HIGH - LOW) | 35,000 | 75,600 | 52,200 | 40,300 | 33,000 | 24,500 | 14,400 | 11,100 | 7,600 | 3,900 |
| INSURANCE BOND PAYMENTS: | | | | | | | | | | |
| EXPECTED | 119,178 | 238,356 | 153,229 | 110,665 | 85,127 | 59,589 | 34,051 | 25,538 | 17,025 | 8,513 |
| HIGH END | 120,966 | 241,932 | 155,528 | 112,325 | 86,404 | 60,483 | 34,562 | 25,921 | 17,281 | 8,640 |
| LOW END | 117,391 | 234,781 | 150,931 | 109,006 | 83,850 | 58,695 | 33,540 | 25,155 | 16,770 | 8,385 |
| SPREAD (HIGH - LOW) | 3,575 | 7,151 | 4,597 | 3,320 | 2,554 | 1,788 | 1,022 | 766 | 511 | 255 |
| EXPECTED $ SAVINGS | 20,822 | 41,644 | 26,771 | 19,335 | 14,873 | 10,411 | 5,949 | 4,462 | 2,975 | 1,487 |
| EXPECTED % SAVINGS | 14.9% | 14.9% | 14.9% | 14.9% | 14.9% | 14.9% | 14.9% | 14.9% | 14.9% | 14.9% |

NOTE: INTEREST RATES ARE NOT SET UNTIL SHORTLY BEFORE BOND ISSUANCE; ONCE INTEREST RATES ARE SET, BOND PAYMENTS CANNOT VARY.

FIG. 13

SAMPLE CLIENT
SOURCES OF VARIATION IN SAVINGS ESTIMATES
SELF INSURANCE VERSUS FINAL QUOTES

| MAJOR FACTORS AFFECTING ESTIMATES, IN ORDER OF IMPORTANCE | AVG VALUE | LOW END VALUE | HIGH END VALUE | LIKELY SOURCES OF VARIATION | SOURCE(S) OF ESTIMATES | R SQUARE |
|---|---|---|---|---|---|---|
| # OF CLAIMS OCCURRING UNDER SELF INSURANCE (NO CATASTROPE DURING YEAR) | 8,100 | 7,290 | 9639 | ECONOMIC CONDITION, LITIGATION TRENDS, INFLATION, CLAIM DEFENSE, CLAIM SETTLEMENT PRACTICES, PRESENCE OF LATENT INJURIES, ACCURACY OF DATA PROVIDED BY COUNTY | ACTUARIAL STUDY, DEPT OF SELF INSURANCE, WC RATING BUREAU | 35.90% |
| # OF YEARS TO CLOSE ALL CLAIMS UNDER SELF INSURANCE | 10 | 8 | 15 | CLAIMS HANDLING PRACTICES, LITIGATION | ACTUARIAL STUDY, CA SIP | 24.73% |
| PORTION OF CLAIMS HANDLED UNDER MANAGED CARE | 27.0% | 20.0% | 0.4 | CLAIMS HANDLING PRACTICES, PROMPT REPORTING | RECENT COUNTY EXPERIENCE | 14.16% |
| DENIAL RATE FOR SUSPECTED FRAUDULENT CLAIMS | 2.0% | 1.0% | 0.07 | SPECIAL FRAUD UNIT, CLAIMS STAFF TURNOVER, LEGAL FIRM | RECENT COUNTY EXPERIENCE | 8.51% |
| MAJOR QUAKE DURING WORKING HOURS: NUMBER PER YEAR WORKERS COMPENSATION COST | 0.10 $2.2 MI | 0.00 $0 | 1 $22 MIL | MOTHER NATURE, BUILDING CONSTRUCTION, BUILDING RETROFIT, EMERGENCY PLANNING | US GEOLOGICAL SURVEY | 7.70% |
| MAJOR RIOT DURING WORKING HOURS: NUMBER PER YEAR WORKERS COMPENSATION COST | 0.04 $2 MIL | 0.00 $0 | 1 $6 MIL | POLICE VIOLENCE, COURT DECISIONS, ATHLETIC EVENTS, EMERGENCY PLANNING | FBI, DEPT OF JUSTICE | 3.90% |
| INTEREST RATE ON PREMIUM FINANCE BONDS | 5.0% | 4.5% | 0.06 | ACTUAL FIGURE IS SET SHORTLY BEFORE BOND ISSUE IS SOLD | RECENT BONDS INV. BANKERS | 2.60% |
| OTHER FACTORS: PORTION OF CLAIMS LITIGATED UNDER SELF INSURANCE | 15% | 12% | 0.17 | LABOR STRIFE, PORTION OF CLAIMS DENIED, LEGAL FIRM USED | RECENT COUNTY EXPERIENCE | 0.98% |
| COST OF INTERNAL ADMINISTRATION (% OF CLAIMS COST) | 12.0% | 10.0% | 0.16 | SPECIAL FRAUD UNIT, CLAIMS STAFF TURNOVER | RECENT COUNTY EXPERIENCE | 0.60% |

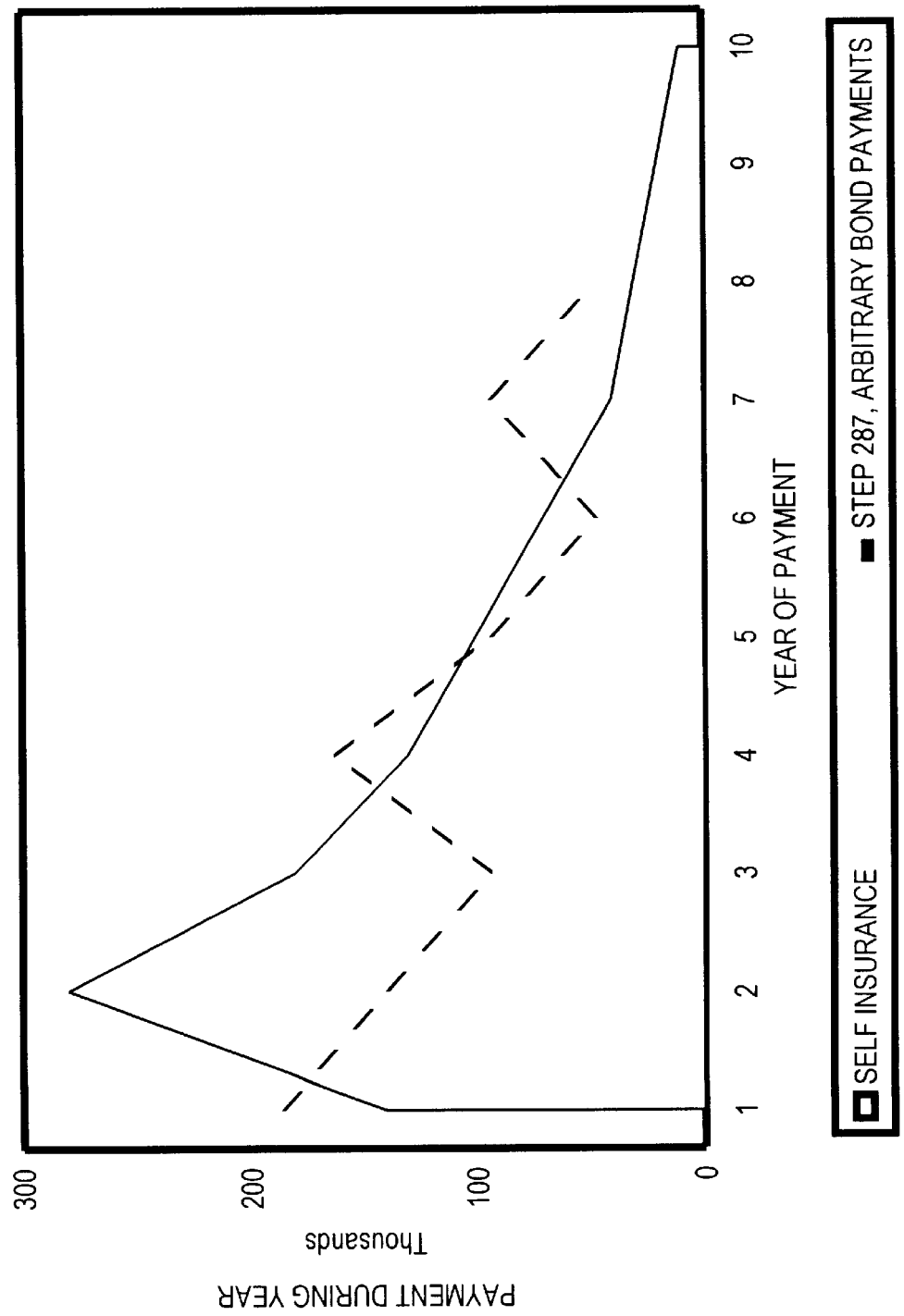

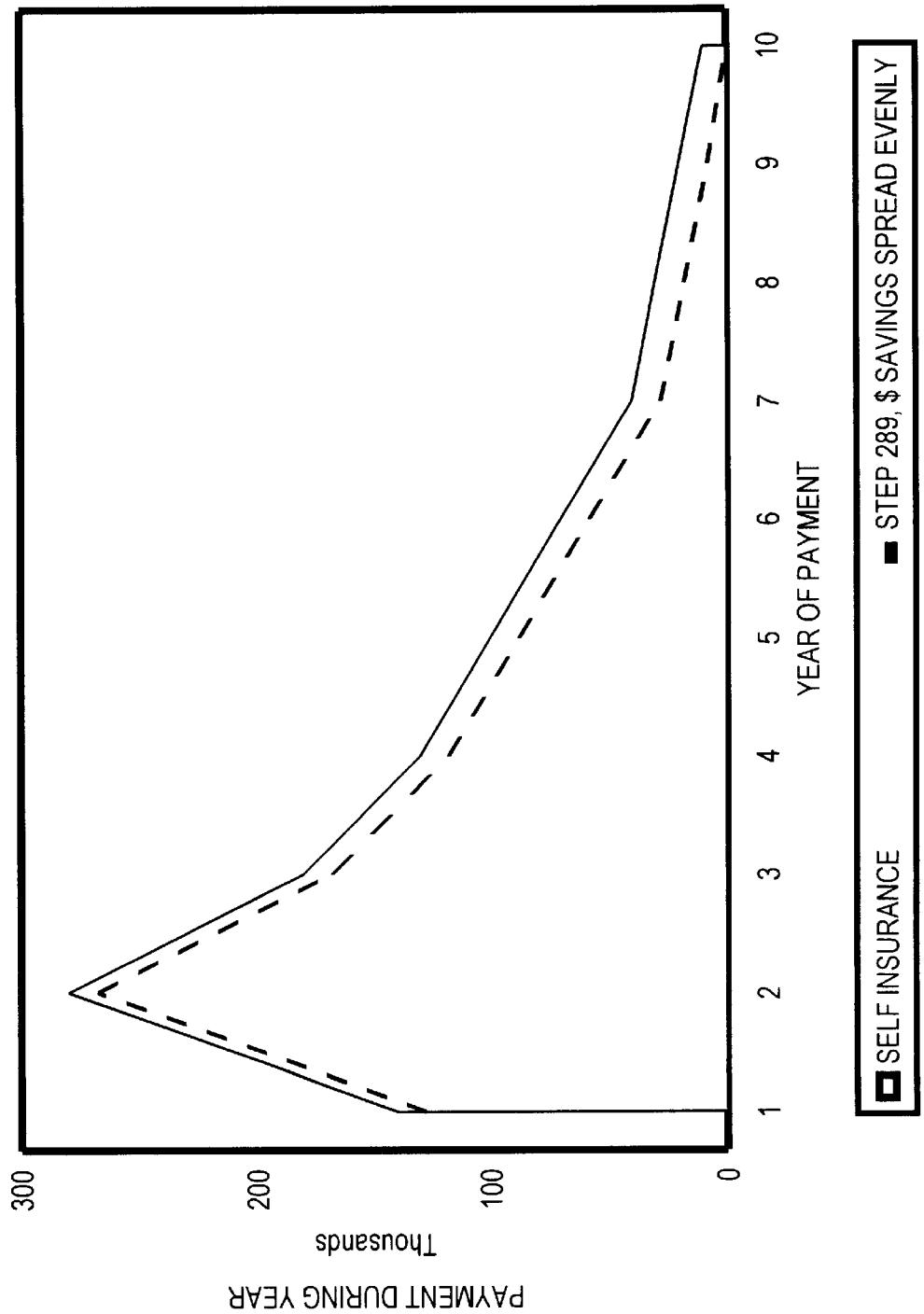

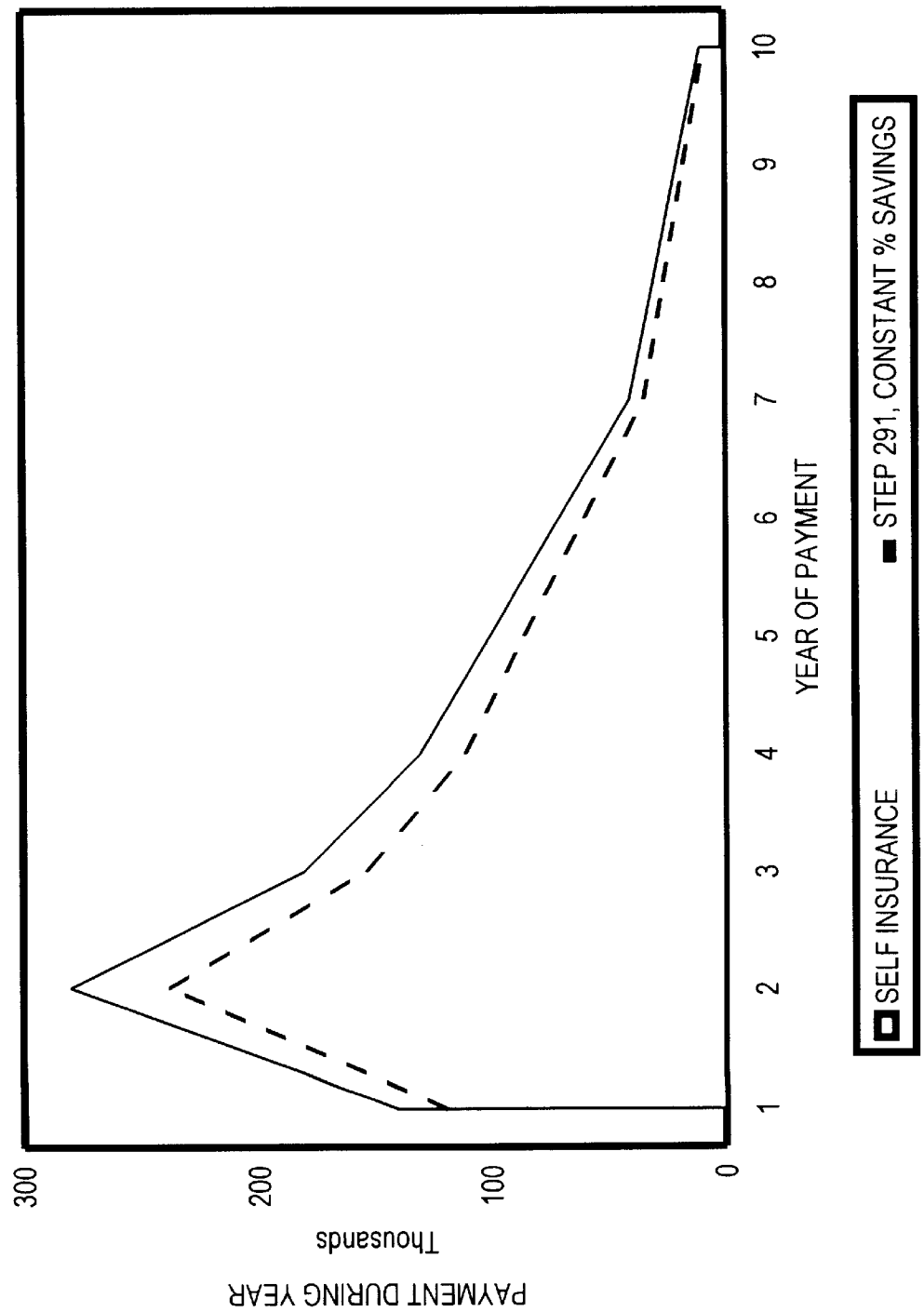

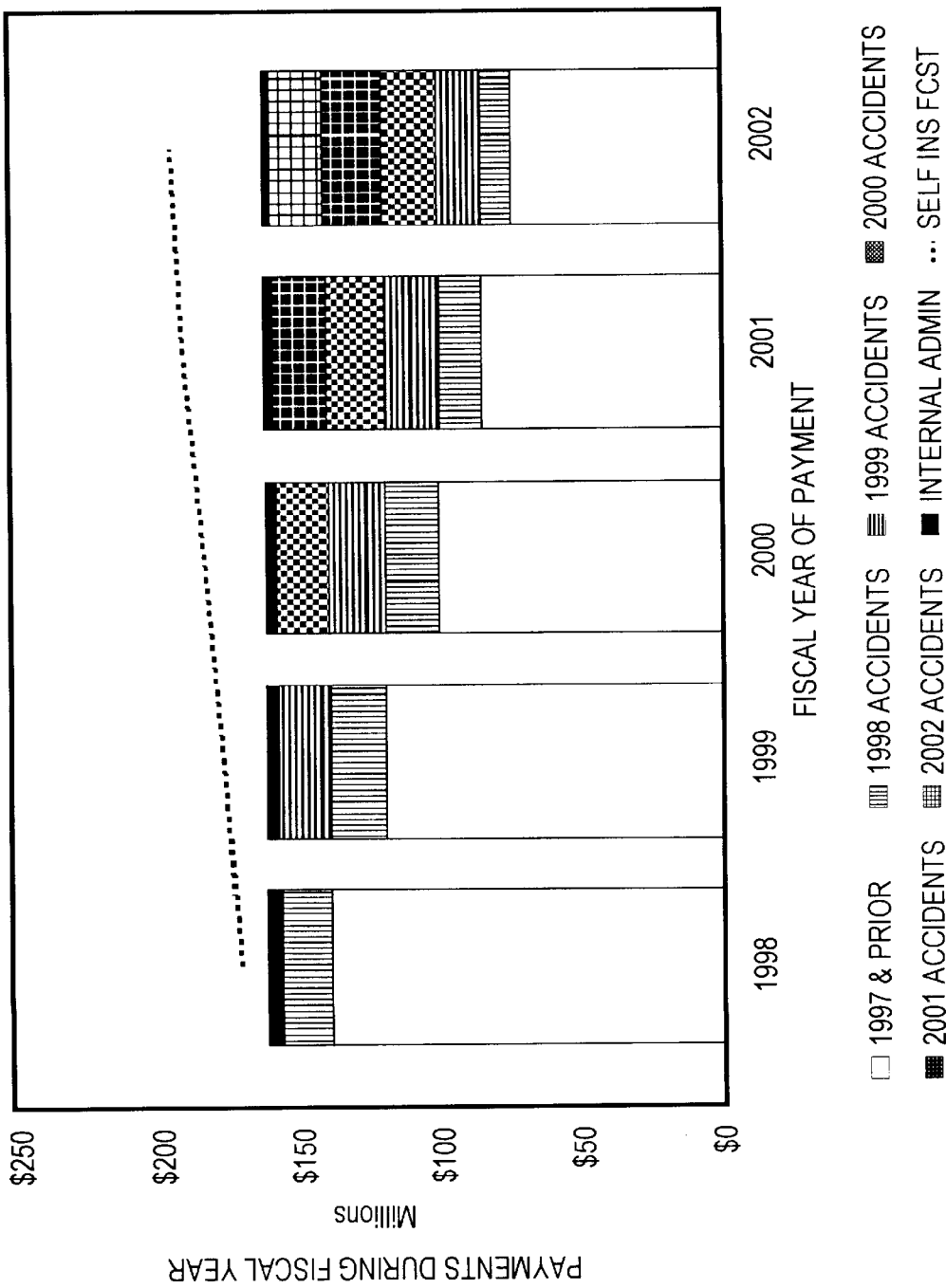
FIG. 15 SAMPLE PUBLIC ENTITY WORKERS COMPENSATION
CASH FLOW ESTIMATES FOR SELF INSURANCE VS. INSURANCE WITH BOND FINANCING (MILLIONS)

FIG. 18

SAMPLE CLIENT
$700,000 SERIES 1998 CURRENT INTEREST BONDS

AUTHORIZED DENOMINATIONS: $5,000 OF ANY INTEGRAL MULTIPLE THEREOF.

| MATURITY (JUNE 30) | AMOUNT | INTEREST RATE | YIELD |
|---|---|---|---|
| 1998 | $119,178 | 5.00% | 100.00 |
| 1999 | 238,356 | 5.10% | 100.00 |
| 2000 | 153,229 | 5.20% | 100.00 |
| 2001 | 110,665 | 5.30% | 100.00 |
| 2002 | 85,127 | 5.40% | 100.00 |
| 2003 | 59,589 | 5.50% | 100.00 |
| 2004 | 34,051 | 5.60% | 100.00 |
| 2005 | 25,538 | 5.70% | 100.00 |
| 2006 | 17,025 | 5.80% | 100.00 |
| 2007 | 8,513 | 5.90% | 100.00 |

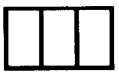 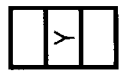 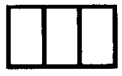 

FIG. 19  PRELIMINARY EVALUATION OF CURRENT SELF INSURED PROGRAM, PART 1

THIS SERIES OF QUESTIONS TAKES AN INFORMAL LOOK AT THE CLIENT TO ASSESS THE LIKELIHOOD THAT LEAVING SELF INSURANCE IS A GOOD IDEA. THE RESULTS OF THIS EVALUATION HELP DETERMINE IF A FULL ANALYTICAL AND MARKETING EFFORT IS IN ORDER. IF YOUR CLIENT SCORES MORE THAN 100 POINTS, TAKE A SERIOUS LOOK A LEAVING SELF INSURANCE.

1. CLIENT IS INVOLVED IN A MERGER, ACQUISITION, OR SPINOFF, PARTICULARLY IF THE CLIENT WILL BUY AND SELL COMPANIES FREQUENTLY IN THE FUTURE. EVERY TIME THE COMPANY GOES THROUGH ONE OF THESE CHANGES, THEY HAVE TO FILE ADDITIONAL PAPERWORK WITH THE STATE. OFTEN, THE CLIENT WILL HAVE TO REAPPLY FOR SELF INSURANCE. SELLING UNITS IS EASIER IF THE BUYER DOES NOT HAVE TO TAKE ON UNCERTAIN SELF INSURED LIABILITIES.
  SCORING: ACQUIRES OR DIVESTS AT LEAST ONE SUBSIDIARY EVERY TWO YEARS - 80 POINTS
  UPCOMING MERGER OR MAJOR ACQUISITION - 40 POINTS
  UPCOMING SPINOFFS - 20 POINTS

2. CLIENT IS REDUCING CORPORATE HEADCOUNT. PARTICULARLY IF THE CLIENT ADMINISTERS ITS OWN CLAIMS, THERE WILL BE A CHANCE TO REDUCE HEADCOUNT BY MOVING TO AN INSURED PROGRAM.
  SCORING: SELF ADMIN, IN THE PROCESS OF LAYOFFS OR EARLY RETIREMENT OFFERINGS -- 40 POINTS
  SELF ADMINISTERED, CLIENT HAS ONGOING PRESSURE TO REDUCE HEADCOUNT - 15 POINTS
  TPA, CLIENT IS IN THE PROCESS OF LAYOFFS OR EARLY RETIREMENT OFFERINGS - 15 POINTS

3. CLIENT'S CA OPERATIONS ARE MUCH SMALLER THAN BEFORE. MANY COMPANIES ENTERED SELF INSURANCE WHEN THEY HAD THOUSANDS OF EMPLOYEES IN CA, BUT NOW HAVE ONLY A FEW. THIS IS PARTICULARLY TRUE OF DEFENSE CONTRACTORS. IN THE SMALLEST PROGRAMS, THE PAPERWORK OF SELF INSURANCE COSTS MORE THAN THE CLAIMS.
  SCORING: FEWER THAN 100 CALIFORNIA EMPLOYEES OR $50,000 IN ANNUAL LOSSES - 100 POINTS
  FEWER THAN 500 CALIFORNIA EMPLOYEES OR $250,000 IN ANNUAL LOSS PAYMENTS - 50 POINTS
  FEWER THAN 1000 CALIFORNIA EMPLOYEES OR $500,000 IN ANNUAL LOSS PAYMENTS - 20 POINTS

4. CLIENT HAS DIFFICULTY POSTING COLLATERAL REQUIRED BY THE STATE. THE STATE IS VERY HAPPY TO HAVE CLIENTS IN FINANCIAL DIFFICULTY LEAVE SELF INSURANCE. SELF INSURANCE TREATS THE CLIENT AS IF THEY WERE AN INSURANCE COMPANY; AN INSURANCE COMPANY SHOULD BE SOLVENT AND ABLE TO COVER ITS LIABILITIES FAR INTO THE FUTURE.
  SCORING: STATE HAS INCREASED COLLATERAL TO MORE THAN 135% OF RESERVES - 90 POINTS
  POSTS COLLATERAL ONLY WITH EXTREME DIFFICULTY. IMPINGES ON ABILITY TO DO ONGOING BUSINESS - 60 POINTS
  COLLATERAL IS A CONTINUING NUISANCE TO MANAGEMENT - 20 POINTS

FIG. 20
PRELIMINARY EVALUATION OF CURRENT SELF INSURED PROGRAM, PART 2

5. CLIENT'S OR TPA'S HANDLING OF CLAIMS IS A MESS. YOUR CLIENT SHOULD BE WORRIED ABOUT CLAIMS HANDLING IF:
SCORING: AT LEAST THREE MATH ERRORS ON ANNUAL REPORT - 30 POINTS
STATE RAISES RESERVES BY AT LEAST 40% AT AUDIT - 30 POINTS
MORE THAN $5,000 IN ANNUAL PENALTIES - 50 POINTS
MORE THAN 25% OF THE MOST RECENT YEAR'S INDEMNITY CLAIMS ARE LITIGATED - 40 POINTS
NO RETURN TO WORK PROGRAM - 30 POINTS
NO MANAGED CARE, BILL REVIEW ONLY - 60 POINTS
LESS THAN 1% OF CLAIMS DENIED - 20 POINTS
CLAIMS STAFF ANNUAL TURNOVER MORE THAN 40% - 20 POINTS
UNABLE TO PRODUCE HISTORICAL DATA - 15 POINTS
PROGRAMS THEIR OWN COMPUTER SYSTEM FOR CLAIMS - 15 POINTS

6. CLIENT'S LOSS RATE TO PAYROLL HAS NOT DROPPED AT LEAST 30% FROM 1993 TO 1998. IF THE LOSS RATE HAS REMAINED STEADY SINCE 1991, THEY ARE MISSING OUT ON: FRAUD CONTROL, RETURN TO WORK, AND MANAGED CARE.
SCORING: LOSS RATE TO PAYROLL ROSE FROM 1992 TO 1997 - 100 POINTS
LOSS RATE DROPPED BY LESS THAN 20% - 60 POINTS
LOSS RATE DROPPED BY 20-30% - 30 POINTS

7. CLIENT HAS A LOW TOLERANCE FOR RISK OR REQUIRES BUDGETING CERTAINTY.
SCORING: DEPARTURES OF OVER 20% FROM WC BUDGET LEAVES CLIENT UNABLE TO PAY BILLS - 100 POINTS
DEPARTURES FROM BUDGET ARE A LARGE INTERNAL HEADACHE, BUT BILLS ARE PAID - 40 POINTS
DEPARTURES FROM BUDGET ARE A NUISANCE - 15 POINTS

8. CLIENT IS IN AN EXTREMELY COST-COMPETITIVE INDUSTRY. AT LEAST FOR THE MOMENT, GUARANTEED COST COVERAGE IS CHEAPER THAN SELF INSURANCE.
SCORING: CLIENT IN EXTREMELY COST-COMPETITIVE INDUSTRY SUCH AS GROCERY, OIL AND GAS - 40 POINTS
CLIENT IS IN MODERATELY COST-COMPETITIVE INDUSTRY - 15 POINTS

RESULTS: OVER 200 POINTS, LOOK AT GETTING OUT OF SELF INSURANCE SOON. IT IS UNLIKELY THAT DEEPER ANALYSIS WILL RESULT IN A RECOMMENDATION OF STAYING SELF INSURED. 150-200 POINTS, DEFINITELY INVESTIGATE GETTING OUT OF SELF INSURANCE. LARGE SAVINGS ARE LIKELY. 100-150 POINTS, A REVIEW OF SELF INSURANCE IS IN ORDER.
SAMPLE CLIENT SCORED: 335
RECOMMENDATION: START MARKETING, INSURANCE IS LIKELY TO SAVE 30%+ OF BUDGET

FIG. 21A

INPUTS:
CLIENT NAME — SAMPLE CLIENT
PUBLIC ENTITY, PRIVATE ENTITY, OR NOT FOR PROFIT? — PUBLIC ENTITY

| | SIMULATION FORMULA | | MEAN VALUE | MIN | MAX | STD DEV | DISTRIBUTION |
|---|---|---|---|---|---|---|---|
| INTEREST RATES & TAXES: | | | | | | | |
| LETTER OF CREDIT RATE | 1.00% | | 1.00% | N/A | N/A | N/A | N/A |
| COLLATERALIZATION RATE | 0.00% | OF OPEN CLAIMS | N/A | N/A | N/A | N/A | N/A |
| CLIENT'S COST OF CAPITAL | 8.00% | | 8.00% | 4.00% | 6.00% | 0.50% | LOGNORM |
| CARRIER'S COST OF CAPITAL | 6.00% | | 6.00% | 5.00% | 7.00% | 0.50% | LOGNORM |
| CLIENT'S FEDERAL TAX RATE | 0.00% | | | N/A | N/A | N/A | N/A |
| CLIENT'S STATE TAX RATE | 0.00% | | | N/A | N/A | N/A | N/A |
| CLIENT'S NET OVERALL TAX RATE | 0.00% | | | N/A | N/A | N/A | N/A |
| OPEN CLAIMS: | | | | | | | |
| TAIL POLICY EFFECTIVE DATE | 01/01/98 | | 01/01/98 | | | | |
| CURRENT LEGAL, ALE | 3.00% | % OF PURE LOSS | 3.00% | 1.00% | 5.00% | 1.00% | TLOGNORM |
| CURRENT INTERNAL ADMIN, UNALLOC | 3.00% | % OF PURE LOSS | 3.00% | 1.00% | 4.00% | 0.75% | TLOGNORM |
| CURRENT TPA | 15.00% | % OF PURE LOSS | 15.00% | 5.00% | 17.00% | 3.00% | TLOGNORM |
| SELF INSURER'S ASSESSMENT | 0.65% | % OF PURE LOSS | 0.65% | N/A | N/A | N/A | N/A |
| TAIL CLAIMS SAVINGS | 5.00% | % OF PURE LOSS | 5.00% | 5.00% | 20.00% | 3.75% | NORMAL |
| CARRIER LEGAL, ALE | 3.00% | % OF PURE LOSS | 3.00% | 1.00% | 5.00% | 1.00% | TLOGNORM |
| INTERNAL ADMIN IF INSD | 2.00% | % OF PURE LOSS | 2.00% | 1.10% | 2.50% | 0.35% | TLOGNORM |
| CARRIER CLAIMS HANDLING | 8.00% | % OF PURE LOSS | 8.00% | 5.00% | 10.00% | 1.25% | TLOGNORM |
| SELF INSURER'S ASSESSMENT, IF INSD | 0.65% | % OF PURE LOSS | 0.65% | N/A | N/A | N/A | N/A |
| TAIL CLAIMS PAYOUT PERIOD | 40 | YEARS | 40 | 30 | 50 | 5 | TRIANG |
| TAIL BROKER COMMISSION | 2.00% | OF NET PREM | 2.00% | 0.20% | 0.50% | 0.08% | TLOGNORM |
| TAIL CARRIER PROFIT | 3.00% | OF NET PREM | 3.00% | 1.00% | 4.00% | 0.75% | TLOGNORM |
| TAIL PREMIUM TAXES & ASSESSMENTS | 3.00% | OF NET PREM | 3.00% | 1.00% | 4.00% | 0.75% | TLOGNORM |
| TOTAL COMMISSION, PROFIT, TAXES | 8.15% | OF NET PREM | 8.15% | 2.21% | 8.68% | 1.58% | |

| | SIMULATION FORMULA | | MEAN VALUE | MIN | MAX | STD DEV | DISTRIBUTION |
|---|---|---|---|---|---|---|---|
| TAIL BOND EXPENSES: | | | | | | | |
| WILL BOND FINANCING BE USED FOR TAIL? | | | no | | | | |
| TAIL BOND PAYOUT PERIOD | 20 | YEARS | 20 | 15 | 30 | 5 | TRIANG |
| INVESTMENT BANKING | 0.50% | OF GROSS PREM | 0.50% | 0.40% | 1.00% | 0.15% | TRIANG |
| LEGAL | 0.10% | OF GROSS PREM | 0.10% | 0.08% | 0.13% | 0.01% | TRIANG |
| OTHER | 0.00% | OF GROSS PREM | 0.00% | 0.00% | 0.00% | 0.00% | TRIANG |
| TOTAL | 0.60% | OF GROSS PREM | 0.60% | 0.48% | 1.13% | 0.16% | TRIANG |
| NEW CLAIMS: | | | | | | | |
| NEW POLICY EFFECTIVE DATE | 01/01/98 | | 01/01/98 | | | | |
| CURRENT LEGAL, ALE | 3.00% | % OF PURE LOSS | 3.00% | 1.00% | 5.00% | 1.00% | TLOGNORM |
| CURRENT INTERNAL ADMIN, UNALLOC | 3.00% | % OF PURE LOSS | 3.00% | 0.00% | 4.00% | 1.00% | TLOGNORM |
| CURRENT TPA | 10.00% | % OF PURE LOSS | 10.00% | 5.00% | 12.00% | 1.75% | TLOGNORM |
| CURRENT EXCESS INSURANCE | 0.00% | | | | | | |
| SELF INSURER'S ASSESSMENT | 0.65% | % OF PURE LOSS | 0.65% | N/A | N/A | N/A | N/A |
| NEW YEAR CLAIMS SAVINGS | 30.00% | % OF PURE LOSS | 30.00% | 10.00% | 45.00% | 8.75% | NORMAL |
| CARRIER LEGAL, ALE | 3.00% | % OF PURE LOSS | 3.00% | 1.00% | 5.00% | 1.00% | TLOGNORM |
| INTERNAL ADMIN IF INSURED | 2.00% | % OF PURE LOSS | 2.00% | 0.50% | 2.00% | 0.38% | TLOGNORM |
| CARRIER CLAIMS ADMIN | 8.00% | % OF PURE LOSS | 8.00% | 5.00% | 10.00% | 1.25% | TLOGNORM |
| NEW CLAIMS PAYOUT PERIOD | 40 | YEARS | 40 | 30 | 50 | | |
| NEW COMMISSION | 3.00% | OF NET PREM | 3.00% | 0.50% | 1.50% | 0.25% | TLOGNORM |
| NEW CARRIER PROFIT | 3.08% | OF NET PREM | 3.00% | 2.00% | 5.00% | 0.75% | TLOGNORM |
| NEW TAXES | 3.00% | OF NET PREM | 3.00% | 0.50% | 1.50% | 0.25% | TLOGNORM |
| TOTAL COMMISSION, PROFIT, TAXES | 9.26% | OF NET PREM | 9.18% | 3.01% | 8.10% | 1.25% | |
| NEW BOND EXPENSES: | | | | | | | |
| WILL BOND FINANCING BE USED FOR NEW CLAIMS? | | | NO | | | | |
| NEW CLAIMS BONDS PERIOD | 20 | YEARS | 20 | 4 | 19 | | |
| INVESTMENT BANKING | 0.50% | OF GROSS PREM | 0.50% | 0.40% | 1.00% | 0.15% | |
| LEGAL | 0.10% | OF GROSS PREM | 0.10% | 0.08% | 0.13% | 0.01% | |
| OTHER | 0.00% | OF GROSS PREM | 0.00% | 0.00% | 0.00% | 0.00% | |
| TOTAL | 0.60% | OF GROSS PREM | 0.60% | 0.48% | 1.13% | 0.16% | |

FIG. 22A

CLIENT'S ABILITY TO RETAIN RISK:

PRIVATE ENTITIES:
LAST YEAR'S PRETAX INCOME
TOTAL OF LAST 3 YEARS PRETAX INCOME
REVENUE
WORKING CAPITAL
EQUITY

PUBLIC ENTITIES:
LAST YEAR'S ANNUAL REVENUE         12,000,000,000
LAST YEAR'S ANNUAL SELF INSURANCE OR INSURANCE BUDGET    150,000,000
IS THERE A CASH FUND TO COVER RESERVES FOR CLAIMS, HOW MUCH?   10,000,000
IS THERE PER OCCURRENCE REINSURANCE? ABOVE WHAT LIMIT?    NO

NOT FOR PROFITS:
LAST YEAR'S ANNUAL REVENUE
LAST YEAR'S ANNUAL SELF INSURANCE OR INSURANCE BUDGET
WORKING CAPITAL
IS THERE PER OCCURRENCE REINSURANCE? ABOVE WHAT LIMIT?

LEGAL AND ADMINISTRATIVE REQUIREMENTS:

| Question | Answer |
|---|---|
| IS THE CLIENT REQUIRED TO PURCHASE INSURANCE (LAW, REGULATION, BANK, BOND, LEASE)? | NO |
| IS THE CLIENT PROHIBITED FROM PURCHASING INSURANCE FROM PRIVATE CARRIERS FOR THIS RISK? | NO |
| IS THE CLIENT NEAR THEIR BORROWING LIMIT? | YES |
| IS THE CLIENT NORMALLY REQUIRED TO OBTAIN VOTER APPROVAL FOR NEW BOND FINANCING? | |
| WILL THE CARRIER PREMIUM FINANCE THE TRANSACTION? | YES |
| HOW LONG A TERM WILL THE CARRIER FINANCE? | 2 YEARS |
| WHAT IS THE CLIENT'S RETURN ON INVESTMENT? | N/A |
| WHAT IS THE CLIENT'S BANK BORROWING COST? | N/A |
| WHAT IS THE CLIENT'S LONG TERM DEBT RATING? | S&P A- |
| WHAT IS THE CLIENT'S LIKELY BOND INTEREST RATE? | 5.00% |
| HAS THE CLIENT PURCHASED BOND INSURANCE BEFORE? | YES |
| DO THEY EXPECT TO PURCHASE BOND INSURANCE THIS TIME? | YES |

IS THE CLIENT'S PREMIUM FINANCE OBJECTIVE TO:

| | |
|---|---|
| PAY CASH | |
| INTEREST ARBITRAGE, TAKE LONGER TO PAY IF PREMIUM FINANCE INTEREST RATE IS LOWER | |
| STAY AT A PREDETERMINED CONSTANT BUDGET LEVEL, IN $ | |
| STAY AT A PREDETERMINED CONSTANT BUDGET LEVEL, % SAVINGS OFF OF PRIOR BUDGET | 85.00% |
| STAY AT A CONSTANT % OF WHAT WOULD HAVE BEEN PAID UNDER SELF INSURANCE | |
| PAY OFF INS. PREMIUM AS SOON AS POSSIBLE, NEVER PAYING MORE THAN A CONSTANT AMOUNT | |
| PAY OFF INS. PREMIUM AS SOON AS POSSIBLE, NEVER PAYING MORE THAN FORECAST FOR SELF INS. | |
| PAY OFF INSURANCE PREMIUM EQUALLY OVER A FIXED NUMBER OF YEARS | |
| DEFER PREMIUM FINANCE PMTS AS LONG AS POSSIBLE, THEN CONSTANT BUDGET (NOT RECOMMENDED) | |
| TAKE ALL SAVINGS FROM INS. IN UP FRONT CASH FLOW, THEN MATCH ESTIMATED SELF INSURANCE PMTS. | |
| DOES THE CLIENT ALSO WANT A MAXIMUM PREMIUM FINANCE TERM? HOW MANY YEARS? | 10 |

FIG. 23

LOSS EXPERIENCE FROM SELF INSURER'S REPORT
LOSSES VALUED: 12/31/96

| | RETENTION | TOTAL COUNT | OPEN COUNT | MEDICAL COUNT | INDEMNITY COUNT | INCURRED INDEMNITY | INCURRED MEDICAL | PAID INDEMNITY | PAID MEDICAL | CASE RESERVES |
|---|---|---|---|---|---|---|---|---|---|---|
| PRIOR YRS | | | 3,899 | | | | | | | 142,902,508 |
| 1991 | 2,000,000 | 14,954 | | | | 71,477,360 | 50,281,677 | 43,810,176 | 38,119,778 | 39,829,083 |
| 1992 | 2,000,000 | 15,998 | 1,481 | | | 68,984,110 | 46,404,580 | 42,390,700 | 35,277,580 | 37,720,410 |
| 1993 | 2,000,000 | 15,256 | 2,019 | | | 65,341,660 | 44,548,026 | 36,666,848 | 30,251,631 | 42,971,207 |
| 1994 | 2,000,000 | 13,393 | 2,672 | | | 45,732,827 | 34,577,635 | 15,594,153 | 15,383,083 | 49,333,226 |
| 1995 | 2,000,000 | 11,950 | 6,374 | 5,006 | 6,944 | 39,283,879 | 40,418,017 | 5,872,171 | 9,650,975 | 64,178,750 |
| TOTAL | | 71,551 | 16,445 | | | 290,819,836 | 216,229,935 | 144,334,048 | 128,683,047 | 376,935,184 |

FIG. 27A

SAMPLE CLIENT
LEVEL BOND PAYOUT PATTERN CHOICES

| T YEAR | | 1 | 2 | 3 | 4 | 5 | 6 | 7 | 8 | 9 | 10 | Total |
|---|---|---|---|---|---|---|---|---|---|---|---|---|
| A INTEREST RATE | | 5.00% | 5.10% | 5.20% | 5.30% | 5.40% | 5.50% | 5.60% | 5.70% | 5.80% | 5.90% | |
| B PV FACTOR | $B_n = B_{n-1}/(1+A_n)$ | 95.24% | 90.62% | 86.14% | 81.80% | 77.61% | 73.56% | 69.66% | 65.91% | 62.29% | 58.82% | |
| C PRINCIPAL | 700,000 | | | | | | | | | | | |
| D LEVEL FOR | 5 years | | | | | | | | | | | |
| E REQUESTED PMT | 150,000 | | | | | | | | | | | |

REQUESTED PAYMENTS

| | | 1 | 2 | 3 | 4 | 5 | 6 | 7 | 8 | 9 | 10 | Total |
|---|---|---|---|---|---|---|---|---|---|---|---|---|
| F PAYMENT | | 150,000 | 150,000 | 150,000 | 150,000 | 150,000 | 0 | 0 | 0 | 0 | 0 | 750,000 |
| G PV OF PAYMENT | $G_1 = F_1 * B_1$ | 142,857 | 135,925 | 129,206 | 122,703 | 116,416 | 0 | 0 | 0 | 0 | 0 | 647,108 |
| H CUMULATIVE PV | $H = SUM(G_1, G_2,...)$ | 142,857 | 278,782 | 407,988 | 530,691 | 647,108 | 647,108 | 647,108 | 647,108 | 647,108 | 647,108 | |
| I DURATION | | 0.166 | 0.368 | 0.549 | 0.711 | 0.855 | | | | | | 2.65 |

METHOD A: ADJUSTING PAYMENT LEVEL
LEVEL PAYMENTS FOR 5 YEARS

| | | 1 | 2 | 3 | 4 | 5 | 6 | 7 | 8 | 9 | 10 | Total |
|---|---|---|---|---|---|---|---|---|---|---|---|---|
| J PAYMENT | $J_1 = G_1*E/SUM(G)$ | 162,260 | 162,260 | 162,260 | 162,260 | 162,260 | 0 | 0 | 0 | 0 | 0 | 811,302 |
| K PV OF PAYMENT | $K_1 = J_1 * B_1$ | 154,534 | 147,035 | 139,767 | 132,732 | 125,932 | 0 | 0 | 0 | 0 | 0 | 700,000 |
| L CUMULATIVE PV | $L = SUM(K_1, K_2,...)$ | 154,534 | 301,569 | 441,336 | 574,068 | 700,000 | 700,000 | 700,000 | 700,000 | 700,000 | 700,000 | |
| M DURATION | | 0.166 | 0.368 | 0.549 | 0.711 | 0.855 | | | | | | 2.65 |

METHOD B: TRUNCATING/ADDING PAYMENTS
PAYMENTS CONSTANT AT $150000

| | | 1 | 2 | 3 | 4 | 5 | 6 | 7 | 8 | 9 | 10 | Total |
|---|---|---|---|---|---|---|---|---|---|---|---|---|
| N PAYMENT | | 150,000 | 150,000 | 150,000 | 150,000 | 150,000 | 71,898 | 0 | 0 | 0 | 0 | 821,898 |
| O PV OF PAYMENT | $O_1 = N_1 * C_1$ | 142,857 | 135,925 | 129,206 | 122,703 | 116,416 | 52,892 | 0 | 0 | 0 | 0 | 700,000 |
| P CUMULATIVE PV | $P = SUM(O_1, O_2,...)$ | 142,857 | 278,782 | 407,988 | 530,691 | 647,108 | 700,000 | 700,000 | 700,000 | 700,000 | 700,000 | |
| Q DURATION | | 0.153 | 0.34 | 0.508 | 0.657 | 0.79 | 0.434 | | | | | 2.88 |

FIG. 27B

SAMPLE CLIENT
MAXIMUM DEFERAL BOND PAYOUT PATTERN CHOICES

| T YEAR | | 1 | 2 | 3 | 4 | 5 | 6 | 7 | 8 | 9 | 10 | TOTAL |
|---|---|---|---|---|---|---|---|---|---|---|---|---|
| A INTEREST RATE | | 5.00% | 5.10% | 5.20% | 5.30% | 5.40% | 5.50% | 5.60% | 5.70% | 5.80% | 5.90% | |
| B PV FACTOR | $B_n = B_{n-1}/(1+A_n)$ | 95.24% | 90.62% | 86.14% | 81.80% | 77.61% | 73.56% | 69.66% | 65.91% | 62.29% | 58.82% | |
| C PRINCIPAL | 700,000 | | | | | | | | | | | |
| D LEVEL FOR | MINIMIZE | | | | | | | | | | | |
| E REQ'D PMT = SI CASH FLOWS | | 140,000 | 280,000 | 180,000 | 130,000 | 100,000 | 70,000 | 40,000 | 30,000 | 20,000 | 10,000 | 1,000,000 |
| REQUESTED PAYMENTS | | | | | | | | | | | | |
| F PAYMENT | | 140,000 | 280,000 | 180,000 | 130,000 | 100,000 | 70,000 | 40,000 | 30,000 | 20,000 | 10,000 | 1,000,000 |
| G PV OF PAYMENT | $G_1 = F_1 * B_1$ | 133,333 | 253,727 | 155,047 | 106,343 | 77,611 | 51,495 | 27,866 | 19,772 | 12,459 | 5,882 | 843,535 |
| H CUMULATIVE PV | $H=SUM(G_1, G_2,...)$ | 133,333 | 387,060 | 542,107 | 648,450 | 726,061 | 777,556 | 805,422 | 825,194 | 837,653 | 843,535 | |
| I DURATION | | 0.119 | 0.526 | 0.505 | 0.473 | 0.437 | 0.351 | 0.223 | 0.182 | 0.129 | 0.068 | 3.01 |

METHOD C: TRUNCATING/ADDING PAYMENTS

| | | 1 | 2 | 3 | 4 | 5 | 6 | 7 | 8 | 9 | 10 | TOTAL |
|---|---|---|---|---|---|---|---|---|---|---|---|---|
| J PAYMENT | $J_1 = G_1 * E/SUM(G)$ | 0 | 268,742 | 180,000 | 130,000 | 100,000 | 70,000 | 40,000 | 30,000 | 20,000 | 10,000 | 848,742 |
| K PV OF PAYMENT | $K_1 = J_1 * B_1$ | 0 | 243,525 | 155,047 | 106,343 | 77,611 | 51,495 | 27,866 | 19,772 | 12,459 | 5,882 | 700,000 |
| L CUMULATIVE PV | $L=SUM(K_1, K_2,...)$ | 0 | 243,525 | 398,572 | 504,915 | 582,526 | 634,021 | 661,887 | 681,659 | 694,118 | 700,000 | |
| M DURATION | | 0.000 | 0.609 | 0.609 | 0.570 | 0.527 | 0.423 | 0.269 | 0.219 | 0.156 | 0.082 | 3.46 |
| N PRINCIPAL MINUS CUMULATIVE PV | | 700,000 | 700,000 | 456,475 | 301,428 | 195,085 | 117,474 | 65,979 | 38,113 | 18,341 | 5,882 | |

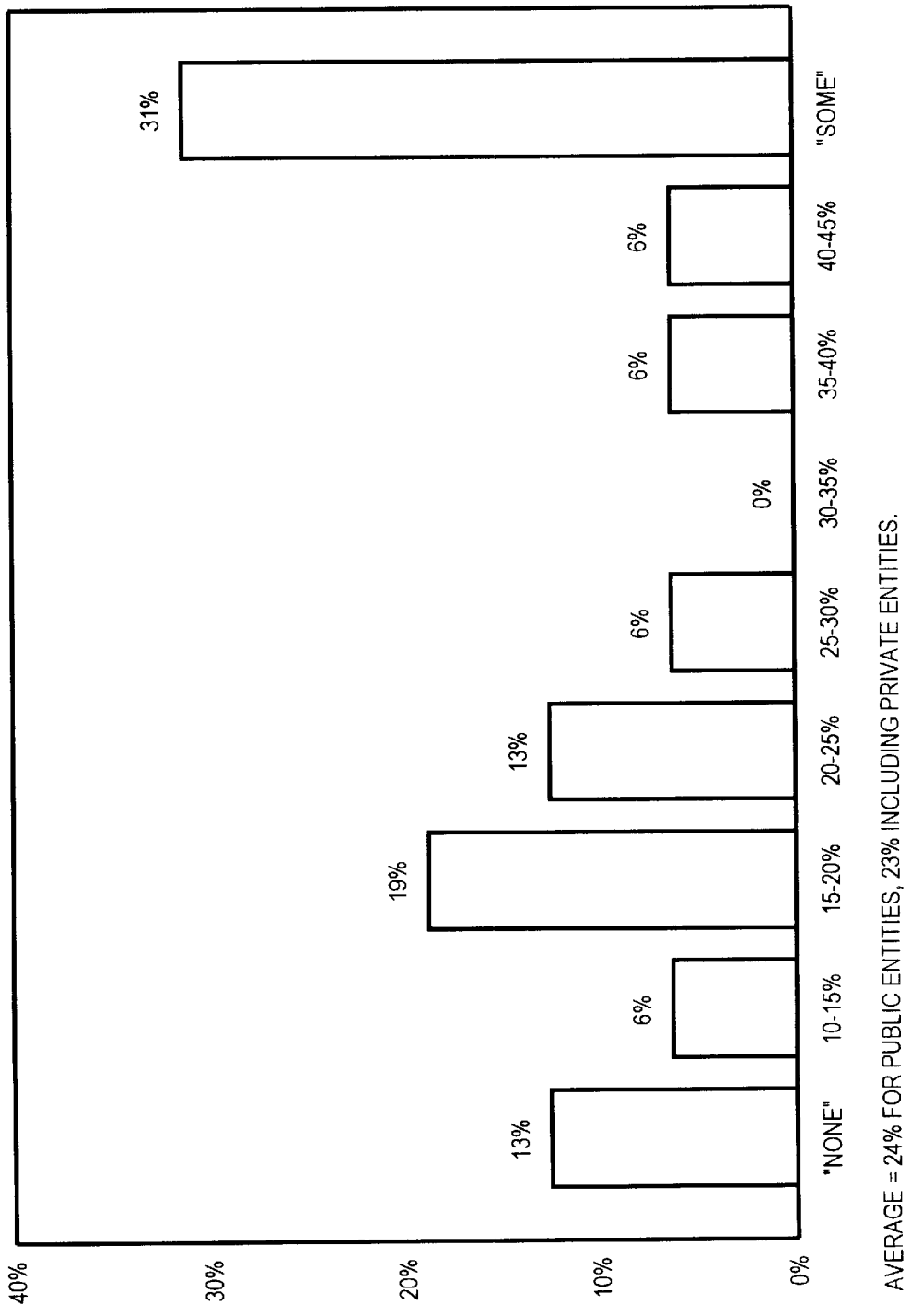

SYSTEM AND METHOD FOR PREDICTING, COMPARING AND PRESENTING THE COST OF SELF INSURANCE VERSUS INSURANCE AND FOR CREATING BOND FINANCING WHEN ADVANTAGEOUS

BACKGROUND OF THE INVENTION

1. Field of the Invention

The present invention relates to a system and method for predicting, comparing and presenting the cost of a liability versus insurance and, more particularly, a system and method for predicting, comparing and presenting the cost of self insurance versus insurance, and for creating bond financing when advantageous.

2. Description of the Related Art

Insurance and Self Insurance.

In recent years, changes in law, claims handling, managed health care and computers have changed the economics of self insuring versus insuring liabilities. Numerous public and private entities are reviewing the cost and effectiveness of their current insurance and self insurance programs.

In many states, private insurers have historically been prohibited from writing insurance coverage for public entities. These prohibitions most often applied to workers compensation coverage. Recently several states have changed these laws, allowing many public entities to choose between self insurance and private coverage for the first time.

Analysis of insurance and self insurance alternatives has tended to fall into two groups: rules of thumb applied by insurance brokers and carriers, and detailed actuarial analysis performed by actuaries or accounting firms.

Using rules of thumb is a quick and easy method of estimating insurance premiums or ultimate self insurance cost. However, it tends to make similar predictions for very different clients and can vary from actual insurance quotes or self insurance costs by over 50%. Since a cost comparison focuses on the difference between two cost projections, small errors in either projection can lead the client to mistakenly pursue the more expensive course of action.

Detailed actuarial analysis is more accurate and more tailored to the individual client. However, actuaries will generally analyze insurance quotes which are complete and already offered; they will seldom try to predict pricing or assist in the negotiation process. Thus, considerable time, money and effort is expended in marketing, negotiation and analysis before any conclusions or recommendations are reached.

Prior to the present invention, no known system has been able to take into account the large number of input variables used by the present invention to analyze the cost of insurance and self insurance alternatives for property and casualty coverages. These input variables include: client's tax rate, client's borrowing rate, carriers' returns on investments, payout pattern under self insurance, payout pattern under insurance, claims audit data, industry loss data, industry loss development patterns, self insurer fees, premium taxes, carrier administrative expenses, carrier profit, broker commissions, consulting fees, claims handling fees, internal administration costs, legal fees, premium finance charges, client's debt or borrowing limitations, client's debt rating, regulatory requirements regarding the client's purchase of insurance, client's budget constraints, and client's financing objectives.

Clients switching from self insurance to insurance typically require a large additional amount of cash in the first years of insurance. Completely paying off old self insured liabilities takes years, from a low of 3–4 years for property liability, to as much as 60 years for workers compensation. During this 3 to 60 year period, the client is paying for both insurance premiums and old self insured losses.

Problems With Premium Financing.

For many clients, particularly public entities with tight budgets, short term cash flow constraints have prevented moving to an insured program which is much less expensive in the long run. Carrier premium financing beyond three years is rare. Though many claims will take over 10 years to pay completely, no carrier-sponsored premium financing lasts that long.

Credit risk is a primary reason why insurance companies are so reluctant to finance over longer periods of time. If an insured misses payments during the policy term, an insurance carrier can cancel the remainder of the policy. If an insured misses payments after the policy term is over, there is no remaining coverage for the carrier to cancel; the insurance carrier must continue to pay claims while trying to collect the delinquent premium finance payments. Most premium finance contracts which extend beyond the policy term require excellent credit, collateral, or both. Premium finance companies who have not obtained collateral find themselves far down the line of creditors when a borrower enters bankruptcy proceedings.

Deductible plans are one method which has become popular for allowing insureds to pay for liabilities over many years. In a typical deductible plan, an insurance carrier pays all losses for the client and then seeks reimbursement for payment up to a specified amount per claim. Thus, Client X might have a deductible insurance policy with Insurance Carrier Y where Carrier Y pays all losses and seek reimbursement for the first $250,000 per claim from Client X.

Deductible plans have several drawbacks. The most prominent drawback is that while the client is able to spread payment over many years, they assume the risk that losses will be worse than anticipated or pay out faster than anticipated. These risk results in problems very similar to those encountered in self insurance: the client may have difficulty making large, unexpected loss payments; the client may reorganize or sell parts of its operations and find it very difficult to allocate costs or get reimbursement from departments or subsidiaries; uncertain liabilities make it more difficult to sell a portion of a company or to privatize a portion of a public entity; often costs paid under deductible plans are charged back years later to a department whose management did not cause and cannot control the cost of a particular claim; and, insurance carriers usually administer deductible plans for their clients, in effect the insurance company is able to write checks from the client's bank account.

Insurance regulators in most states require carriers to set aside reserves for amounts outstanding under premium financing and deductible plans, unless specified types of collateral are used. These reserves are applicable even for clients whose long-term credit is rated AAA by Standard & Poor's (S&P) or Aaa by Moody's. In many states, collateral from the insured is required in all cases.

Long term financing for guaranteed cost insurance would give clients the best of both worlds, a long term payout and guaranteed cash flows. Unfortunately, current premium financing methods make long term financing difficult. As mentioned above, moving from self insurance to insurance normally requires an outlay of more cash in the first few years than staying self insured. Clients without enough cash to cover the transition who cannot obtain desirable premium financing have two primary options: bank financing and bond financing.

Bond financing is a particularly attractive way for public entities to finance long term liabilities. However, to date, no bonds have been issued to pay for insurance premiums for property, casualty, or employee benefit premiums.

Bonds have been issued to pay for unfunded pension liabilities (see "Pension Bonds May Be Worth The Risk", American City & County, vol 111, no. 6, p. 6, May 1996). These bonds pay off an unfunded pension liability over many years and typically pay taxable interest even if issued by municipalities.

Pension bonds primary purpose is interest rate arbitrage. Interest paid to the bondholder on pension bonds is typically taxable. Even taxable municipal bonds typically pay interest rates below the investment returns obtained by pension funds. The difference between the pension fund's investment yield and the interest rate on the bond reduces the municipality's pension cost. The municipality is betting that the pension fund will earn a higher return than the interest on the bonds; it is entirely possible that the pension fund will earn a lower return than the bond interest.

A $1 billion bond, according to the present invention, which would allow the County of Los Angeles to move from workers compensation self insurance to insurance would likely save the County over $500 million dollars as a result of insuring this liability and using bond financing for this purpose. Such a bond is expected to yield tax exempt interest, unlike pension bonds, and further reduce the County's cost. The bond will not be subject to the County's borrowing limit, and will not require voter approval. Since this invention will save numerous public entities and other employers large sums of money, it is clearly in the national interest.

Accordingly, it is an object of the present invention to provide a method of insuring and financing currently self insured liabilities, while taking into account constraints imposed by laws, regulations, leases, outstanding bond issues and budgets.

It is another object to provide a system for creating long term premium financing which is tailored to the needs of a particular client.

It is another object to provide a system and method which predicts the cash flows which an insurance company would encounter in insuring an entity's liabilities, using data on: the entity's recent loss experience, any actuarial studies of losses, industry loss experience, expenses for handling losses, effectiveness in handling losses, and the insurance company's expected savings from efficiencies.

It is another object to provide a system and method for using expected cash flow data for an insurer, along with the insurer's administrative fees and interest rate for discounting, to predict premiums for insuring currently self insured or uninsured liabilities.

It is another object to provide a system and method for calculating both total savings and savings by budget year obtained by insuring the formerly uninsured or self insured liabilities of the employer.

It is another object to provide a system and method for comparing the costs, regulatory feasibility, and budget feasibility of paying insurance premium using: cash, carrier premium financing, bank or finance company premium financing, and bond issuance.

It is another object to provide a system and method for calculating the payment patterns for financing which fit the employer's desire to: either make premium finance payments at a percentage of the current annual budget until the premium liability is extinguished, or make premium finance payments at a percentage of what expected future loss and expense payments would have been under self insurance or uninsurance.

It is another object to allow employers to choose an arbitrary payment pattern for premium financing, and to adjust either the length of financing or individual payments until the present value of the payment stream matches the premium being financed.

It is another object to provide a system and method for public entities to save substantial amounts of money by taking advantage of the spread between the tax exempt financing rates available to public entities and the taxable rate of return on insurance carriers' investments which will be used for calculating the premium(s) charged to the public entity.

It is another object is to automatically provide an estimate of ultimate losses and loss payout patterns for a self insured or uninsured liability using industry actuarial data and the public entity's current loss evaluation, even if the client does not have a recent actuarial analysis or has not kept historical loss data.

It is another object to reduce the time required to market insurance coverage by providing expected loss, expense, payment patterns, discounting for the time value of money and premiums to insurance carriers.

It is another object to evaluate the loss rates of the employer versus similar employers and to use this data in estimating the savings available by insuring the liability.

It is another object to provide output which allows the governing body of the employer to easily see the total savings, present value of savings, and annual budget savings obtained by insuring a currently uninsured or self insured liability.

It is another object to provide analysis and output which can be used in legal validation proceedings which are sometimes required for a public entity to finance premiums over multiple years.

It is another object to allow public entities which have not set aside funds to pay for outstanding uninsured or self insured liabilities to insure these claims for a lower total cost and a lower expenditure in each budget year.

It is another object to provide public entities with a financing mechanism which guarantees cash flows for property and casualty liabilities.

It is another object to facilitate sale or separation of a portion of a public entity, such as an airport authority or municipal utility, by insuring currently uninsured or self insured liabilities and providing the separated entity a "fresh start" with respect to these liabilities.

It is another objective to provide a system and method which for the first time uses bond financing for insurance premiums which cover property and casualty risks of public entities.

It is another object to calculate premium financing cash flows which fit accounting and cash flow objectives of the company or public entity.

It is another objective to reduce or eliminate an insurance company's credit risk when employers use long-term premium financing.

It is another objective to reduce interest rate risk for an insurance company when employers use premium financing.

It is another objective to allow an entity to transfer existing claims and liabilities to an insurance carrier.

It is another objective to use bond financing for insurance premiums in cases where a debt ceiling would otherwise prevent new bond issuance, by having the liabilities declared a "debt imposed by law" and replacing this debt with the smaller and more certain payment stream of the bond-financed insurance premium.

SUMMARY OF THE INVENTION

In accordance with an exemplary preferred embodiment of the present invention, a system for predicting, comparing, and presenting a cost of self insurance versus a cost of insurance employing a computer, a video monitor, a printer, and at least one user input mechanism includes a computer executable program or programs adapted to: estimate a cost of self insurance by processing self insurance information; estimate a cost of insurance and savings realized by replacing self insurance with insurance by processing insurance information; adjust the savings where the cost of self insurance is not equal to an average cost of self insurance; generate and provide, to the video monitor, data usable by the video monitor to generate at least one visual display representing a preliminary evaluation questionnaire; enable a user of the computer to input the insurance information with the user input mechanism at the preliminary evaluation questionnaire; generate data usable by the computer to provide an indication of the cost of a liability, the cost of insurance, and the savings; determine a plurality of payout patterns for a premium financing mechanism employed to pay for the insurance; and generate data usable by the computer to provide an indication of the payout pattern.

In another aspect of the present invention, a method for predicting, comparing, and presenting a cost of a liability versus a cost of insurance includes the steps of: estimating a cost of a liability by processing liability information; estimating a cost of insurance and savings realized by replacing the liability with insurance by processing insurance information; adjusting the savings where the cost of a liability is not equal to an average cost of the liability; providing an indication of the cost of a liability, the cost of insurance, and the savings; determining a payout pattern for a premium financing mechanism employed to pay for the insurance; and providing an indication of the payout pattern.

In another aspect of the present invention, a method for predicting, comparing, and presenting a cost of self insurance versus a cost of insurance includes the steps of: estimating a cost of self insurance by processing self insurance information; estimating a cost of insurance and savings realized by replacing self insurance with insurance by processing insurance information; and estimating a cost of a premium financing mechanism proposed to pay for said insurance in consideration of regulatory and budget constraints.

In another aspect of the present invention, a system for predicting, comparing, and presenting a cost of self insurance versus a cost of insurance utilizing a computer, a video monitor, a printer, and at least one user input mechanism includes a computer executable program adapted to: estimate a cost of self insurance by processing self insurance information; and estimate a cost of insurance and savings realized by replacing self insurance with insurance by processing insurance information.

In another aspect of the present invention, a system for analyzing data and generating documents pertaining to a premium financing mechanism includes a computer executable program or programs adapted to: access estimate data of a cost of self insurance, a cost of insurance, and savings realized by replacing self insurance with insurance; access risk data pertaining to a transaction wherein a bond is employed to pay for the insurance to replace the self insurance; process the estimate data to provide data usable by a printer to generate a document pertaining to a bond proposed to pay for the insurance; and process the risk data to provide data usable by a printer to generate documents pertaining to an issuance of the bond.

In another aspect of the present invention, a method for analyzing data and generating documents pertaining to a premium financing mechanism employing a computer, a video monitor, a printer, and at least one user input mechanism includes the steps of: employing the computer to access estimate data of a cost of a liability, a cost of insurance, and savings realized by replacing the liability with insurance; and prompting the computer with the user input mechanism to process the estimate data to generate with the printer a document pertaining to a premium financing mechanism proposed to pay for the insurance.

In another aspect of the present invention, a method for analyzing data and generating documents pertaining to a premium financing mechanism employing a computer, a video monitor, a printer, and at least one user input mechanism includes the steps of: employing the computer to access estimate data of a cost of a liability, a cost of insurance, and savings realized by replacing the liability with insurance; and prompting the computer with the user input mechanism to process the estimate data to generate a computer-readable data file pertaining to a premium financing mechanism proposed to pay for the insurance.

In another aspect of the present invention, a system for analyzing data and generating documents pertaining to a premium financing mechanism includes a computer executable program adapted to: access and process risk data pertaining to a transaction wherein a premium financing mechanism is employed to pay for insurance to replace self insurance; and process the risk data to generate a data file usable by a printer to generate documents pertaining to the premium financing mechanism.

In another aspect of the present invention, a system for analyzing data and generating documents pertaining to a premium financing mechanism includes a computer executable program adapted to: access risk data pertaining to a transaction wherein a premium financing mechanism is employed to pay for insurance to replace self insurance; and process the risk data to generate a computer-readable data file pertaining to documents for the premium financing mechanism.

In another aspect of the present invention, a method for replacing self insurance with insurance employing a premium financing mechanism includes the step of: making a payment on a premium financing mechanism created pursuant to a transaction where self insurance was replaced with insurance, with said insurance being paid for by the premium financing mechanism, the payment being part of a payout pattern determined in consideration of an estimated payout of claims costs and expenses.

In another aspect of the present invention, a method for replacing self insurance with insurance employing a premium financing mechanism includes the steps of: employing a computer to create documentation of costs and savings associated with a change from self insurance to insurance when the insurance is paid for by a premium financing mechanism; providing the documentation to an outside party or a regulatory body to obtain an approval for the premium financing mechanism; and paying a premium of the insurance with the premium financing mechanism.

In another aspect of the present invention, a method for replacing self insurance with insurance employing a premium financing mechanism includes the steps of: employing a computer to create documentation of costs and savings associated with a subsequent insurance policy issued subsequent to and relating to a transaction where self insurance was replace with insurance, with the subsequent insurance policy being paid for by a premium financing mechanism; providing the documentation to an outside party or a regulatory body to obtain an approval for the premium financing mechanism; and paying a premium of the subsequent insurance policy with the premium financing mechanism.

In another aspect of the present invention, a method for replacing self insurance with insurance employing a premium financing mechanism includes the step of: issuing a bond created pursuant to a transaction where self insurance was replaced with insurance which was paid for by the bond, wherein payments of the bond are part of a payout pattern determined in consideration of an estimated payout of claims costs and expenses.

In another aspect of the present invention, a method for finding employers for whom leaving self insurance may be desirable includes the steps of: determining whether a state allows a transaction where private carriers insure a particular type of employer for a particular type of risk; determining whether a particular premium financing mechanism is allowed in the state for the particular type of employer for the particular type of risk; and estimating savings of a plurality of employers for whom the transaction is allowed based on a size, an industry, and a state of each employer.

In another aspect of the present invention, a method for determining whether investigating leaving self insurance may be desirable includes the steps of: determining whether a state allows private carriers to insure a particular type of employer operating within the state for a particular type of risk in the state; determining whether a particular premium financing mechanism is allowed in the state for the particular type of employer for the particular type of risk; obtaining loss, exposure and expense data on a particular employer and on a self insurance program of the particular employer; and comparing the loss, exposure, and expense data on the particular employer with loss, exposure, and expense data on other employers of the particular type.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 3 is a listing of outputs generated by municipal bond software module of the present invention and likely users for each output;

FIG. 4 is an exemplary output chart showing the undiscounted cost of self insurance versus insurance;

FIG. 5 is an exemplary output table summarizing components of total projected costs for insurance and self insurance;

FIG. 6 is an exemplary output graph predicting how costs of insurance (Bond Pmt for FYE 1997 Premium plus Internal Admin) and self insurance (Actuary's Fcst, FYE 1997 Accidents) will be paid over time for accidents occurring during a particular year;

FIG. 7 is an exemplary output table showing projected payments by budget year for self insurance and insurance;

FIG. 8 is an exemplary simulation output graph showing the likelihood that an insurance carrier will offer a particular insurance premium, given that formal quotes have not yet been solicited;

FIG. 10 is an output table showing the exemplary factors which cause variation in predicted savings of moving from self insurance to insurance, given that formal quotes have not yet been solicited;

FIG. 11 is an exemplary simulation output graph showing predicted cash flows by year for self insurance and insurance, after formal quotes have been solicited, but before financing arrangements are final;

FIG. 12 is an exemplary simulation output table showing predicted cash flows by year for self insurance and insurance, after formal quotes have been solicited, but before financing arrangements are final;

FIG. 13 is an output table showing the exemplary factors which cause variation in predicted savings of moving from self insurance to insurance, after formal quotes have been solicited, but before financing arrangements are final;

FIGS. 14A–14E are exemplary output graphs comparing the forecast payments under self insurance to payments made using different insurance premium cash flows: an upfront savings payout pattern, a level payout pattern, an arbitrary payout pattern, a fixed amount of savings payout pattern, and a fixed percentage savings payment pattern, respectively;

FIG. 15 is a sample output graph showing cost components of insurance by accident year and total expenditures by budget year and a total expenditure by budget year for self insurance (Actuary's Self Ins. Fcst);

FIG. 18 is an exemplary table from a bond Official Statement;

FIG. 19 is Part 1 of a preliminary evaluation questionnaire generated at the video monitor of an exemplary preferred system to prompt a user of the system to input insurance information via a set of background questions regarding current practices of a self insured program for a private sector employer;

FIG. 20 is Part 2 of the preliminary evaluation questionnaire and includes a set of background questions regarding current practices of any self insured employer;

FIG. 21 is a printout of third exemplary input page for information relating to open claims, new claims and bond expenses to be processed by the computer executable program of the present invention;

FIG. 22 is a printout of a fourth exemplary input page for information relating to a client's ability to retain risk and legal and administrative requirements to be processed by the computer executable program of the present invention;

FIG. 23 is a printout of a fifth exemplary input page for information relating to self insured loss experience to be processed by the computer executable program of the present invention;

FIGS. 27A and 27B show maximum deferral bond payout pattern and level bond payout pattern calculations, respectively; and FIG. 28 is an exemplary graph produced by grouping together California municipalities who had left self insurance for insurance.

DETAILED DESCRIPTION OF THE PREFERRED EMBODIMENTS

The exemplary preferred embodiment is particularly adapted to predict, compare, and present the costs of self insurance versus insurance for workers compensation for a public entity, and to produce outputs used for financing the insurance premium with bonds.

Major Inputs and Outputs

Figure 1:
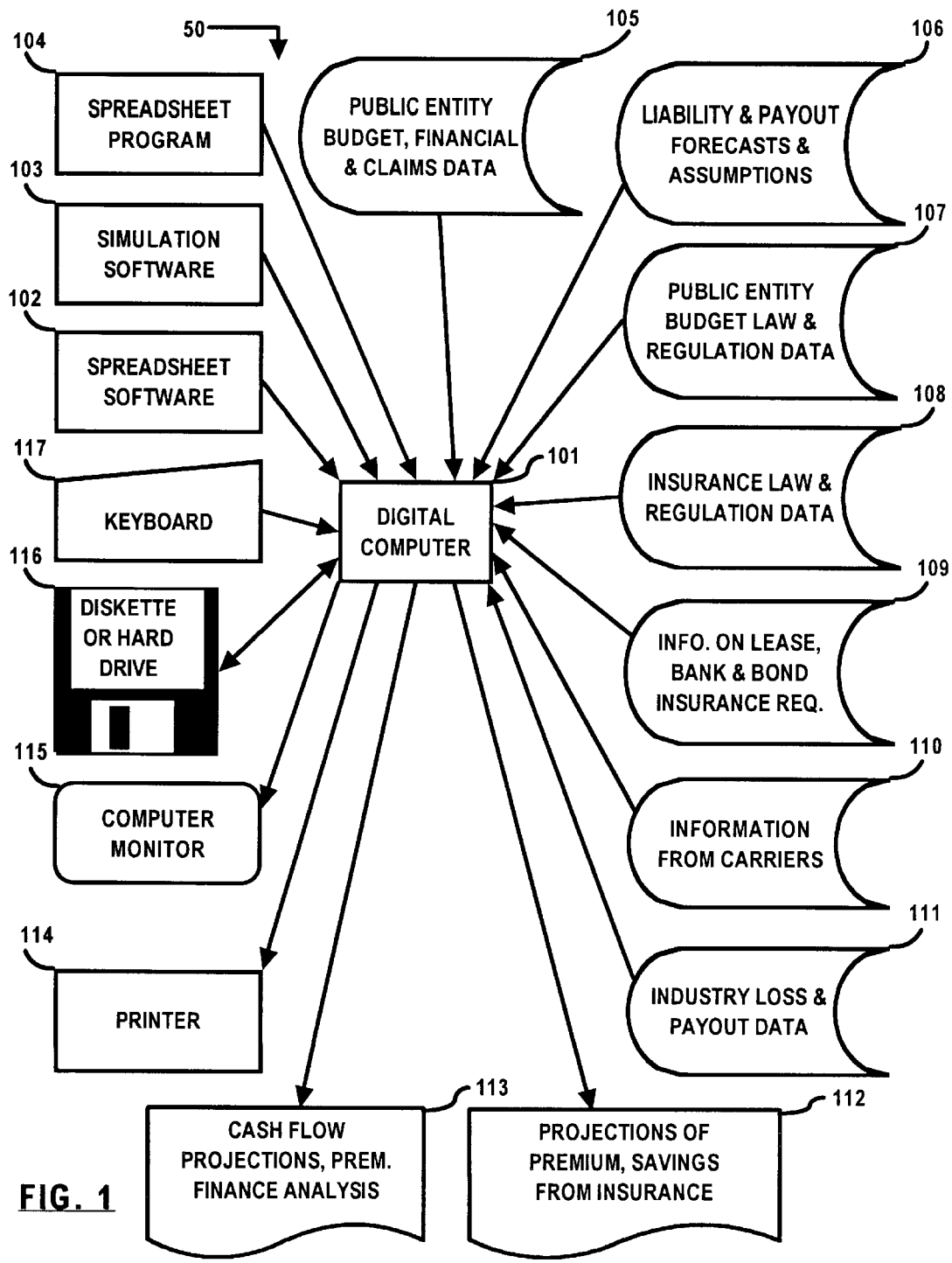
FIG. 1 is a high level, functional flowchart of an exemplary preferred system according to the present invention.

Referring to FIG. 1, a system 50 according to the present invention includes a digital computer 101, for example, an IBM-compatible personal computer operating Microsoft Windows 95. The digital computer 101 has a keyboard 117, hard drive 116, monitor 115, and printer 114. Other methods of inputting data may be substituted for or supplement the keyboard 117, such as a modem, floppy disk, or laser CD disk. Other storage methods, such as floppy disks, magnetic tape, and CD disks, may be substituted for the hard drive 116. Other methods for outputting data, such as a monitor, projector, or plotter, may be substituted for the printer 114.

In a preferred embodiment, the digital computer 101 runs Lotus 123 Version 5.0 Spreadsheet Software 102 and @Risk Version 3.5d Simulation Software 103. Simulation Software 103 is optional; it provides analysis of the sensitivity of results to changes in various assumptions and chance events. Other implementations of the present invention, for example, those using a different kind of digital computer, different computer software, or different computer languages, are also contemplated.

The system 50 additionally includes a computer executable program which in a preferred embodiment is a spreadsheet program 104 consisting of a Lotus 123 spreadsheet containing the software which manipulates the input data. Optionally, the spreadsheet program 104 is further adapted to analyze the sensitivity of cost and savings estimates to various assumptions and chance events.

The digital computer 101 can use many different sets of input data, as show in FIG. 1. These inputs include Public Entity Budget and Financial Data 105, Liability Payout Forecasts & Assumptions 106, Public Entity Budget Law & Regulation Data 107, Insurance Law & Regulation Data 108, Information on Lease, Bank & Bond Requirements for Insurance 109, Information from Insurance Carriers 110, and Industry Loss & Payout Data 111. It should be understood that private entity or not for profit entity budget and financial data can be substituted for the Public Entity Budget and Financial Data 105. Similarly, private and not for profit budget law and regulation data can be substituted for the Public Entity Budget Law & Regulation Data 107. If the Liability Payout Forecasts & Assumptions 106 cannot be obtained from a reliable outside source such as an actuary, the system 50 is adapted to calculate these using the Industry Loss & Payout Data 111.

The Public Entity Budget and Financial Data 105 includes the public entity's cost of capital, long term debt rating from Standard & Poor's, Moody's, or similar rating agency, and their financial objective(s), such as maintaining the current budget level or reducing the current budget as much as possible.

The Liability and Payout Forecasts and Assumptions 106 are typically taken from an actuarial report. In the absence of a recent actuarial report, the system 50 is adapted to use the Industry Loss and Payout Data 111 to calculate expected ultimate losses and expected loss payouts.

The Public Entity Budget Law & Regulation Data 107 and the Public Entity Lease, Bank, and Bond Insurance Requirements 109 include whether a public entity is required to purchase insurance coverage rather than self insuring, whether purchasing coverage from a private carrier is prohibited for this coverage, whether the client has a debt limit, and whether the client requires voter approval for any new financing activities. For a private or not for profit entity, similar legal and regulatory requirements can be substituted for the Public Entity Budget Law & Regulation Data 107 and the Public Entity Lease, Bank, and Bond Insurance Requirements 109.

The Information From Insurance Carriers 110 includes two groups of information. The first group is information from recent deals where the carriers have taken clients from self insurance to insurance and informal indications of premium given a general description of the public entity's current program. The second group of information comprises exact quotes from carriers, which the carriers will generally give only after they thoroughly review the public entity's data and interview its management.

Inputs 105–111 are processed by the spreadsheet program 104, using spreadsheet program 102 and digital computer 101. Output is sent to the Hard Drive 116, Monitor 115, or Printer 114. The system 50 is further adapted to print, display or save, as desired, a Projection of Savings From Insurance 112 and a Premium Financing Analysis 113.

Figure 2A:
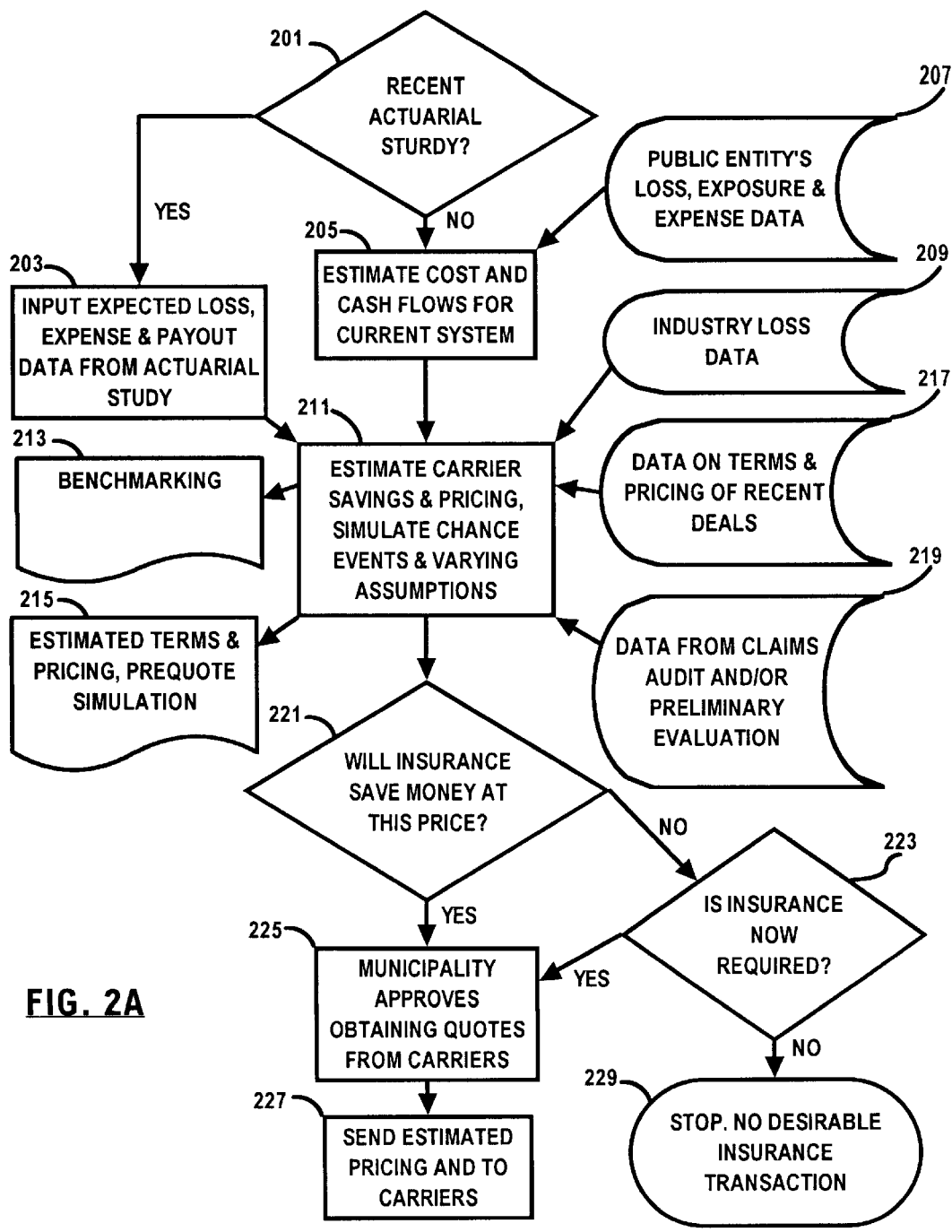
FIGS. 2A–2H are flow charts showing the principal inputs, steps, and outputs of a computer executable program embodying an exemplary preferred method according to the present invention.

FIG. 2A shows the major steps in estimating the cost of self insurance and insurance which are discussed below in greater detail. These costs are compared to estimate savings or additional cost from insurance.

Estimating Self Insured Losses

Step or decisional block 201 consists of checking to see if a recent actuarial study has been done for the type of coverage being reviewed. Actuarial studies will most often be performed by an actuarial or accounting firm and provided by the client. Actuarial studies will typically include an estimate of ultimate losses for past years, an estimate of ultimate losses for the upcoming year, and estimates of how much of the ultimate losses will be paid in each budget year. The system 50 is preferably adapted to calculate costs and savings for insuring either coverage for new claims, or for transferring liability for old self insured claims, or both. Coverage for open self insured claims is often referred to as a "portfolio transfer" or "tail coverage".

If a complete and recent actuarial study is available, ultimate loss, payout, and expense data from the study are input into the spreadsheet 104 in step or executable block 203. Data from the actuarial study will be used later to project the cost of insurance.

If no recent actuarial study is available, the public entity's loss, exposure, and expense data 207 and industry loss rates and payout patterns 209 are used to estimate ultimate losses and cash flows by budget year in Step 205. A key aspect of this software is that a preferred embodiment of the software is adapted to input loss data in the exact order shown on the Self Insurer's Reports filed with each state, an example of which is shown in FIG. 23.

Expected losses and payout patterns are determined by conventional methods in Step 205. Incurred loss development and paid loss development are used to forecast ultimate losses. A sample paid loss development calculation is:

$100,000 of losses paid to date @Dec. 13, 1996 for accidents occurring during 1996×4.127 industry paid loss development factor for 12 months after inception $412,700 expected ultimate loss payments, for accidents occurring during 1996.

Actuarial discretion is used to determine whether to use predictions from the paid or incurred method. Weighted averages of the both methods can also be used.

Conventional methods are also used to estimate the timing of loss payments. A sample loss payout calculation is:

$500,000 of ultimate losses forecast for accidents occurring during 1998×24.2w of losses expected to be paid during 1998, according to industry factors=$121,153 of expected loss payments during 1998, for accidents occurring in 1998.

If a recent actuarial study is lacking an estimate of ultimate losses for the upcoming year, or an estimate of how much of the ultimate losses will be paid in each budget year, Industry Loss Data 209 is used to determine the missing estimates.

Benchmarking

The Industry Loss Data 209 is also used to compare the client's loss experience with similar self insured employers. For example, the software contains a database of all self insureds in California. The database includes losses, claim counts, payroll, and employee count by year for each self insured employer. Suspicious or impossible data is flagged by the software as the data is input. For example, it is very rare for losses to be 10 times larger one year than the prior or succeeding year; this problem is flagged for verification. Totals and subtotals from the data keyed into the database are compared to totals and subtotals as reported by the client; mismatches are flagged. Such a data integrity checking procedure may be referred to as a "check sum" procedure.

Figure 24:
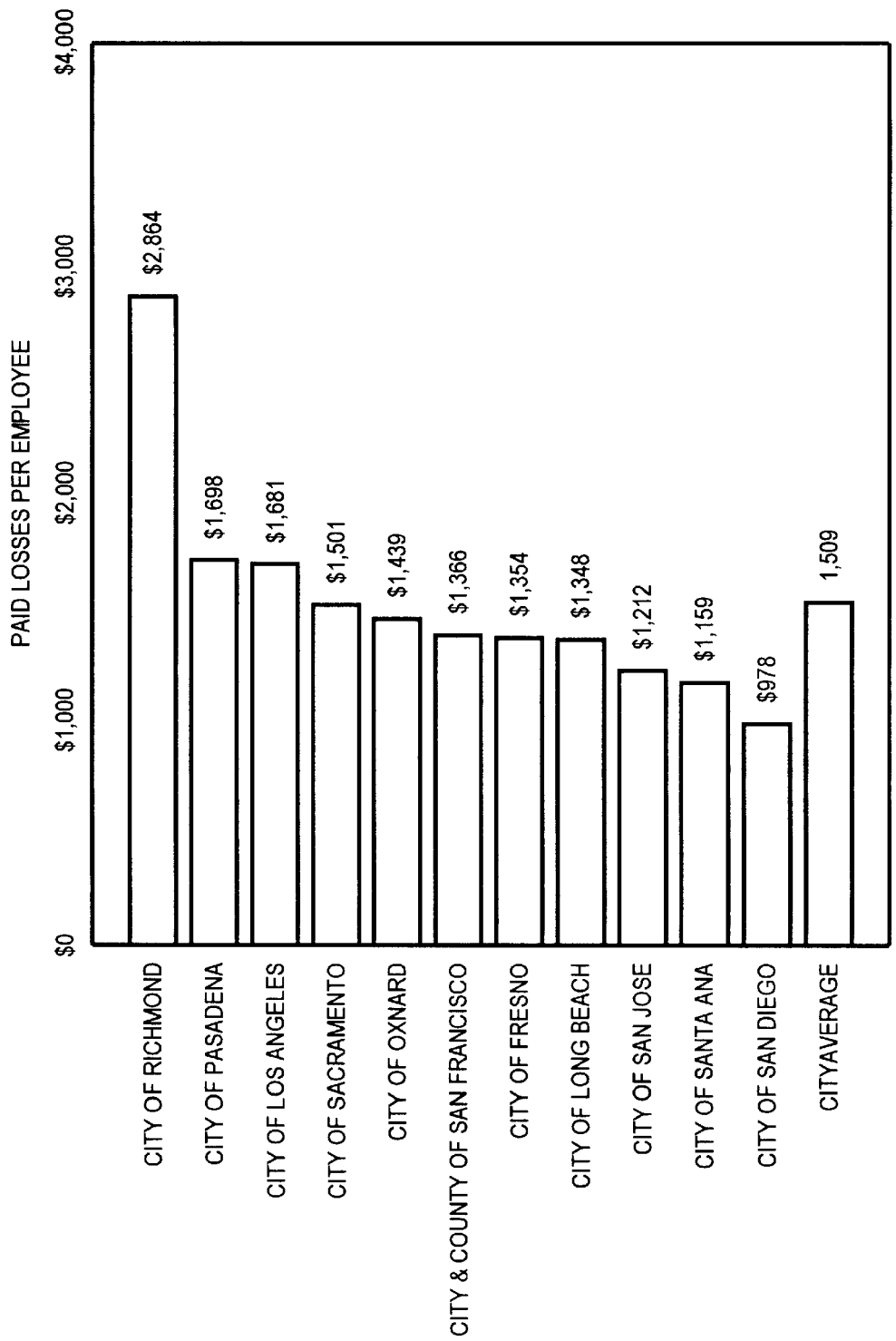
FIG. 24 is an exemplary benchmarking graph generated by the computer executable program of the present invention comparing losses per employee for the client under consideration to similar employers.
Figure 25:
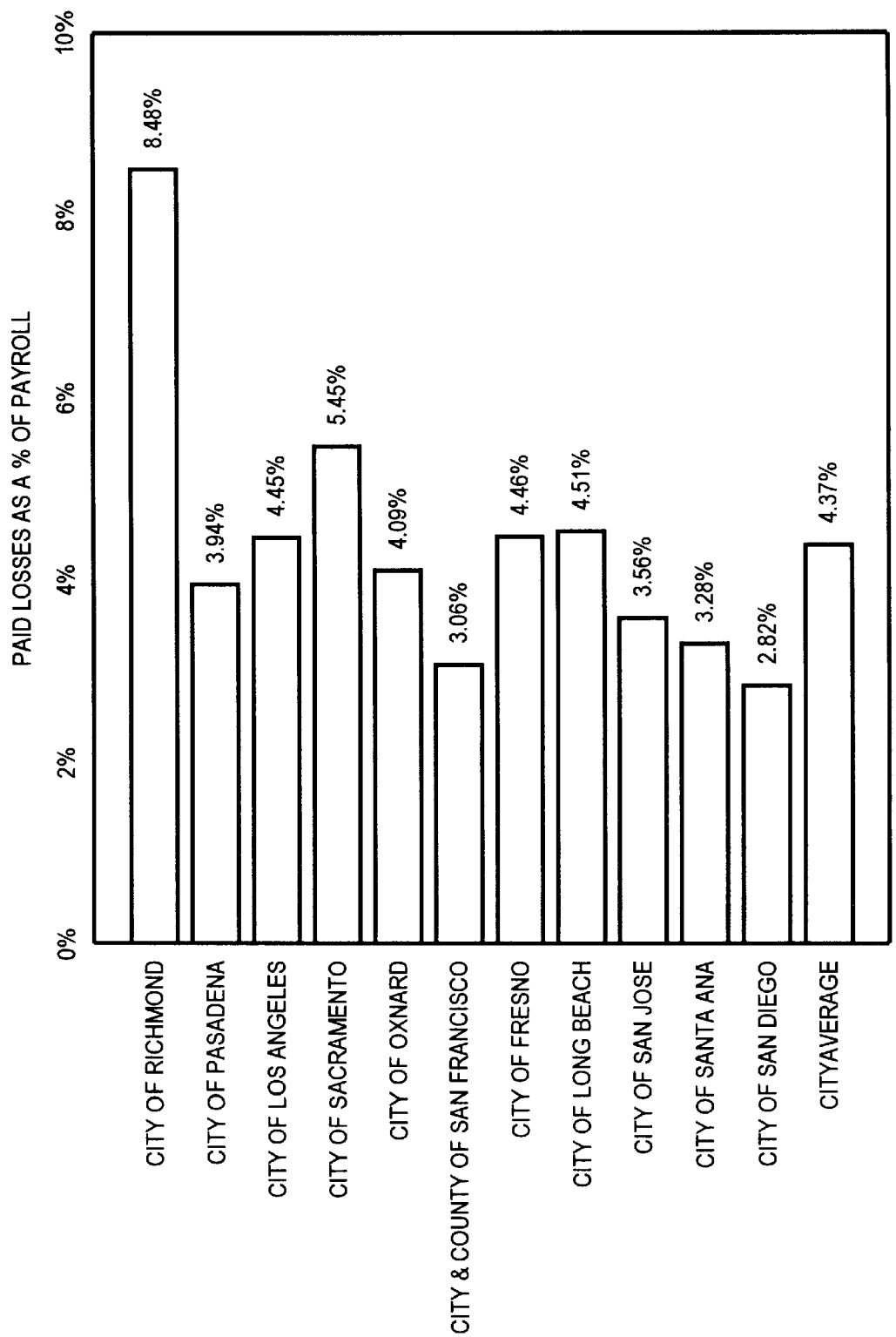
FIG. 25 is an exemplary benchmarking graph generated by the computer executable program of the present invention comparing losses as a percentage of payroll for the client under consideration to similar employers.
Figure 26:
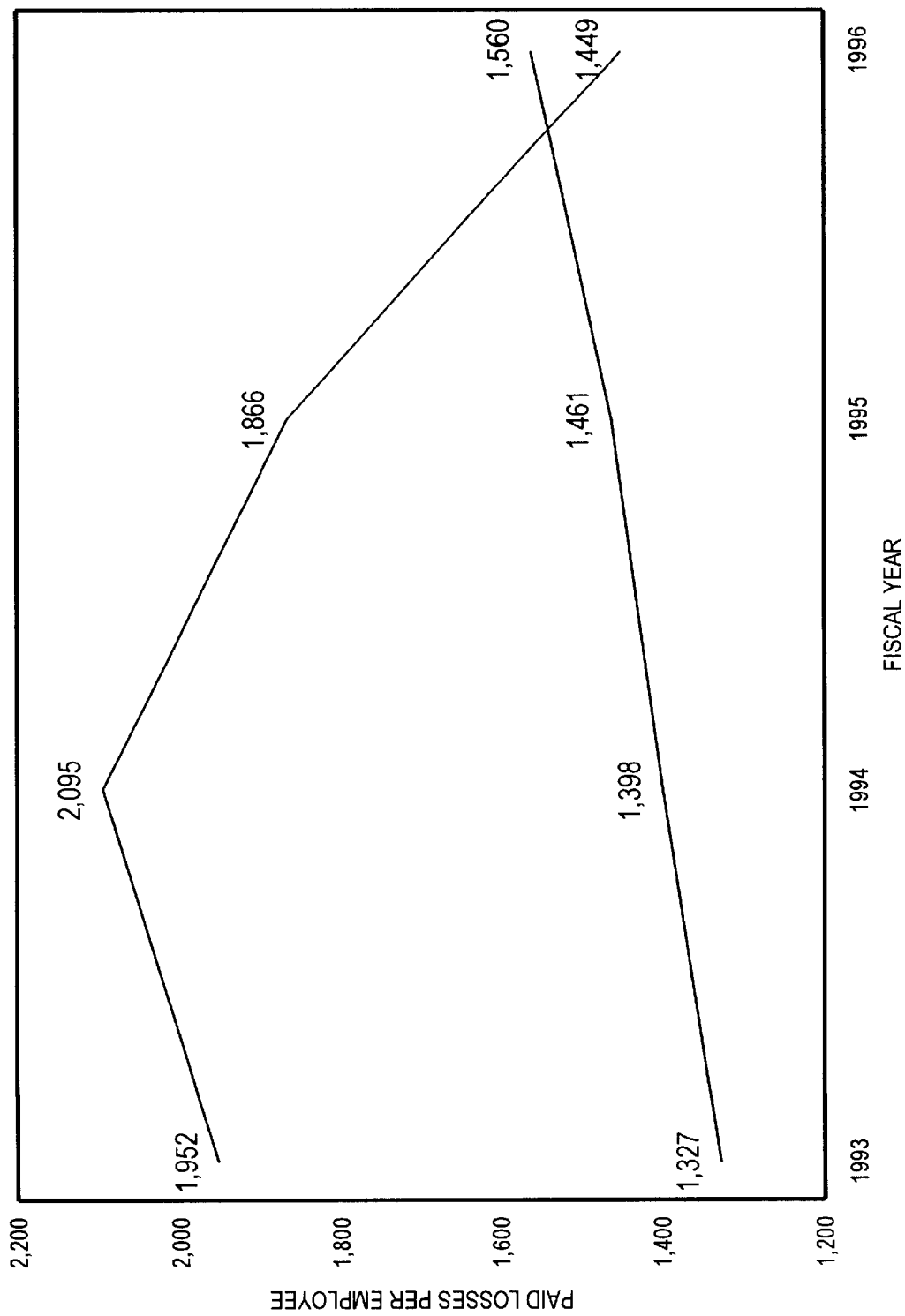
FIG. 26 is an exemplary benchmarking graph generated by the computer executable program of the present invention comparing losses over time for the client under consideration and a group of similar employers.

Employers are listed by Zip Code and Standard Industrial Classification Code (SIC Code). This data allows many different types of benchmarking analysis (out put 213). For example, FIG. 24 shows a comparison of paid losses per employee for California cities with more than 1,000 employees. FIG. 25 shows a comparison of paid losses as a percentage of payroll for the same group of cities. Loss trends over time are also calculated by a preferred system 50 as shown in FIG. 26. More specifically, FIG. 26 shows loss rates to payroll for a particular client versus a group of similar employers.

Benchmarking from the Industry Loss Data 209 helps in estimating savings that could be obtained by insuring. An employer whose losses are worse than its peers is likely to have larger savings from leaving self insurance.

Estimating Insurance Cost and Savings

Program step 211 estimates loss and expense savings a carrier could realize versus the current self insured program. Information on terms and pricing of recent deals for employers leaving self insurance 217 is used to obtain an industry average estimate of savings from insurance.

Data on Pricing & Terms of Recent Deals 217 comes from two sources, formal quotes and survey data. Each time formal quotes are solicited from a carrier, the software adds the quotes to a database. After each quote is analyzed, type of coverage, premium, savings, date of quote, carrier, and other variables are recorded in the database. The database also tracks the employer's state of operation, size, and private or public sector status. Surveys of employers who have recently left self insurance provide similar data to having the actual quotes.

The database of recent deals is analyzed to help forecast upcoming deals. The two primary types of analysis are grouping and regression. Grouping simply puts together quotes for similar types of clients and produces summary statistics such as minimum savings, maximum savings, mean savings, and the likelihood and distribution of savings from recent history. FIG. 28 is a sample graph produced by grouping together California municipalities who had left self insurance for insurance.

Grouping works well where there is a large amount of previous experience, but is of little use when trying to predict pricing for a client when it is the first deal of its kind. For example, if the database had no Texas oil industry employers, grouping would be of limited use in predicting savings for a Texas oil company. If the database includes some oil companies and some Texas employers, an estimate of savings for a Texas oil company can be created using multiple regression. Conventional multiple regression, however, is very useful here. Thus, a regression equation can predict baseline savings for Texas oil companies even if there are none in the database.

A regression can be run on multiple variables such as state of operation, industry, portion of claims currently litigated, or number of employees. An exemplary equation used to predict savings is set forth below:

Predicted savings percentage=Average savings for all clients+$X_{s1}$*State$_1$+$X_{s2}$*State$_2$+. . . +$X_{i1}$*Industry$_1$+$X_{i2}$*Industry$_2$+ . . . +$X_L$ litigated+$X_e$*log(employee count)

where:

$X_{s1}$ is the savings above average expected for employers in State 1, $X_{i1}$ is the savings above average expected for employers in Industry 1, $X_L$ is the partial regression coefficient for savings due to variation in % litigated, and $X_e$ is the partial regression coefficient for savings due to variation in log of employee count.

State 1 is the % of payroll in State 1.

With these partial correlation coefficients, Industry 1 is the dummy variable, whether this client is in Industry 1.

Other variables such as time to implement a new program or chances of completing an insurance deal can be predicted in a similar manner.

Referring to FIG. 2A, step 211 processes the benchmarking data from step 209 to provide an estimate of whether this employer is likely to obtain more or less savings than similar employers.

Savings are also estimated from an audit of the employer's claims and/or a preliminary evaluation questionnaire 219. Preliminary evaluation questionnaires are shown in FIGS. 19–22. A claims audit is done in the conventional manner and contains information regarding how claims are handled, paid, and settled. Many regulators will require regular claims audits of self insurers. A preferred system 50 is adapted to generate input screens at the monitor 115 in a conventional manner to receive data inputted by users of the system 50. If the current self insured program is determined to be worse than average, the estimate for savings obtained by insuring is raised. Simulations As part of step 211, a simulation can be performed to evaluate how sensitive expected savings are to various factors, such as: the interest rate the carrier uses for discounting cash flows, the carrier's expected payout pattern, the number of years the carrier takes to close all claims, fees for professional services, and the carrier's expected profit margin. Performing these simulations helps the client see what factors are most likely to affect insurance pricing and their savings.

For simulations in Step 211, a reasonable range of variation and a statistical distribution are chosen for each input. For example, legal expenses might average 5% of losses, but the reasonable range might be 4%–6%. Because legal expenses could not be negative, but could be quite large, a lognormal curve is the chosen distribution for this input. An example of means, minimums, maximums, and statistical distributions is shown in FIG. 21.

The simulations use conventional distributions and techniques familiar to users of spreadsheets such as Lotus 123 Version 5.0 and simulation software such as @Risk Version 3.5d. For example, using Lotus and @Risk, the formula @<<RISK>>NORMAL(.1,0.0375) specifies a normal distribution with a mean of 10% and a standard deviation of 3.75%.

The Simulation Software 103 is used to vary the values of each input independently according to means, minimums, maximums, and statistical distributions. The results of the simulation show: the range of possible savings and premiums, the likelihood of a particular premium of savings amount, and the sensitivity of savings and premium estimates to changes in individual inputs.

Different statistical distributions can be used as appropriate. For example, lognormal distributions are used when an input cannot be less than zero and can be quite large, such as legal expenses. Normal distributions are used for quantities that have an equal chance of varying in either direction from the mean, such as the savings of using an insurance carrier to handle claims instead of a public entity handling claims internally. Poisson distributions are used for estimating the number of events, such as large earthquakes, happening during a particular year. Binomial distributions are used where there is a chance that a particular event may or may not happen, such as a particular premium financing plan being approved by regulators.

Sample Outputs

The preferred system 50 is adapted to generate the outputs of step 211 at step 213 and step 215 in the form of a printout, visual display or computer-readable data file, as desired. As may be readily appreciated, the subject matter of the present invention contemplates other indications of the outputs in addition to those explicitly mentioned above. Exemplary outputs (215) showing cost components, savings, cash flows, and the results of simulations are provided in FIGS. 4–10, 16 and 17.

FIG. 4 is a graph showing the cost components of self insurance and insurance.

FIG. 5 is a table summarizing calculations required to estimate the costs of self insurance and insurance.

FIG. 6 is a graph showing forecast payments made under self insurance and insurance with premium financing.

FIG. 7 is a table showing projected payments by budget year for self insurance and insurance.

FIG. 8 shows the likelihood of various premium quotes given what is known before formal solicitation of quotes begins.

Figure 9:
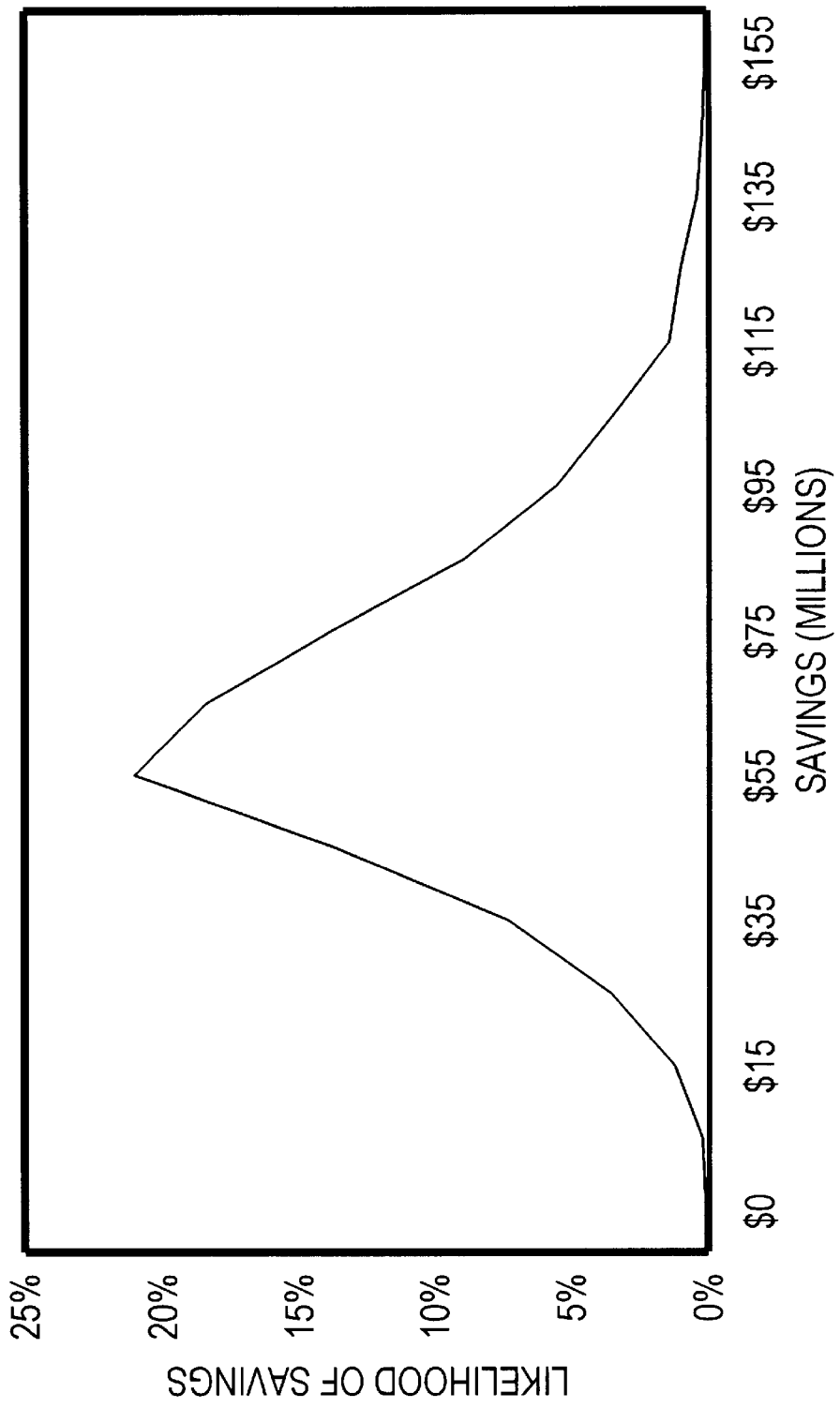
FIG. 9 is an exemplary simulation output graph showing the likelihood of obtaining particular savings by moving from self insurance to insurance, given that formal quotes have not yet been solicited.

FIG. 9 shows the reasonable range of savings of moving to insurance and the probability of obtaining various amounts of savings.

FIG. 10 shows a sample ranking of which inputs will have the most effect on the actual savings obtained by insuring. The inputs are listed in order of importance, using customary techniques to rank the inputs according to the R-squared, or partial correlation coefficient. After final quotes are obtained many variables will no longer vary; estimates will be replaced by actual amounts.

Deciding Whether to Obtain Quotes

As shown in FIG. 2A, if step 221 results in an estimate that insurance will be more expensive than self insurance, a check is made to see if there is a legal, regulatory, or contractual requirement for insurance in step 225. If there is a requirement for insurance, the process continues to step 225. Otherwise, the process terminates at step 229.

If, however, insurance is estimated to be less expensive in step 221 or is found to be required in step 223, the municipality will likely authorize soliciting formal quotes from insurance carriers at executable block 225. The insurance broker will send estimated terms and pricing to insurance carriers to solicit firm quotes in step 227. The insurance broker and insurance carrier will then proceed with the customary process of insurance marketing and negotiation.

Evaluating Insurance Quotes

Figure 2B:
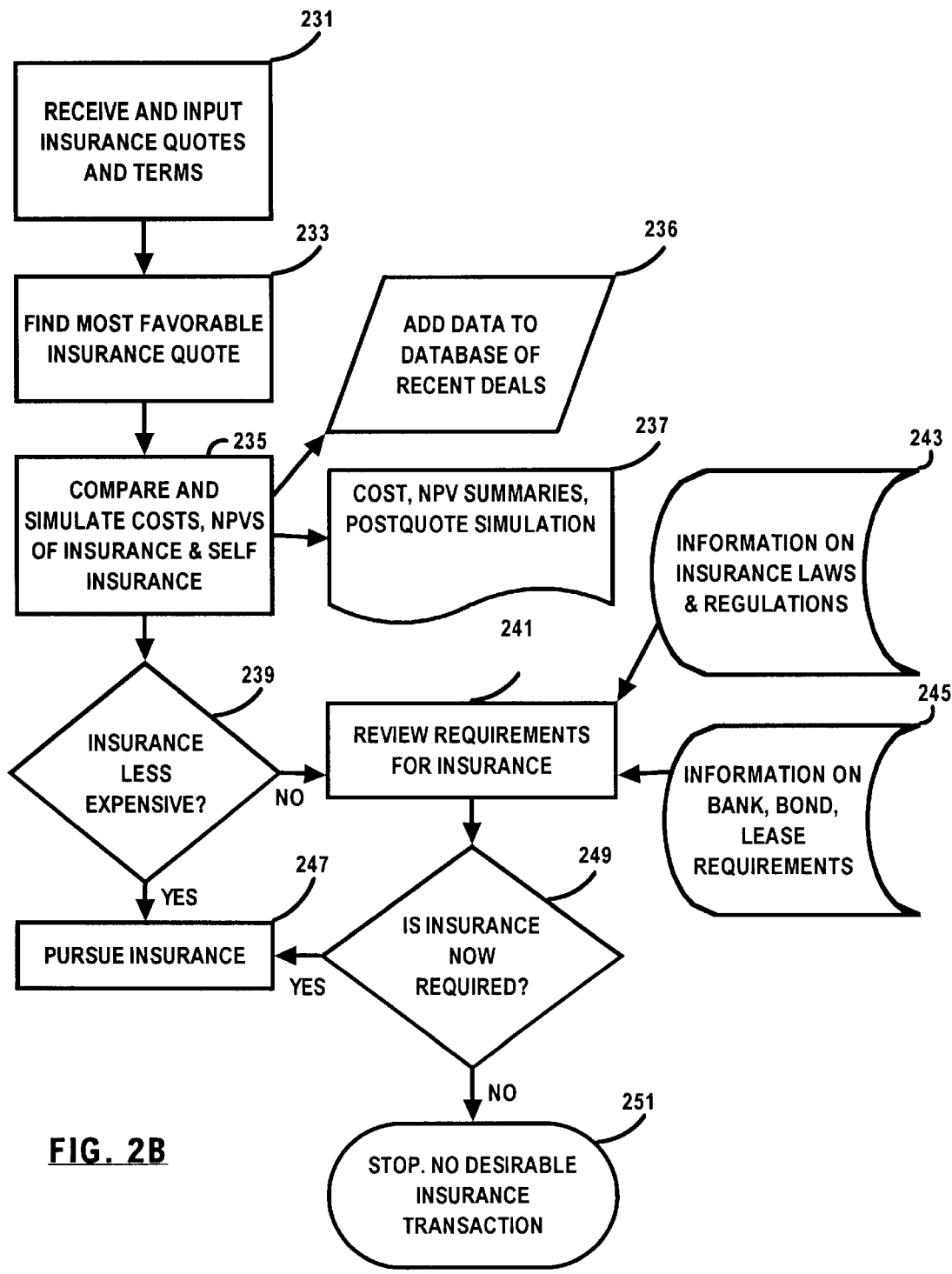

FIG. 2B illustrates the evaluation of insurance quotes according to the present invention. When the insurance marketing process is completed, the firm quotes are received and input in step 231. The spreadsheet program 104 then compares these quotes to find the most favorable in step 233. The most favorable insurance quote is then compared with self insurance in step 235 to determine estimated savings or additional cost of self insurance. The system 50 is preferably adapted to generate the outputs of step 235 in the form of a printout, visual display, computer-readable data file, or the like at step 237. Data related to insurance quotes is recorded in a database to use in estimating savings for future clients at step 236.

Even with firm quotes, actual savings will depend on some chance events, such as a large earthquake during working hours, and on some quantities which are only estimates, such as payroll for the upcoming year. For this reason, step 235 provides for an optional simulation which may be performed to evaluate savings under different scenarios, such as with or without a major earthquake during the following year or with different interest rates used for discounting cash flows. These simulations provide value to the client in two ways. First, the client is able to see whether savings from moving to insurance are likely to materialize under a broad range of circumstances. Second, the client is able to see what circumstances the savings are most sensitive to, such a major earthquake during working hours, interest rates, or changes in payroll.

Sample comparisons of total costs including finance charges are shown in FIGS. 11 and 12. Since formal quotes have already been solicited, the cost of insurance is known. However, the cost of financing an insurance premium is still an estimate. Exemplary primary sources of variation in savings of self insurance and final insurance quotes are set forth in FIG. 13 in tabular form. The sources of variation in FIG. 13 are calculated in the same manner as the sources of variation in FIG. 10. Additional analytical output is contained in the spreadsheet program 104.

Referring to FIG. 2B, if insurance is found to be less expensive in step 239, insurance is pursued at step 247. Otherwise, at step 241, a review of requirements for insurance and determine if the client is required to purchase insurance for the coverage being considered is conducted exemplary benchmarking 213 output exhibits comprise FIGS. 24–26 Information on insurance laws and regulations, input at step 243, and information on bank, bond, and lease requirements are input at step 245. In step 249, insurance is more expensive and there are not legal, regulatory, or contractual requirements to insure, the process is terminated at step 251 because there would be no benefit in moving this client from self insurance to insurance. If insurance is either less expensive or required by law, regulation or contract, proceed to step 247.

Choosing a Form of Financing

Figure 2C:
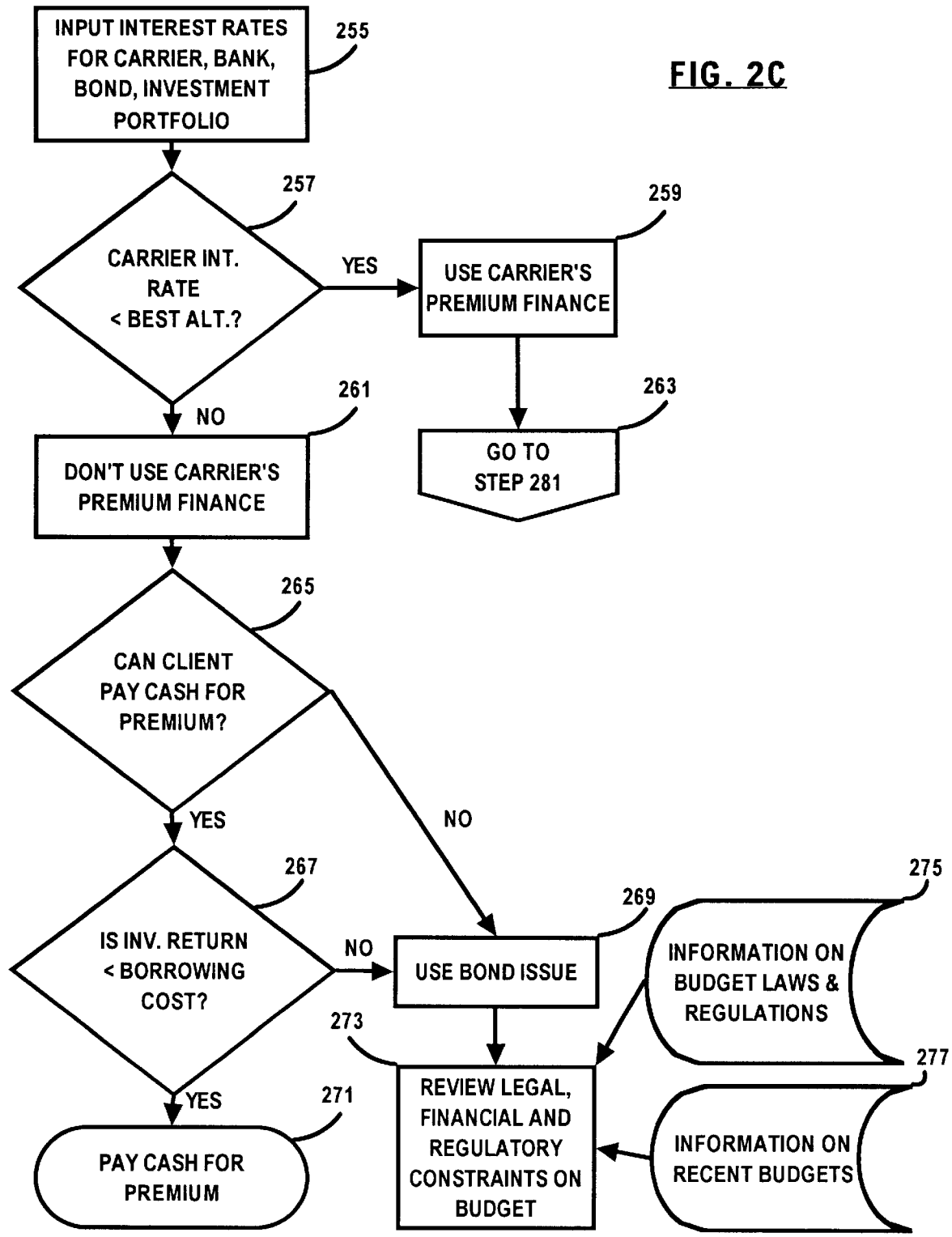

Referring to FIG. 2C, step 255 is the first stage of designing a premium finance mechanism. At step 255, interest rates for potential ways of paying premium are input. These interest rates include, for example, those charged by banks, bondholders, carrier premium finance companies, and the yield on the client's investment portfolio.

If the carrier's premium finance subsidiary charges the lowest interest rate (step 257) and thus is the least expensive source of financing, the software recommends using carrier premium finance in step 259 and advances in step 263 to step 281 to determine the payment pattern for financing.

If the carrier's premium finance rate is not the best, step 257 recommends against using carrier premium finance in step 261 and proceeds to step 265. If the evaluation of step 265 results in a determination that the client is able to pay cash for the premium, proceed to step 267. Otherwise, proceed to step 269. Step 267 compares the return on the client's invested assets to the interest rates charged to borrow from alternative sources, such as banks or bondholders. If the return on the client's invested assets is the lowest, the client should pay cash for their premium. If the client should pay cash, the premium finance calculations end at step 271.

If step 267 finds that the client's investment return is higher than alternative sources, proceed to step 269; a bank loan or bond issue is the desired method of financing premium. Information on budget laws and regulations is input at step 275, and information on recent budgets is input at step 277. In step 273, a series of questions are answered regarding relevant laws, regulations, budgets, financial constraints, and financial objectives.

Calculating Cash Flows For Financing

Figure 2D:
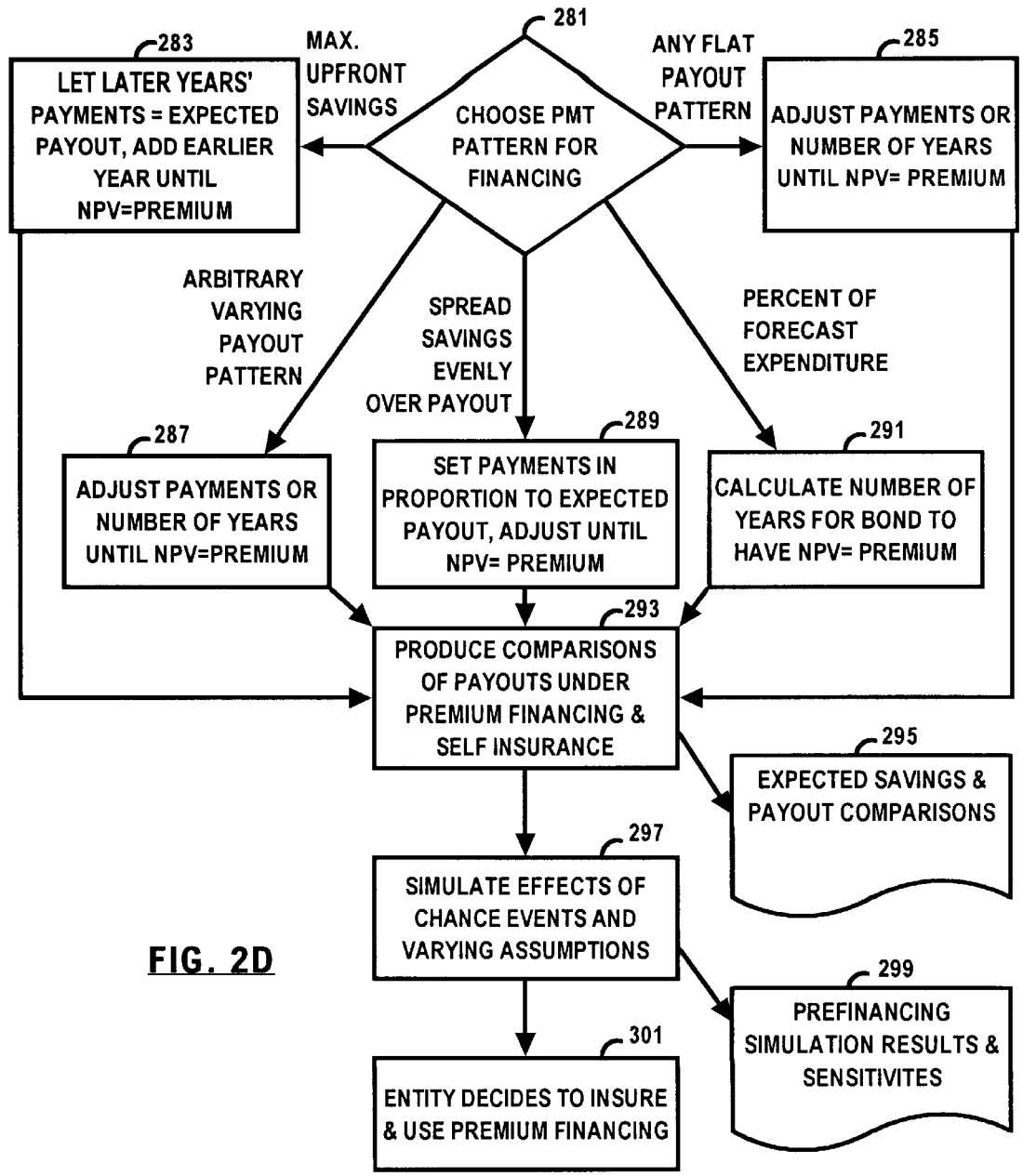

Referring now to FIG. 2D, a methodology for calculating cash flows for financing is set forth. For any initial loan value, carrier premium finance balance, or bond principal, there are an infinite number of possible repayment patterns which satisfy the requirement that the net present value of the payment stream=the bond principal.

The net present value is calculated at the interest rate on the premium financing loan or bond, which may be very different from the client's investment rate or cost of borrowing for other purposes. Furthermore, premium financing for municipalities is expected to pay tax exempt interest. This tax exempt interest status can lead to significant interest arbitrage savings for municipalities with investment grade credit ratings.

Carriers typically price coverage by discounting the carrier's expected payouts at interest rates near those paid on U.S. Treasury bills of similar duration. Investment grade, tax-exempt municipal bonds often bear interest rates below Treasury bills of the same duration. Thus, if a self insured municipality and an insurance carrier were able to settle the same losses over the same period of time for exactly the same amounts, the self insured municipality could still find it much less expensive to buy insurance and finance the premium.

If there is more than one insurance policy to be financed, it is most convenient to calculate the cash flows for financing separately for each policy. For example, a client leaving self insurance on Jan. 1, 1998 might have negotiated a three year policy covering losses occurring in 1998, 1999 and 2000. If the client desires, these cash flows for each policy are totaled and cash flows for a single loan or bond are created.

A preferred system 50 is adapted to calculate a plurality of different payment streams for premium financing are shown in steps 283–291 of FIG. 2D. Sample graphs illustrating five exemplary payment patterns are shown in FIGS. 14A–14E. Additional methods of calculating payment streams are included in the spreadsheet software 104. It should be understood that the present invention is not limited to a system 50 which determines the five payout patterns discussed below; different and/or additional payout patterns may be employed to accommodate particular cash flow requirements.

Each method of calculating cash flow can accommodate interest rates which vary over time, as long as these interest rates are specified before the bond is issued. Many bond issues currently have interest rates which rise over the life of the bond, such as the bond issue summarized in FIG. 18.

The simplest payout pattern is level over a specified number of years and has a constant interest rate. Spreadsheet software such as Lotus 123 and Excel have special functions which easily calculate the annual payments. For example, in Lotus 123 the function @PMT(1000000,0.05,10) calculates annual payments on a bond with $1 million of principal, financed at 5%, over 10 years. The resulting annual payment is $129,505.

If the client desires to pay off the bond with a level payout pattern, step 285 is employed. Step 285 accommodates interest rates which vary over the life of the bond. An illustration of the calculation in step 285 is shown in FIG. 27B. In FIG. 27A, the client has a $700,000 bond principal and interest rates which start at 5% and rise over the life of the bond. The client has requested a $150,000 annual bond payment each year for 5 years. The cumulative present value on line H shows that the present value (PV) of these payments ($647,108) will not pay off the bond principal ($700,000).

Two exemplary methods of adjusting the payments for level payouts are discussed below. Method A consists keeping the term of the bond constant and adjusting the payment level to obtain the correct PV using the following equation:

Adjusted $Pmt_1$=Requested $Pmt_1$* {Principal/$\Sigma$ (Present Values of Requested Pmts)}

In the sample calculation of FIG. 27A, this equation is: $162,260=$150,000* (700,000/647,108).

Figure 14A:
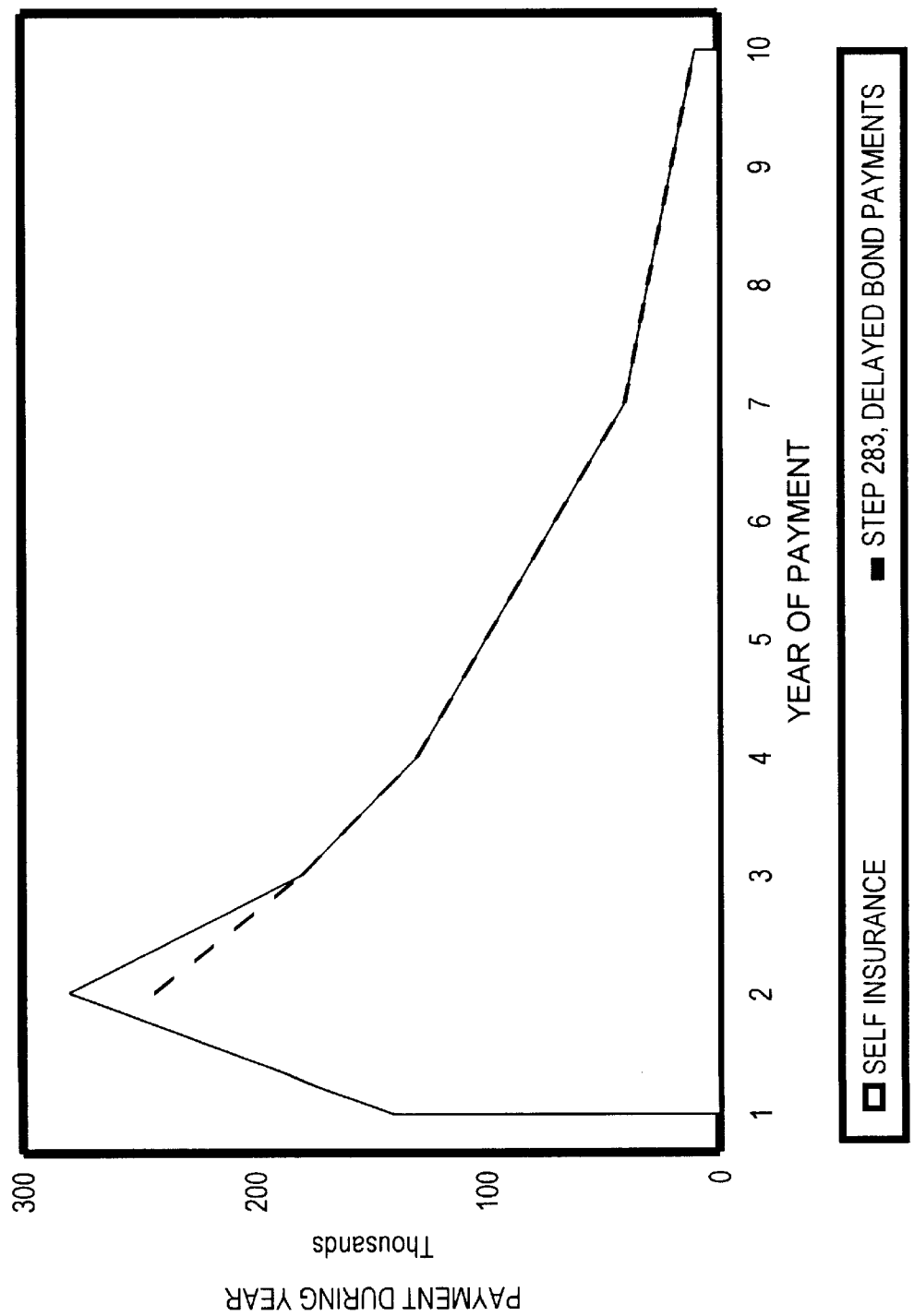
Figure 14B:
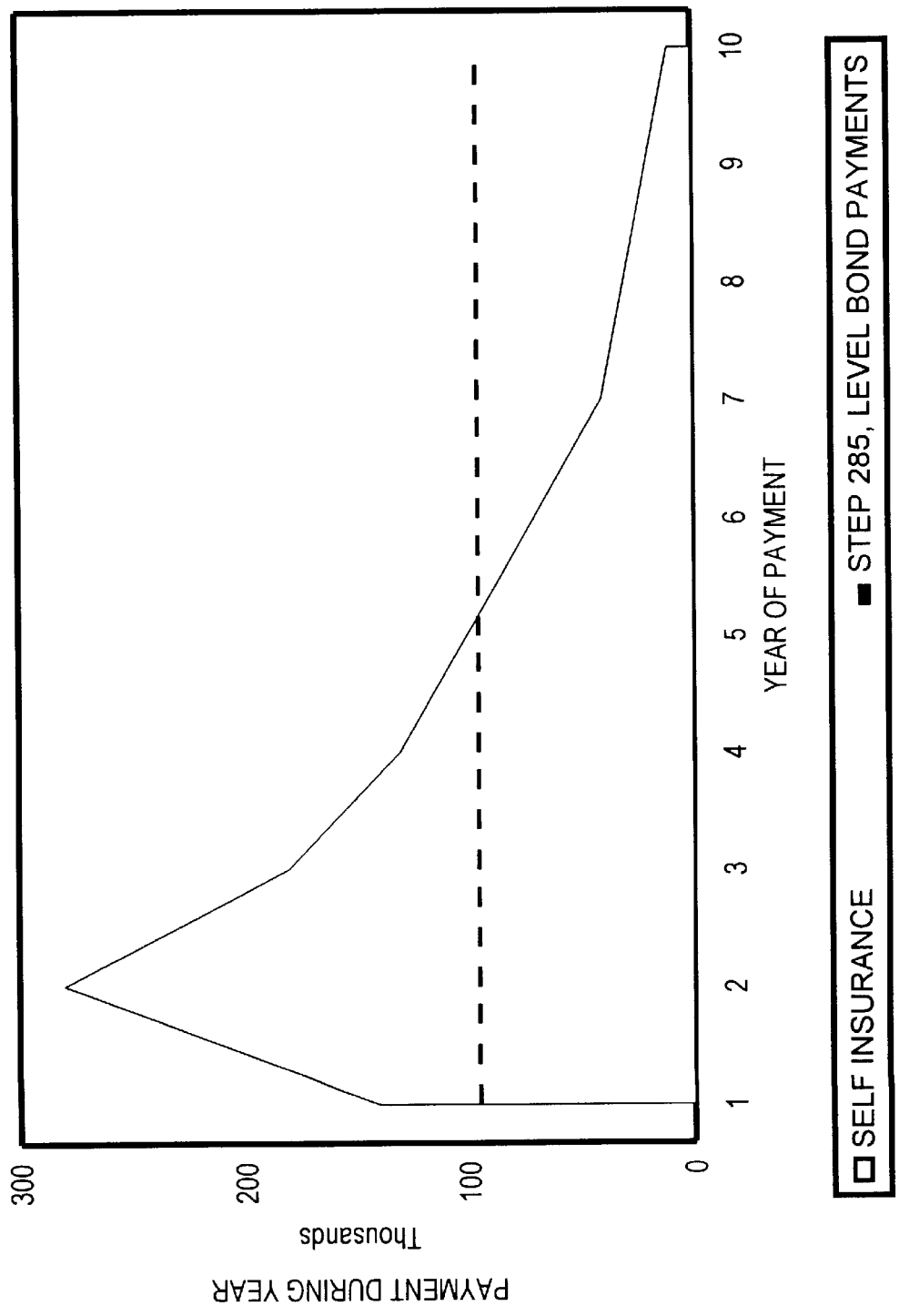
Figure 16:
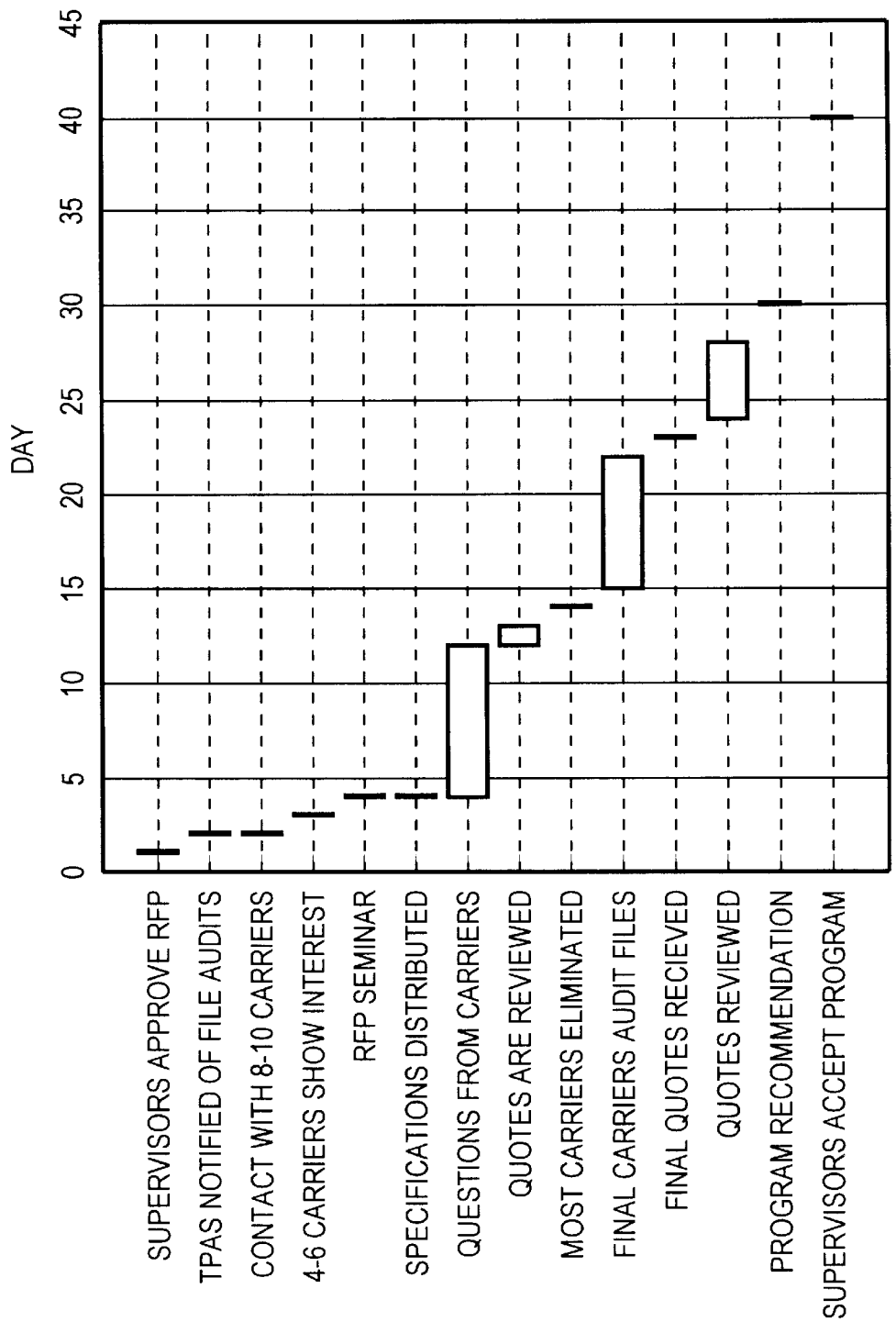
FIG. 16 is an exemplary time line for marketing an insurance program according to the method of the present invention up until the time a program has been approved.
Figure 17:
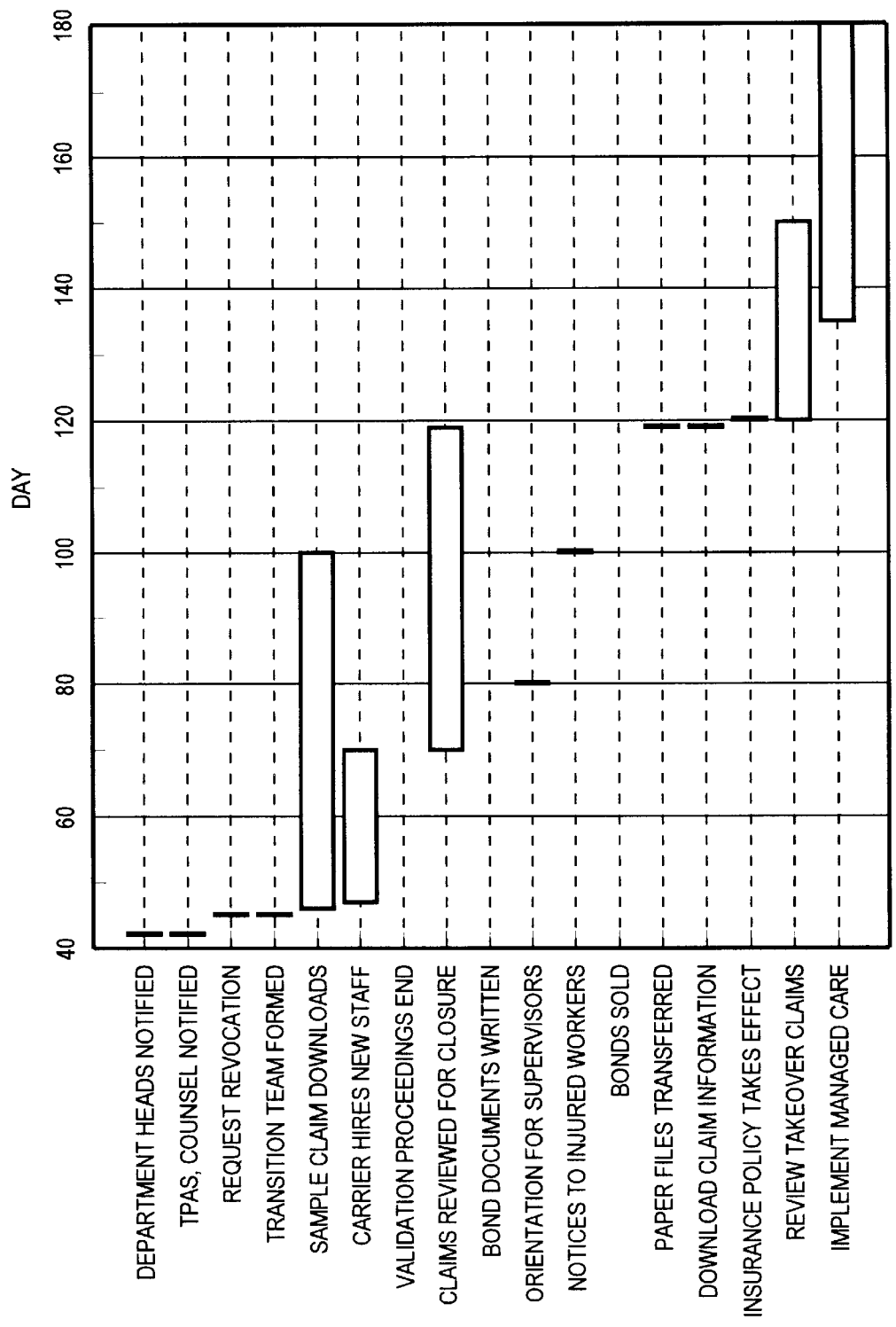
FIG. 17 is an exemplary time line for moving from self insurance to insurance according to the method of the present invention starting from the time that an acceptable insurance quote has been obtained.

A sample graph of this payout pattern is shown in FIG. 14B.

Method B of obtaining the correct present value of bond payments leaves the values of the payments at their requested amounts where possible and appends or truncates payments until the correct PV is obtained. This process is considerably more complex than Method A and is done in iterations by the software.

For Method B, where $RP_n$ is initial Requested Payment for year n, Actual Payments are determined as follows:

Condition 1.

If $PV\ RP_n + PV\ RP_{n-1} + PV\ RP_{n-2} + \ldots >$ Bond Principal, and if $RP_n > 0$, Actual $Pmt_n = RP_n$ Adding the Requested Payment n to the payment stream will not create an NPV>Bond Principal.

Condition 2.

If $PV\ RP_n + PV\ RP_{n-1} + PV\ RP_{n-2} + \ldots <$ Bond Principal, and if $RP_n = 0$, Actual $Pmt_n =$ Actual $Pmt_{n-1}$ Adding the Requested Payment$_n$ to the payment stream will not create an NPV>Bond Principal. If the client requested no payment for this year, the last payment requested by the client is duplicated.

Condition 3.

If $PV\ RP_{n-1} + PV\ RP_{n-2} + \ldots >$ Bond Principal,

Then Actual $Pmt_n = 0$.

Prior payments are sufficient to pay off bond principal, no more payments are required.

Condition 4.

If $PV\ RP_n + PV\ RP_{n-1} + PV\ RP_{n-2} + \ldots \geq$ Bond Principal,

Then Actual $Pmt_n = \{(PV\ RP_{n-1} + PV\ RP_{n-2} + \ldots) - (\text{Bond Principal})\}/PV\ Factor_n$ PV Actual $Pmt_n$ will be the last one required to pay off the bond principal. PV Actual $Pmt_n$ will be less than or equal to Requested Payment$_n$.

In the sample calculation of FIG. 27B, Condition 1 is true in years 1–5. Condition 3 is true for years 7 and later. Condition 4 is true for year 6.

Method A will always yield a payment stream whose PV bond principal. Method B will not result in a solution if the payment initially requested is too low (e.g., $1 million of principal at 5% interest can never be paid off with annual payments below $50,000, regardless of the term).

Duration Calculations

Duration is a measure of the weighted average payout time for a payment stream. A standard method of choosing appropriate investments to include in an investment portfolio for an insurance carrier or pension fund is to match the duration of the investments with the duration of the entity's liabilities. The system software is adapted to calculate the duration of the client's payout pattern under self insurance, the carrier's payout pattern under insurance, and the bond payments used to finance insurance payments. Duration for the payment pattern is calculated in a conventional manner by, for example, employing MacCauley's method. Durations of the bond payout patterns are included in FIGS. 27A and 27B.

Maximizing Upfront Savings Payout Patterns

If the client's primary objective is to maximize up front savings, it is usually possible to pay off the bond with a payment stream which has no payments in the first year, or even the first several years. An exemplary calculation facilitating such a client goal is performed in step 283 as Method C, the details of which are set forth in FIG. 27B. A sample graph for this type of payout pattern is shown in FIG. 14A. Method C is similar to Method B above, except that the calculations start with the last payment and keep adding earlier payments until the NPV=bond principal.

Method C of obtaining the correct present value of bond payments leaves the values of the payments at their requested amounts where possible and appends or truncates payments until the correct PV is obtained.

For Method C, where $RP_n$ is initial Requested Payment for year n, Actual Payments are determined as follows:

Condition 1.

If $PV\ RP_n + PV\ RP_{n+1} + PV\ RP_{n+2} + \ldots <$ Bond Principal Adding the Requested Payment n to the payment stream will not create an NPV>Bond Principal.

Condition 2.

If $PV\ RP_{n+1} + PV\ RP_{n+2} + \ldots \leq$ Bond Principal,

Then Actual $Pmt_n \pm 0$.

Prior payments are sufficient to pay off bond principal, no more payments are required.

Condition 3.

If $PV\ RP_n + PV\ RP_{n+1} + PV\ RP_{n+2} + \ldots >$ Bond Principal,

Then Actual $Pmt_n = \{(PV\ RP_{n+1} + PV\ RP_{n+2} + \ldots) - (\text{Bond Principal})\}/PV\ Factor_n$.

PV Actual $Pmt_n$ will be the last one required to pay off the bond principal. PV Actual $Pmt_n$ will be less than or equal to Requested Payment$_n$.

Arbitrary Payout Patterns

The computer executable program embodied in the spreadsheet 104 is also adapted to take an arbitrary requested bond payout pattern and adjust the level of the payments up or down until the NPV of the payment stream is equal to the bond or loan principal as shown in step 287 of FIG. 2D. In the same manner as step 285, step 287 allows for duplicating the last payment in the payout stream when the proposed arbitrary payout pattern has too low of an NPV, and for truncating years from the end of the payout stream if the NPV of the proposed arbitrary payout stream is too high. A sample graph for this type of payout pattern is shown in FIG. 14C.

Level Dollar Savings Payout Patterns

Referring to FIG. 2D, step 289 is a calculation where the client desires to spread the dollars of savings equally over the term of the bond or loan. For example, assume a client has an NPV of savings from insurance of $50 million and will use a 10 year bond to pay premium. This client could arrange the payments so that the $5 million is saved from the expected self insured expenditures each year for the 10 year life of the bond. In the same manner as Method A of step 285, the bond payments can be adjusted so that the NPV of the bond payments=bond principal. A sample graph for this type of payout pattern is shown in FIG. 14D.

Level Percentage Savings Payout Patterns

Referring to FIG. 2D, step 291 is the step of calculating a bond or loan payout pattern as a percentage of the forecast expenditure under self insurance. Alternatively, this same mathematical technique works for calculating the bond or loan payments as a percentage of the expected payout of the claims submitted to the insurance carrier. If the NPV of insurance costs is less than the NPV of self insurance costs, this particular payout pattern guarantees that the client will save money in each and every budget year. It also makes changing from insurance to self insurance quite easy should the need ever arise. The bond payment pattern in this method is the same as the expected payout pattern of self insurance; each bond payment is the same percentage lower than the corresponding cash flow for self insurance. Therefore, changing from self insurance to insurance, or from insurance to self insurance will have minimal effect on annual cash flow. In the same manner as Method A of step 285, the bond payments are preferably adjusted so that the NPV of the bond payments=bond principal. A sample graph of this payout pattern is shown in FIG. 14E.

Use of the premium finance method of step 291 results in several advantages. First, by setting bond payments at a constant percentage of self insurance payments, the municipality minimizes any cash flow disruption. Second, this payment pattern allows the client to move easily back to self insurance with minimal cash flow disruption, should insurance market conditions warrant. Third, this bond payment pattern has a duration which is very close to the duration of liabilities which the insurance carrier will assume. As a result of the durations being so similar, if the insurance carrier buys part or all of the bond issue, the carrier's interest rate risk on the bond is very low.

It should be noted that the expected payout of insurance losses and expenses made by the carrier can be substituted for expected self insurance payout in steps 281–291. If this substitution is made, calculations are virtually identical. Industry payout patterns can be used in a similar manner. Loss or expense reporting patterns can also be used in place of payout patterns with virtually identical calculations.

In step 293, comparisons of payouts under self insurance and bond or loan payments are produced. According to a preferred system 50, simulations can also be performed at this step to assess the sensitivity of annual payments to certain assumptions. If the client has purchased guaranteed cost insurance and is obtaining financing at a fixed interest rate, all of the variability will be in the self insured program payments. If the client is obtaining variable interest rate financing, the simulation can be adapted to evaluate the effect of changes in interest rates. Output from step 295 includes cash flow graphs such as FIGS. 14A to 14E. Cash flows for financing multiple insurance policies can also be shown, as in FIG. 15. More specifically, FIG. 15 is a sample output graph, reproduced at the printer 114 or displayed on the monitor 115, for example, showing cost components of insurance by accident year and total expenditures by budget year as well as a total expenditure by budget year for self-insurance.

As shown in FIG. 2D, simulations substantially identical to those performed in step 235 can also be performed at this point, in step 297. Prefinancing simulation results and sensitivities are generated at step 299. The foregoing steps provide a basis for the decision regarding insuring and using premium financing at step 301, as shown.

Figure 2E:
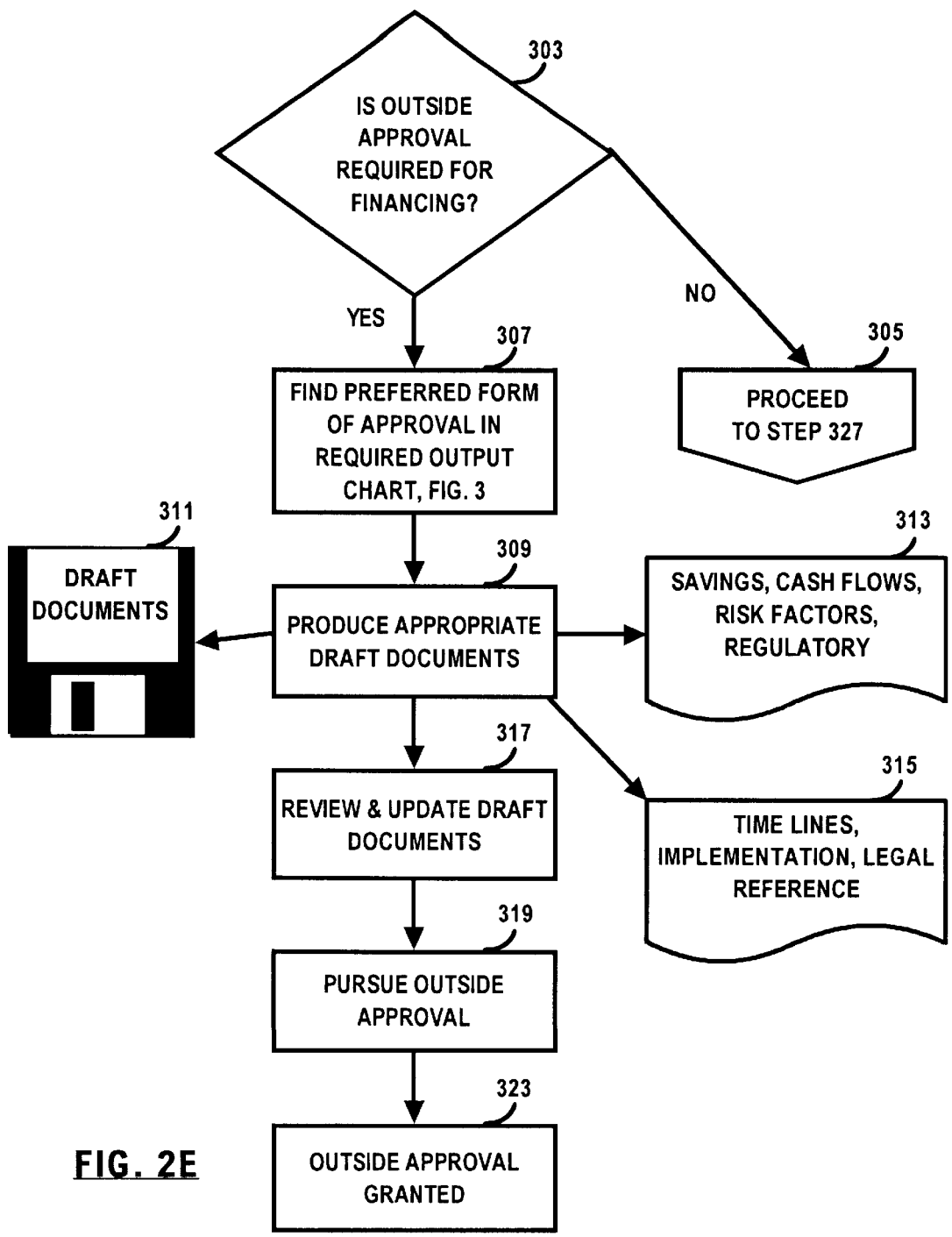

Approval of Proposed Financing FIG. 2E illustrates exemplary preferred steps regarding approval of financing according to the present invention. A variety of different approval processes exist for different public entities. Step 303 checks to see if any outside approval is required. In those cases where no outside approval is required, at step 305 proceed to step 327.

If approval is required from an outside party such as a review board, state agency, judicial proceeding, or voter approval, proceed to Step 307. At this step, the form of outside approval is identified and lists of the appropriate documents needed to support that approval process are compiled. In step 309, the spreadsheet program 104 creates outputs which assist in the validation proceedings by showing the savings, cash flows, and risks of moving from self insurance to insurance. These outputs include, for example, printed documents generated in steps 313 and 315 and computer-readable data files stored on a memory device in step 311.

In many cases, a public entity will have multiple methods of obtaining approval for a new bond issue. For example, a municipality may be allowed under the applicable laws to authorize a new bond issue through voter approval or, in certain cases, a judicial "validation" proceeding.

In step 317 draft documents from steps 311, 313, and 315 are reviewed, updated, and submitted to the outside authority for approval in step 319. When outside approval is granted in Step 323, the municipality proceeds to marketing the bonds.

Marketing of Bonds

Figure 2F:
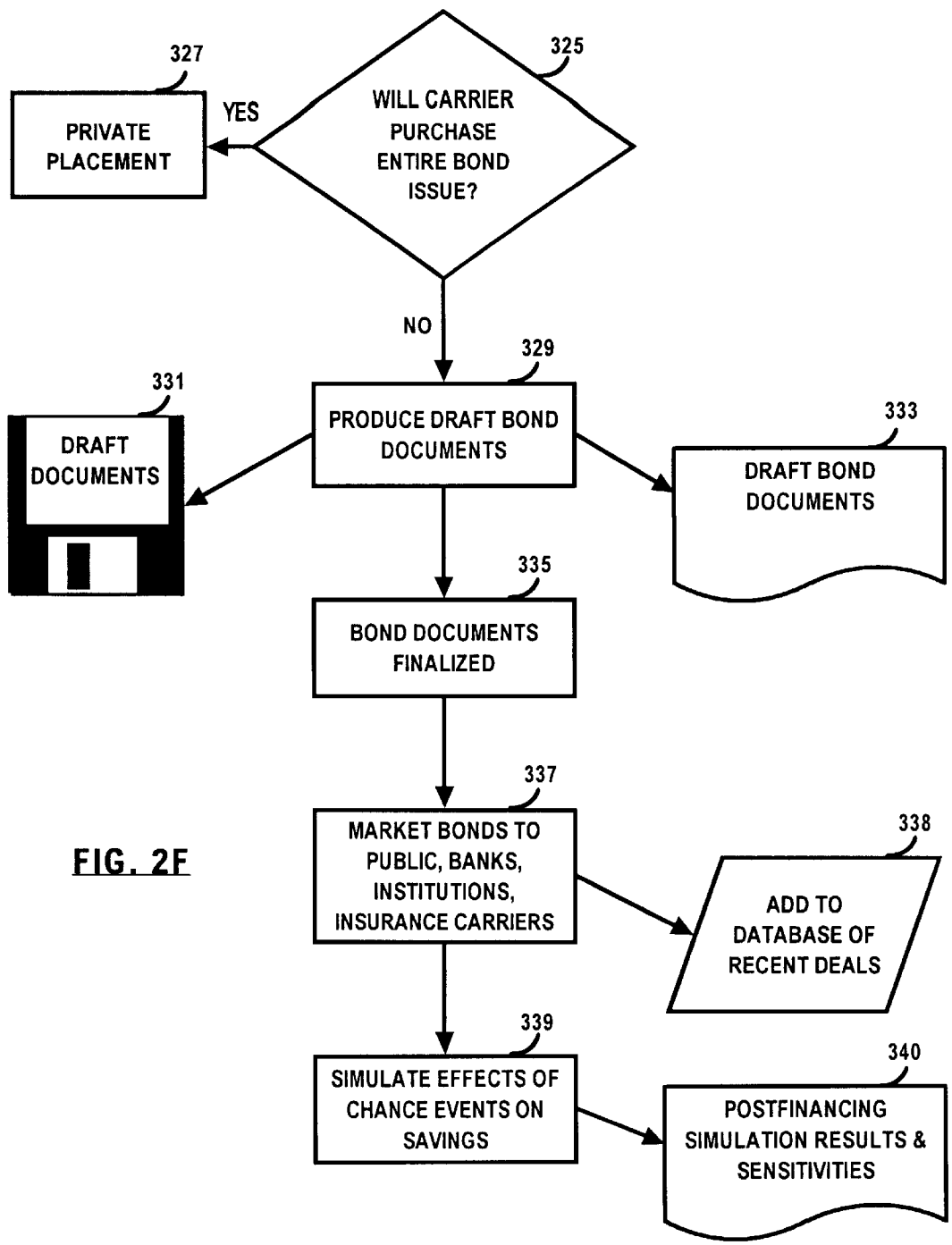

FIG. 2F illustrates exemplary preferred steps regarding marketing of bonds according to the present invention. In those cases where a municipality has decided that a bond issue is the preferred form of financing and approval has been obtained, step 325 is the starting point for marketing the bonds. As mentioned above, the same insurance carrier writing the insurance program may want to purchase all or part of the bond issue used to finance the premium. If the carrier wants to purchase the entire bond issue, further marketing is not necessary and a private placement is appropriate. In this case, the marketing process terminates at step 327.

If the carrier is not purchasing the entire bond issue, it is necessary to produce draft bond documents in step 329. As seen in FIG. 2F, this can be papers 333 or a memory device 331. The spreadsheet program 104 produces several outputs which are useful for bond documents. FIG. 18 is a sample inside front page of an official statement. Risk factors, such as those in FIG. 13, also become part of the official statement and marketing documents, as do the bond duration calculations in FIG. 12. Producing these draft documents on disk in step 331 allows investment bankers to merge this data into their documents without the time, effort, and keying errors associated with inputting the data by hand.

Bond documents are finalized in step 335. This step is done in the conventional fashion and requires input from investment bankers, the municipality, bond counsel, the insurance broker, and others.

Once bond documents are finalized, the bonds are marketed to banks, pension funds, other institutions, and the public in Step 337. The final terms of the bond are added to the database of recent deals for use in forecasting the cost of future deals in step 338.

A preferred system 50 is also adapted to facilitate a final (optional) simulation in step 339. If the client has purchased guaranteed cost insurance and has fixed interest rate financing, all of the cash flows for an insured program are guaranteed. The final simulation calculates savings based on the variation in the cost of self insurance. The final simulation outputs 340 are similar to those shown in FIGS. 11–13, but without any variation in the cost of the insurance program or its financing.

Finding Appropriate Municipalities

Figure 2G:
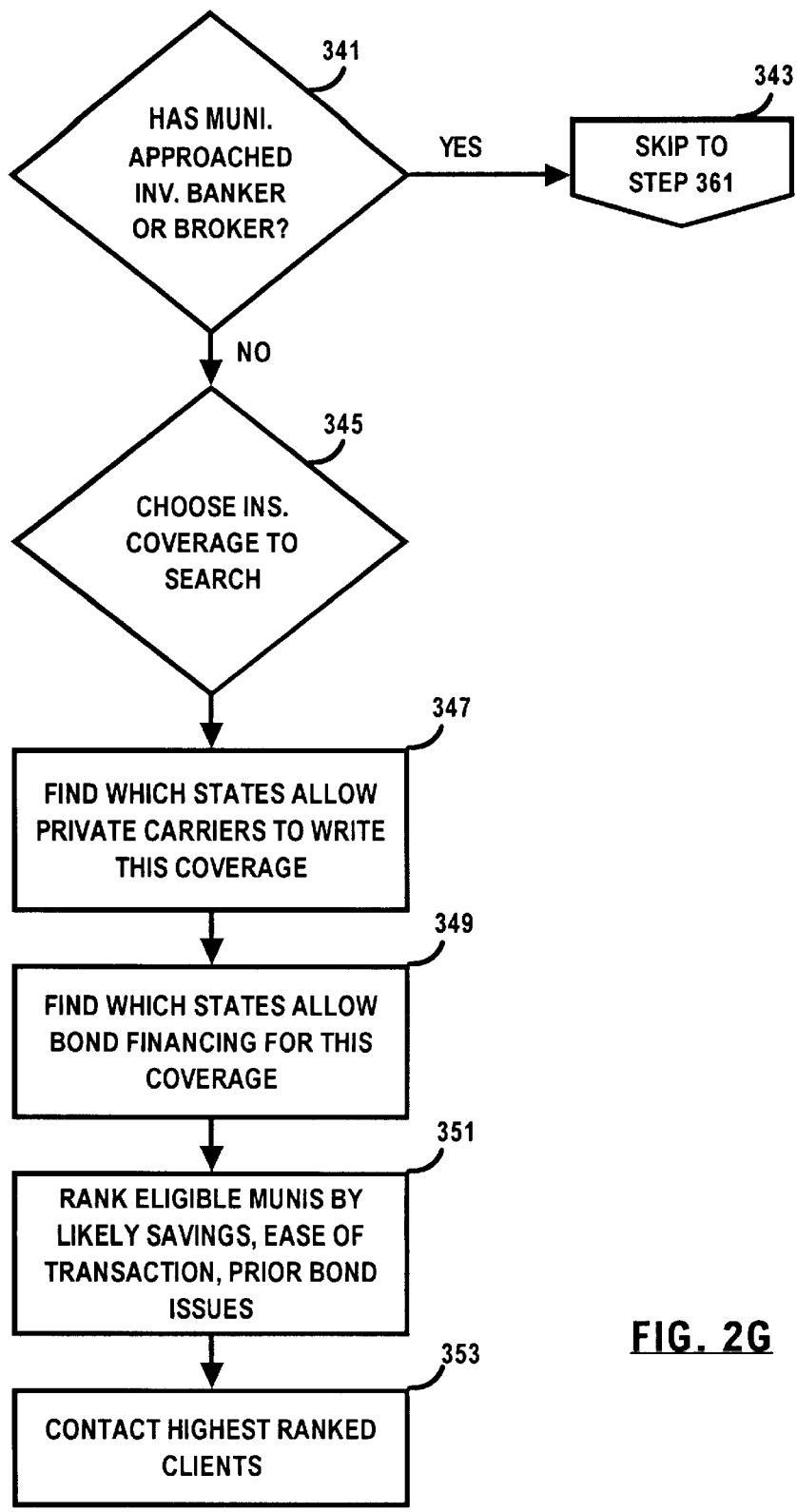
Figure 2H:
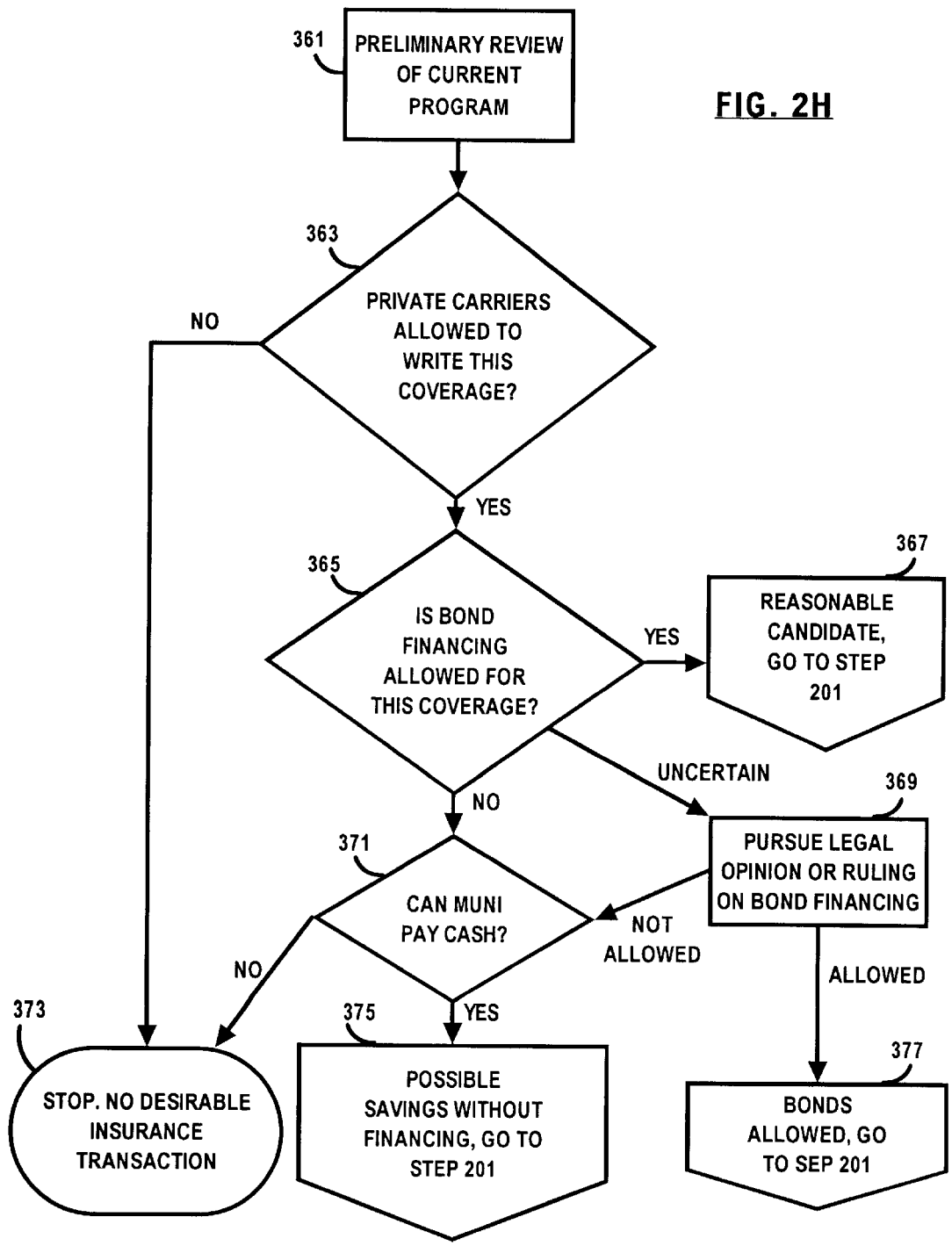

FIG. 2G illustrates exemplary preferred steps regarding finding appropriate municipalities according to the present invention. Data and techniques used in the transaction completed in step 339 (FIG. 2F) are employed by a preferred system 50 to find other municipalities that would benefit from leaving self insurance. If a particular municipality has already approached the insurance broker or investment banker, much of the process of finding appropriate municipalities can be avoided and the process in FIG. 2H is appropriate.

If the municipality has already contacted the broker or investment banker, at step 343 skip from step 341 to step 361. Otherwise, proceed to step 345 and choose which insurance coverage to search, for example, workers compensation or pollution liability. When a coverage is chosen, step 347 finds which states allow private carriers to write the chosen coverage for municipalities. In step 349, those states which allow private carriers are further screened to find states which allow bond financing for insurance premiums.

For those states which allow both private carriers and bond financing, municipalities are ranked by factors which affect the likelihood and desirability of leaving self insurance in step 351. These factors include: state, likely savings, size, ease of transaction, and prior business with the investment banker or insurance broker. In step 353, the highest ranked clients are contacted. If the client is interested in leaving self insurance, the process starts at Step 201 (FIG. 2A).

Screening Municipalities Who Have Approached the Broker or Investment Banker

FIG. 2H illustrates exemplary preferred steps regarding screening municipalities according to the present invention. If a municipality approaches the insurance broker or investment banker, step 361 is a preliminary review of the current program, such as made with the questionnaire shown in FIGS. 19 and 20. Step 363 assesses whether private insurance is legal for this coverage for this particular municipality. If private insurance is illegal, the process terminates at step 373. Otherwise, the process continues to step 365 where the legality of bond financing is assessed. If bond financing is legal (allowed), proceed to step 201 (FIG. 2A) at step 367. If it is uncertain whether bond financing is legal, proceed to step 369 and seek a legal opinion or ruling from the governing body. If bond financing is illegal or otherwise not allowed as shown at step 369, proceed to step 371 to determine if the municipality is able to pay cash. If the municipality can pay cash, at step 375 proceed to Step 201 (FIG. 2A). Otherwise, terminate the process at step 373. If step 369 determines that bonds are allowed, step 377 returns to step 201 (FIG. 2A) as shown.

In conclusion, it is to be understood that the foregoing detailed description and the accompanying drawings illustrate the principles of the invention. However, various changes and modifications may be employed without departing from the spirit and scope of the invention. Thus, by way of example and not of limitation, it is contemplated that the software embodying various aspects of the present invention may comprise a plurality of interrelated software modules, each adapted to the particular needs of different service professionals. Accordingly, the present invention is not limited to the specific forms shown in the drawings and described in detail hereinabove.

What is claimed is:

1. A system for predicting, comparing, and presenting a cost of self insurance versus a cost of insurance employing a computer, a video monitor, a printer, and at least one user input mechanism, the system comprising:

a computer executable program or programs adapted to:
estimate a cost of self insurance by processing self insurance information;
estimate a cost of insurance and savings realized by replacing self insurance with insurance by processing insurance information;
adjust said savings where said cost of self insurance is not equal to an average cost of self insurance;
generate and provide, to the video monitor, data usable by the video monitor to generate at least one visual display representing a preliminary evaluation questionnaire;
enable a user of the computer to input said insurance information with the user input mechanism at said preliminary evaluation questionnaire;
generate data usable by the computer to provide an indication of said cost of a liability, said cost of insurance, and said savings;
determine a plurality of payout patterns for a premium financing mechanism employed to pay for said insurance; and
generate data usable by the computer to provide an indication of said payout pattern.

2. A method for predicting, comparing, and presenting a cost of a liability versus a cost of insurance, the method comprising the steps of:

estimating a cost of a liability by processing liability information;
estimating a cost of insurance and savings realized by replacing said liability with insurance by processing insurance information;
adjusting said savings where said cost of a liability is not equal to an average cost of said liability;
providing an indication of said cost of a liability, said cost of insurance, and said savings;
determining a payout pattern for a premium financing mechanism employed to pay for said insurance; and
providing an indication of said payout pattern.

3. The method for predicting, comparing, and presenting a cost of a liability versus a cost of insurance of claim 2 wherein:

said liability comprises self insurance; and
said premium financing mechanism comprises a municipal bond.

4. The method for predicting, comparing, and presenting a cost of a liability versus a cost of insurance of claim 2 wherein:

said payout pattern is determined such that a net present value of said payout pattern is equal to a principal of said premium financing mechanism.

5. A method for predicting, comparing, and presenting a cost of self insurance versus a cost of insurance, the method comprising the steps of:

estimating a cost of self insurance by processing self insurance information;
estimating a cost of insurance and savings realized by replacing self insurance with insurance by processing insurance information; and
estimating a cost of a premium financing mechanism proposed to pay for said insurance in consideration of regulatory and budget constraints.

6. The method for predicting, comparing, and presenting a cost of self insurance versus a cost of insurance of claim 5 wherein:

said self insurance information includes data from an actuarial study.

7. The method for predicting, comparing, and presenting a cost of self insurance versus a cost of insurance of claim 5 wherein:

said self insurance information includes:
estimates of ultimate losses for at least one past year;
estimates of ultimate losses for at least one upcoming year; and
an estimate of a portion of ultimate losses that will be paid in a budget year.

8. The method for predicting, comparing, and presenting a cost of self insurance versus a cost of insurance of claim 5 wherein:

said self insurance information includes data contained within a self insurer's report filed with a regulatory body.

9. The method for predicting, comparing, and presenting a cost of self insurance versus a cost of insurance of claim 5 wherein:

said self insurance information includes estimates of costs and cash flows calculated from loss, exposure and expense data of a self insured entity and industry loss rates and payout patterns.

10. The method for predicting, comparing, and presenting a cost of self insurance versus a cost of insurance of claim 5 wherein said step of estimating a cost of insurance and savings further comprises:
applying a regression analysis to said insurance information.

11. The method for predicting, comparing, and presenting a cost of self insurance versus a cost of insurance of claim 5 wherein:
said insurance information includes data from an audit of an employer's claims.

12. The method for predicting, comparing, and presenting a cost of self insurance versus a cost of insurance of claim 5 wherein:
said insurance information includes data from a preliminary evaluation questionnaire.

13. The method for predicting, comparing, and presenting a cost of self insurance versus a cost of insurance of claim 5 wherein:
said self insurance information includes ultimate losses and cash flows by budget year.

14. The method for predicting, comparing, and presenting a cost of self insurance versus a cost of insurance of claim 13 wherein:
said ultimate losses are forecast using incurred loss and paid loss development methods.

15. The method for predicting, comparing, and presenting a cost of self insurance versus a cost of insurance of claim 5 wherein:
said insurance information includes regression variables.

16. The method for predicting, comparing, and presenting a cost of self insurance versus a cost of insurance of claim 15 wherein said step of estimating a cost of insurance and savings further comprises:
applying a regression analysis to said regression variables.

17. The method for predicting, comparing, and presenting a cost of self insurance versus a cost of insurance of claim 16 wherein:
said regression variables include at least one of:
a state of operation regression variable;
an industry regression variable;
a portion of claims currently litigated regression variable;
a number of employees regression variable; and
a carrier regression variable.

18. The method for predicting, comparing, and presenting a cost of self insurance versus a cost of insurance of claim 5 wherein said step of estimating a cost of insurance and savings further comprises:
analyzing benchmarking data to determine whether an employer is likely to obtain more or less savings than similar employers.

19. The method for predicting, comparing, and presenting a cost of self insurance versus a cost of insurance of claim 18 wherein:
said benchmarking data includes losses, claim counts, payroll, and employee count by year for a plurality of self insured employers.

20. The method for predicting, comparing, and presenting a cost of self insurance versus a cost of insurance of claim 18 wherein:
said benchmarking data is stored in a benchmarking database which has been check summed against client data from which said benchmarking data was originally obtained.

21. The method for predicting, comparing, and presenting a cost of self insurance versus a cost of insurance of claim 5 further comprising the step of:
providing a benchmarking comparison of a loss experience of an employer with loss experiences of other employers.

22. The method for predicting, comparing, and presenting a cost of self insurance versus a cost of insurance of claim 21 wherein:
said benchmarking comparison includes a comparison of losses as a percentage of a payroll.

23. The method for predicting, comparing, and presenting a cost of self insurance versus a cost of insurance of claim 21 wherein:
said benchmarking comparison includes an indication of loss trends over time.

24. The method for predicting, comparing, and presenting a cost of self insurance versus a cost of insurance of claim 21 wherein:
said benchmarking comparison includes an indication of loss rates attributable to changes in a payroll over time for a particular employer versus a group of similar employers.

25. The method for predicting, comparing, and presenting a cost of self insurance versus a cost of insurance of claim 5 further comprising the step of:
identifying a particular premium financing mechanism to pay for said insurance.

26. The method for predicting, comparing, and presenting a cost of self insurance versus a cost of insurance of claim 25 wherein:
said premium financing mechanism comprises a bond.

27. The method for predicting, comparing, and presenting a cost of self insurance versus a cost of insurance of claim 26 wherein:
interest rates associated with said bond vary over a term of said bond in a manner known before said bond is issued.

28. The method for predicting, comparing, and presenting a cost of self insurance versus a cost of insurance of claim 5 wherein:
said insurance information includes data from a database of recent deals.

29. The method for predicting, comparing, and presenting a cost of self insurance versus a cost of insurance of claim 28 wherein:
said data from a database of recent deals includes data from insurance quotes.

30. The method for predicting, comparing, and presenting a cost of self insurance versus a cost of insurance of claim 29 wherein:
said data from insurance quotes includes at least one of:
type of coverage data;
date of quote data;
carrier data;
states of operation of employers data;
size of employers data;
industry SIC code; and
private, not for profit, or public sector status of employers data.

31. The method for predicting, comparing, and presenting a cost of self insurance versus a cost of insurance of claim 28 wherein:
said data from a database of recent deals includes data from a survey.

32. The method for predicting, comparing, and presenting a cost of self insurance versus a cost of insurance of claim 28 wherein said step of estimating a cost of insurance and savings further comprises:

applying a grouping analysis to selected data of said data from a database of recent deals.

33. The method for predicting, comparing, and presenting a cost of self insurance versus a cost of insurance of claim 5 further comprising the step of:

determining a payout pattern for said premium financing mechanism.

34. The method for predicting, comparing, and presenting a cost of self insurance versus a cost of insurance of claim 33 wherein:

said payout pattern comprises a level payout pattern.

35. The method for predicting, comparing, and presenting a cost of self insurance versus a cost of insurance of claim 33 wherein:

said payout pattern comprises an arbitrary payout pattern.

36. The method for predicting, comparing, and presenting a cost of self insurance versus a cost of insurance of claim 33 wherein:

said payout pattern comprises a fixed amount of savings payout pattern.

37. The method for predicting, comparing, and presenting a cost of self insurance versus a cost of insurance of claim 33 wherein:

said payout pattern comprises an upfront savings payout pattern.

38. The method for predicting, comparing, and presenting a cost of self insurance versus a cost of insurance of claim 37 wherein said step of determining a payment pattern further comprises:

starting with a last payment of said upfront savings payout pattern, sequentially calculating payments of said upfront savings payout pattern until a net present value of said upfront savings payout pattern equals a principal of said premium financing mechanism.

39. The method for predicting, comparing, and presenting a cost of self insurance versus a cost of insurance of claim 33 wherein:

said payout pattern comprises a fixed percentage savings payout pattern.

40. The method for predicting, comparing, and presenting a cost of self insurance versus a cost of insurance of claim 39 wherein said step of determining a payment pattern further comprises:

determining payments of said fixed percentage savings payout pattern by setting said payments at a constant percentage of estimated costs of said self insurance.

41. The method for predicting, comparing, and presenting a cost of self insurance versus a cost of insurance of claim 5 further comprising the step of:

providing a simulation of sensitivities of savings and premium estimates to changes in a plurality of risk factors.

42. The method for predicting, comparing, and presenting a cost of self insurance versus a cost of insurance of claim 41 wherein:

said plurality of risk factors have varying partial regression coefficients.

43. The method for predicting, comparing, and presenting a cost of self insurance versus a cost of insurance of claim 41 wherein:

said plurality of risk factors include variations in an interest rate a carrier uses for discounting cash flows.

44. The method for predicting, comparing, and presenting a cost of self insurance versus a cost of insurance of claim 41 wherein:

said plurality of risk factors include variations in a carrier's expected payout pattern.

45. The method for predicting, comparing, and presenting a cost of self insurance versus a cost of insurance of claim 41 wherein:

said plurality of risk factors include variations in a carrier's expected profit margin.

46. The method for predicting, comparing, and presenting a cost of self insurance versus a cost of insurance of claim 41 wherein:

said plurality of risk factors include variations in a number of years a carrier takes to close all claims.

47. The method for predicting, comparing, and presenting a cost of self insurance versus a cost of insurance of claim 41 wherein:

said plurality of risk factors include variations in a length of financing period.

48. The method for predicting, comparing, and presenting a cost of self insurance versus a cost of insurance of claim 41 wherein:

said plurality of risk factors include variations in a difference between a bond interest rate and an interest rate of a carrier.

49. The method for predicting, comparing, and presenting a cost of self insurance versus a cost of insurance of claim 41 wherein:

said plurality of risk factors include variations in bond fees.

50. The method for predicting, comparing, and presenting a cost of self insurance versus a cost of insurance of claim 41 wherein:

said plurality of risk factors include variations in fees for professional services.

51. The method for predicting, comparing, and presenting a cost of self insurance versus a cost of insurance of claim 41 wherein:

said simulation provides an indication of a range of possible savings.

52. The method for predicting, comparing, and presenting a cost of self insurance versus a cost of insurance of claim 41 wherein:

said simulation provides an indication of a range of possible premiums.

53. The method for predicting, comparing, and presenting a cost of self insurance versus a cost of insurance of claim 41 wherein:

said simulation provides an indication of a likelihood of obtaining a particular premium.

54. The method for predicting, comparing, and presenting a cost of self insurance versus a cost of insurance of claim 41 wherein:

said simulation provides an indication of a likelihood of obtaining a particular amount of savings.

55. A system for predicting, comparing, and presenting a cost of self insurance versus a cost of insurance utilizing a computer, a video monitor, a printer, and at least one user input mechanism, and at least one output mechanism, the system comprising:

at least one computer executable program adapted to:
accept user input regarding self insurance and insurance using at least one user input mechanism, estimate a cost of self insurance by processing self insurance information; and estimate a cost of insurance and savings realized by replacing self insurance with insurance by processing insurance information;

generate and provide output data regarding a cost of self insurance versus a cost of insurance, said output being provided to at least one computer output mechanism.

56. The system for predicting, comparing, and presenting a cost of self insurance versus a cost of insurance of claim 55 wherein:

said computer executable program is further adapted to:
generate data usable by the computer to provide an indication of said cost of a liability, said cost of insurance, and said savings.

57. The system for predicting, comparing, and presenting a cost of self insurance versus a cost of insurance of claim 55 wherein:

said computer executable program is further adapted to:
generate data usable by the computer to provide an indication of a benchmarking comparison of a loss experience of an employer with loss experiences of other employers.

58. The system for predicting, comparing, and presenting a cost of self insurance versus a cost of insurance of claim 55 wherein:

said computer executable program is further adapted to:
generate data usable by the computer to provide an indication of a simulation of sensitivities of savings and premium estimates to changes in a plurality of risk factors.

59. The system for predicting, comparing, and presenting a cost of self insurance versus a cost of insurance of claim 55 wherein:

said computer executable program is further adapted to:
determine a payout pattern for a premium financing mechanism employed to pay for said insurance; and
generate data usable by the computer to provide an indication of said payout pattern.

60. The system of claim 55, wherein said output mechanism comprises at least one of the group consisting of:

A printer;

A video monitor; and

A memory device.

61. The system for predicting, comparing, and presenting a cost of self insurance versus a cost of insurance of claim 55 wherein:

said computer executable program is further adapted to:
determine a plurality of payout patterns for a premium financing mechanism employed to pay for said insurance.

62. The system for predicting, comparing, and presenting a cost of self insurance versus a cost of insurance of claim 61 wherein:

said plurality of payout patterns comprise:
a level payout pattern;
an upfront savings payout pattern;
an arbitrary payout pattern;
a fixed amount of savings payout pattern; and
a fixed percentage savings payout pattern.

63. The system for predicting, comparing, and presenting a cost of self insurance versus a cost of insurance of claim 55 wherein:

said computer executable program is further adapted to:
generate, for a plurality of costs, data corresponding to a graphical representation of components of said costs expected to be paid during a plurality of contiguous time intervals and of a total cost expected to be paid during each of said time intervals.

64. The system for predicting, comparing, and presenting a cost of self insurance versus a cost of insurance of claim 63 wherein:

said time intervals comprise fiscal years.

65. The system for predicting, comparing, and presenting a cost of self insurance versus a cost of insurance of claim 63 wherein:

said computer executable program is further adapted to:
provide said data corresponding to a graphical representation to the video monitor in a format usable by the video monitor.

66. The system for predicting, comparing, and presenting a cost of self insurance versus a cost of insurance of claim 63 wherein:

said computer executable program is further adapted to:
provide said data corresponding to a graphical representation to the printer in a format usable by the printer.

67. The system for predicting, comparing, and presenting a cost of self insurance versus a cost of insurance of claim 63 wherein:

said computer executable program is further adapted to:
receive said self insurance information directly from a data file containing information within a self insurer's report.

68. The system for predicting, comparing, and presenting a cost of self insurance versus a cost of insurance of claim 63 wherein:

said computer executable program is further adapted to:
receive said insurance information from data entered into a preliminary evaluation questionnaire.

69. The system for predicting, comparing, and presenting a cost of self insurance versus a cost of insurance of claim 68 wherein:

said computer executable program is further adapted to:
generate and provide, to the video monitor, data usable by the video monitor to generate at least one visual display representing said preliminary evaluation questionnaire; and
prompt a user of the computer to input said insurance information with the user input mechanism at said preliminary evaluation questionnaire generated by the video monitor.

* * * * *